US011146541B2

(12) United States Patent
Roth et al.

(10) Patent No.: US 11,146,541 B2
(45) Date of Patent: *Oct. 12, 2021

(54) HIERARCHICAL DATA ACCESS TECHNIQUES USING DERIVED CRYPTOGRAPHIC MATERIAL

(71) Applicant: Amazon Technologies, Inc., Seattle, WA (US)

(72) Inventors: Gregory B. Roth, Seattle, WA (US); Marc R. Barbour, Woodinville, WA (US); Bradley Jeffery Behm, Seattle, WA (US); Cristian M. Ilac, Sammamish, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,207

(22) Filed: Jul. 15, 2019

(65) Prior Publication Data
US 2020/0112550 A1 Apr. 9, 2020

Related U.S. Application Data

(63) Continuation of application No. 14/938,403, filed on Nov. 11, 2015, now Pat. No. 10,356,062, which is a
(Continued)

(51) Int. Cl.
*H04L 29/06* (2006.01)
*H04L 9/32* (2006.01)
(Continued)

(52) U.S. Cl.
CPC ............ *H04L 63/062* (2013.01); *G06F 21/64* (2013.01); *H04L 9/0836* (2013.01); *H04L 9/321* (2013.01);
(Continued)

(58) Field of Classification Search
CPC ... H04L 9/0894; H04L 63/062; H04L 9/0836; H04L 9/321; H04L 9/3242; H04L 63/08;
(Continued)

(56) References Cited

U.S. PATENT DOCUMENTS

| | | |
|---|---|---|
| 5,115,467 A | 5/1992 | Esserman et al. |
| 5,179,591 A | 1/1993 | Hardy et al. |

(Continued)

FOREIGN PATENT DOCUMENTS

| | | |
|---|---|---|
| CN | 1254464 | 5/2000 |
| JP | 2006508471 | 3/2006 |

(Continued)

OTHER PUBLICATIONS

Amazon, "Amazon Prime Video—security considerations," Amazon. com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

(Continued)

*Primary Examiner* — Bryan F Wright
(74) *Attorney, Agent, or Firm* — Davis Wright Tremaine LLP

(57) ABSTRACT

Systems and methods for authentication generate keys from secret credentials shared between authenticating parties and authenticators. Generation of the keys may involve utilizing specialized information in the form of parameters that are used to specialize keys. Keys and/or information derived from keys held by multiple authorities may be used to generate other keys such that signatures requiring such keys and/or information can be verified without access to the keys. Keys may also be derived to form a hierarchy of keys that are distributed such that a key holder's ability to decrypt data depends on the key's position in the hierarchy relative (Continued)

to the position of a key used to encrypt the data. Key hierarchies may also be used to distribute key sets to content processing devices to enable the devices to decrypt content such that sources or potential sources of unauthorized content are identifiable from the decrypted content.

20 Claims, 34 Drawing Sheets

Related U.S. Application Data continuation of application No. 13/431,882, filed on Mar. 27, 2012, now Pat. No. 9,215,076.

(51) Int. Cl.
H04L 9/08 (2006.01)
G06F 21/64 (2013.01)

(52) U.S. Cl.
CPC .......... *H04L 9/3242* (2013.01); *H04L 9/3247* (2013.01); *H04L 63/06* (2013.01); *H04L 63/08* (2013.01); *H04L 2209/38* (2013.01); *H04L 2209/60* (2013.01); *H04L 2463/061* (2013.01)

(58) Field of Classification Search
CPC ... H04L 63/06; H04L 9/3247; H04L 2209/38; H04L 2463/061; G06F 7/588; G06F 21/64
USPC ........................................................ 713/171
See application file for complete search history.

(56) References Cited

U.S. PATENT DOCUMENTS

| | | | |
|---|---|---|---|
| 5,200,999 A | 4/1993 | Matyas et al. |
| 5,497,421 A | 3/1996 | Kaufman et al. |
| 5,675,649 A | 10/1997 | Brennan et al. |
| 5,850,443 A | 12/1998 | Van Oorschot et al. |
| 5,956,404 A | 9/1999 | Schneier et al. |
| 6,084,969 A | 7/2000 | Wright et al. |
| 6,097,817 A | 8/2000 | Bilgic et al. |
| 6,157,826 A | 12/2000 | Lee |
| 6,185,316 B1 | 2/2001 | Buffam |
| 6,295,359 B1 | 9/2001 | Cordery et al. |
| 6,327,660 B1* | 12/2001 | Patel .................. G06F 21/575 380/277 |
| 6,381,696 B1 | 4/2002 | Doyle |
| 6,453,416 B1 | 9/2002 | Epstein |
| 6,601,172 B1 | 7/2003 | Epstein |
| 6,647,493 B1 | 11/2003 | Occhipinti et al. |
| 6,826,686 B1 | 11/2004 | Peyravian et al. |
| 6,831,982 B1 | 12/2004 | Hughes et al. |
| 6,851,054 B2 | 2/2005 | Wheeler et al. |
| 6,957,393 B2 | 10/2005 | Fano et al. |
| 6,959,394 B1 | 10/2005 | Brickell et al. |
| 6,985,583 B1 | 1/2006 | Brainard et al. |
| 7,010,689 B1 | 3/2006 | Matyas et al. |
| 7,073,195 B2 | 7/2006 | Brickell et al. |
| 7,139,917 B2 | 11/2006 | Jablon |
| 7,228,417 B2 | 6/2007 | Roskind |
| 7,283,629 B2* | 10/2007 | Kaier .................. H04L 9/0838 380/259 |
| 7,320,076 B2 | 1/2008 | Caronni |
| 7,512,965 B1 | 3/2009 | Amdur et al. |
| 7,685,430 B1 | 3/2010 | Masurkar |
| 7,721,322 B2 | 5/2010 | Sastry et al. |
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa |
| 8,006,289 B2 | 8/2011 | Hinton et al. |
| 8,023,647 B2 | 9/2011 | Shaik |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van der Horst et al. |
| 8,254,571 B1 | 8/2012 | Boyen |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,776,190 B1 | 7/2014 | Cavage et al. |
| 8,776,204 B2 | 7/2014 | Faynberg et al. |
| 8,868,923 B1 | 10/2014 | Hamlet et al. |
| 8,892,865 B1 | 11/2014 | Roth |
| 8,943,318 B2 | 1/2015 | Lee et al. |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0172359 A1* | 11/2002 | Saarinen ................ G06F 7/588 380/46 |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0120940 A1 | 6/2003 | Vataja |
| 2003/0135740 A1 | 7/2003 | Talmor et al. |
| 2003/0145197 A1 | 7/2003 | Lee et al. |
| 2003/0149781 A1 | 8/2003 | Yared et al. |
| 2003/0188117 A1 | 10/2003 | Yoshino et al. |
| 2003/0200450 A1 | 10/2003 | England et al. |
| 2004/0088260 A1 | 5/2004 | Foster et al. |
| 2004/0103096 A1 | 5/2004 | Larsen |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0271207 A1 | 12/2005 | Frey |
| 2005/0273862 A1 | 12/2005 | Benaloh et al. |
| 2005/0278547 A1 | 12/2005 | Hyndman et al. |
| 2006/0046690 A1 | 3/2006 | Rose et al. |
| 2006/0056625 A1* | 3/2006 | Nakabayashi ........ H04L 9/0894 380/46 |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Waleczak, Jr. et al. |
| 2006/0130100 A1 | 6/2006 | Pentland |
| 2006/0149677 A1 | 7/2006 | Shahine et al. |
| 2006/0165233 A1 | 7/2006 | Nonaka et al. |

(56) References Cited

U.S. PATENT DOCUMENTS

| | | |
|---|---|---|
| 2006/0174110 A1 | 8/2006 | Strom et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0127719 A1 | 6/2007 | Selander et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0189540 A1 | 8/2007 | Tarkkala |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0037785 A1 | 2/2008 | Gantman et al. |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0114982 A1 | 5/2008 | Bleumer et al. |
| 2008/0114995 A1 | 5/2008 | Jogand-Coulomb et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0219449 A1 | 9/2008 | Ball et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0172793 A1 | 7/2009 | Newstadt et al. |
| 2009/0210712 A1 | 8/2009 | Fort |
| 2009/0217385 A1 | 8/2009 | Teow et al. |
| 2009/0232301 A1 | 9/2009 | Li |
| 2009/0254572 A1 | 10/2009 | Redlich et al. |
| 2009/0320093 A1 | 12/2009 | Glazier et al. |
| 2010/0017603 A1 | 1/2010 | Jones |
| 2010/0031021 A1* | 2/2010 | Arnold ................ H04L 9/3242 |
| | | 713/155 |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0180130 A1 | 7/2010 | Stahl et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0262988 A1 | 10/2010 | Bauer et al. |
| 2010/0269156 A1 | 10/2010 | Hohlfeld et al. |
| 2010/0281264 A1 | 11/2010 | Sakumoto |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk et al. |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0091036 A1 | 4/2011 | Norrman et al. |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0222690 A1* | 9/2011 | Gan ................ H04W 12/041 |
| | | 380/272 |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0265172 A1 | 10/2011 | Sharma et al. |
| 2011/0274112 A1* | 11/2011 | Czaszar ................ H04L 45/00 |
| | | 370/392 |
| 2011/0296497 A1 | 12/2011 | Becker |
| 2011/0311055 A1 | 12/2011 | Parann-Nissany |
| 2011/0320606 A1 | 12/2011 | Madduri et al. |
| 2011/0320809 A1 | 12/2011 | Amendola et al. |
| 2012/0017095 A1 | 1/2012 | Blenkhorn et al. |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0233216 A1 | 9/2012 | Lim |
| 2012/0243687 A1 | 9/2012 | Li et al. |
| 2012/0245978 A1 | 9/2012 | Jain et al. |
| 2012/0265690 A1 | 10/2012 | Bishop et al. |
| 2012/0317414 A1 | 12/2012 | Glover |
| 2013/0007434 A1 | 1/2013 | King et al. |
| 2013/0031255 A1 | 1/2013 | Maloy et al. |
| 2013/0086662 A1 | 4/2013 | Roth |
| 2013/0086663 A1 | 4/2013 | Roth et al. |
| 2013/0111217 A1 | 5/2013 | Kopasz et al. |
| 2013/0132232 A1 | 5/2013 | Pestoni et al. |
| 2013/0145447 A1 | 6/2013 | Maron |
| 2013/0152208 A1* | 6/2013 | King ................ G06F 21/00 |
| | | 726/26 |
| 2013/0166918 A1 | 6/2013 | Shahbazi et al. |
| 2013/0191884 A1 | 7/2013 | Leicher et al. |
| 2013/0198519 A1 | 8/2013 | Marien |
| 2013/0254536 A1 | 9/2013 | Glover |
| 2013/0282461 A1 | 10/2013 | Ovick et al. |
| 2013/0318630 A1 | 11/2013 | Lam |
| 2014/0013409 A1 | 1/2014 | Halageri |
| 2014/0082715 A1 | 3/2014 | Grajek et al. |
| 2014/0122866 A1 | 5/2014 | Haeger et al. |
| 2014/0181925 A1 | 6/2014 | Smith |
| 2014/0208408 A1 | 7/2014 | Bilgen et al. |
| 2014/0281477 A1 | 9/2014 | Nayshtut et al. |
| 2014/0281487 A1 | 9/2014 | Klausen et al. |
| 2014/0302820 A1 | 10/2014 | Jones |
| 2015/0082039 A1 | 3/2015 | Stalzer et al. |
| 2015/0089614 A1 | 3/2015 | Mathew et al. |
| 2015/0143125 A1 | 5/2015 | Nix |
| 2015/0180654 A1 | 6/2015 | Falk |

FOREIGN PATENT DOCUMENTS

| | | |
|---|---|---|
| JP | 2007505542 | 3/2007 |
| JP | 2008228051 | 9/2008 |
| WO | WO2006077822 | 7/2006 |
| WO | WO2008024705 | 2/2008 |
| WO | WO2014063361 | 5/2014 |

OTHER PUBLICATIONS

Berners-Lee et al., "Uniform Resource Identifier (URI): Generic Syntax," Network Working Group Request for Comments: 3986, The Internet Society 2005, retrieved on Nov. 30, 2011, from http://www.ietf.org/rfc/rfc3986.txt.

(56) References Cited

OTHER PUBLICATIONS

Garay et al., "Timed Release of Standard Digital Signatures," Financial Cryptography, Mar. 11, 2002 [lecture notes in computer science], Springer Berlin Heidelberg, pp. 168-182.

Ghorbei-Talbi et al., "Managing Delegation in Access Control Models," International Conference on Advanced Computing and Communications, pp. 744-751, Dec. 18-21, 2007.

International Search Report and Written Opinion dated Dec. 30, 2014, in International Patent Application No. PCT/US2014/057043, filed Sep. 23, 2014.

International Search Report and Written Opinion dated Dec. 30, 2014, in International Patent Application No. PCT/US2014/057051, filed Sep. 23, 2014.

International Search Report and Written Opinion dated Oct. 22, 2014, International Patent Application No. PCT/US2014/042569, filed Jun. 16, 2014.

Kiyomoto et al., "Design of Self-Delegation for Mobile Terminals," Information and Media Technologies 1(1):594-605 2006, reprinted from IPSJ Digital Courier 1:282-293 (2005).

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 System Administrator's Guide [online]," May 2012, retrieved on Jun. 27, 2012, from http://web.mit.edu/kerberos/krb5-1.10/krb5-1.10.2/doc/krb5-admin.html, 57 pages.

Massachusetts Institute of Technology, "Kerberos V5 UNIX User's Guide," May 2012, retrieved on Jun. 28, 2012, from http://web.mit.edu/kerberos/krb5-1.10/krb5-1.10.2/doc/krb5-user.html, 38 pages.

Patent Cooperation Treaty, "Notification of Transmittal of the International Search Report and the Written Opinion of the International Searching Authority, or the Declaration," issued to International Application No. PCT/US2012/058083 dated Dec. 27, 2012.

Roth et al., "Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from internet Jun. 27, 2012, http://etherpad.tools.ietf.org/html/rfc1994, 13 pages.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

U.S. Appl. No. 13/431,760, filed Mar. 27, 2012.

U.S. Appl. No. 13/431,898, filed Mar. 27, 2012.

Wang et al., "Extending the Security Assertion Markup Language to Support Delegation for Web Services and Grid Services," IEEE International Conference on Web Services 1:67-74, Jul. 11-15, 2005.

Wikipedia, "Physical unclonable function," retrieved Aug. 22, 2013, from http://en.wikipedia.org/wiki/Physical_unclonable_function, 8 pages.

\* cited by examiner

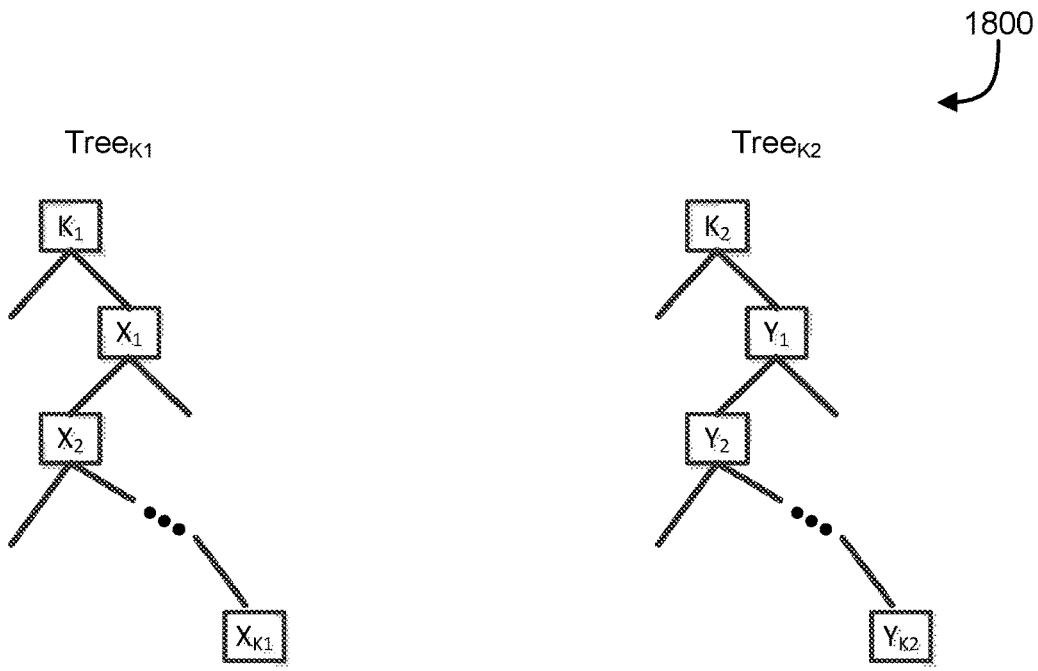
Key-Seed=["$K_1/X_1/X_2/.../X_{K2}$", "$K_1/Y_1/Y_2/.../Y_{K2}$"]
$\alpha$ =HMAC(HMAC(HMAC(HMAC($K_1$, $X_1$), $X_2$),...,$X_{K1}$), Key-Seed)
$\beta$ =HMAC(HMAC(HMAC(HMAC($Y_1$,$Y_1$), $Y_2$,...,$Y_{K1}$), Key-Seed)
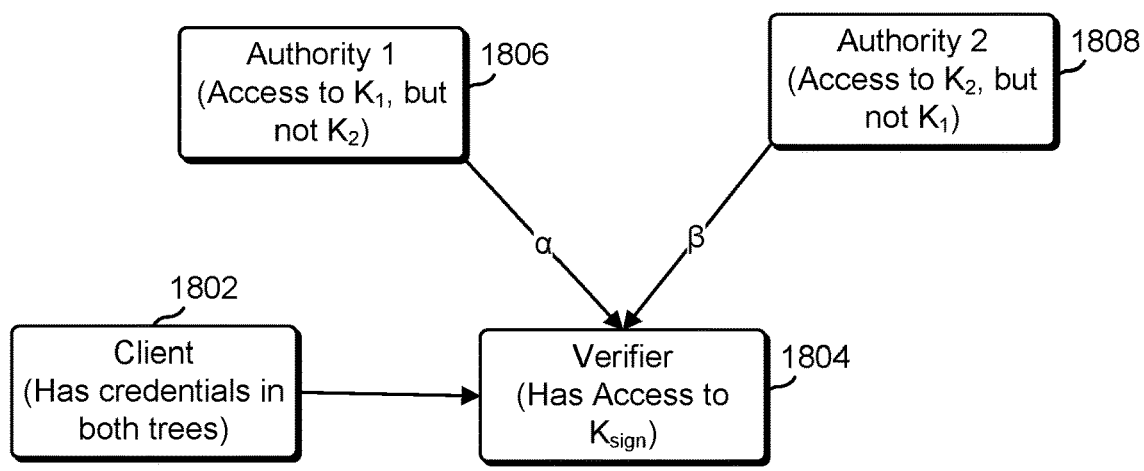
FIG. 18

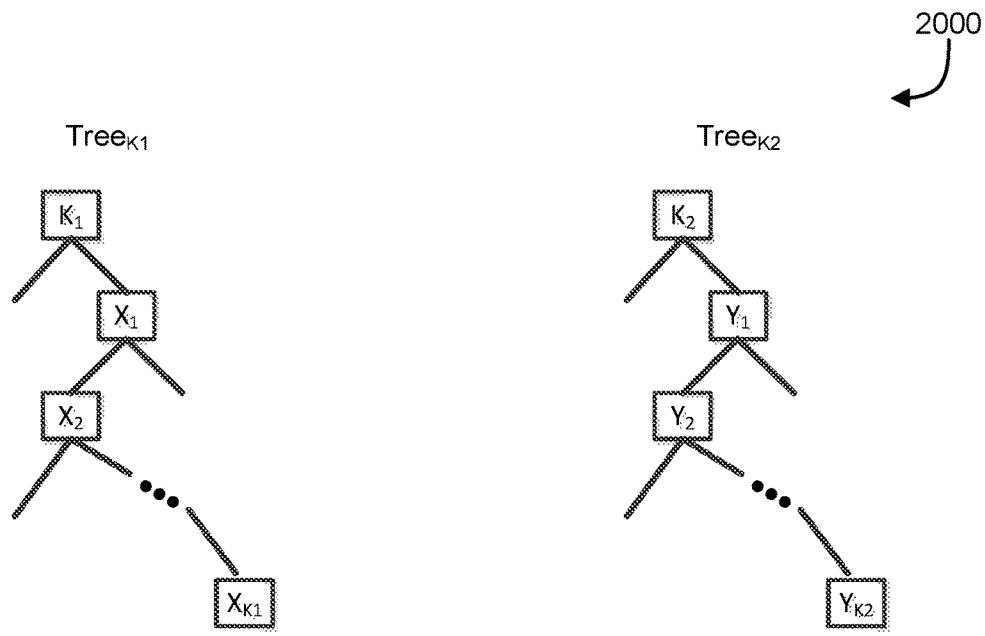
$$\text{Key-Seed} = [\text{``}K_1/X_1/X_2/\ldots/XK_1\text{''}, \text{``}K_2/Y_1/Y_2/\ldots/Y_{K2}\text{''}]$$
$$\alpha = \text{HMAC}(\text{HMAC}(\text{HMAC}(\text{HMAC}(K_1, X_1), X_2), \ldots, X_{K1}), \text{Key-Seed})$$
$$\beta = \text{HMAC}(\text{HMAC}(\text{HMAC}(\text{HMAC}(Y_1, Y_1), Y_2, \ldots, Y_{K1}), \text{Key-Seed})$$
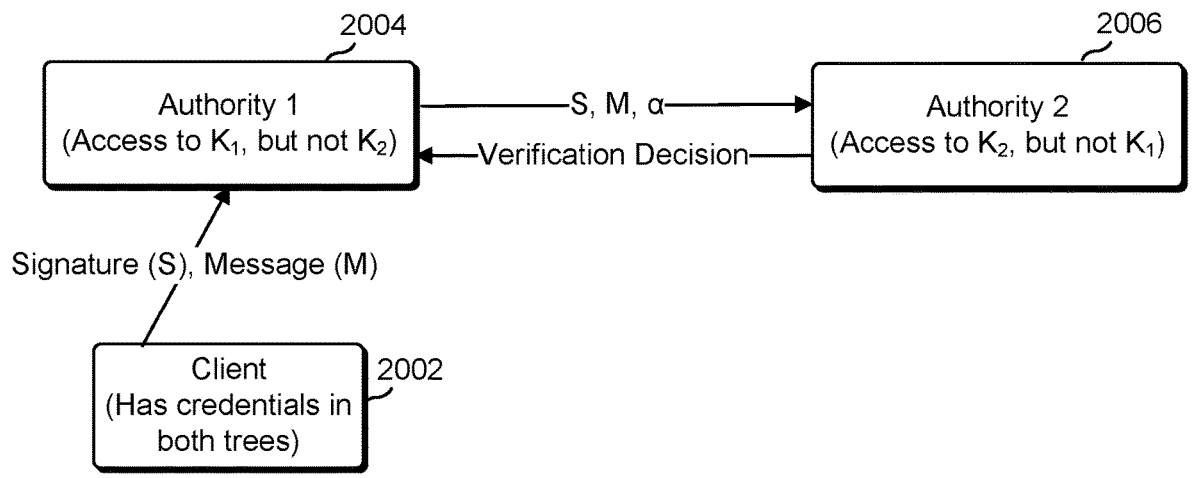
FIG. 20

HIERARCHICAL DATA ACCESS TECHNIQUES USING DERIVED CRYPTOGRAPHIC MATERIAL

CROSS-REFERENCE TO RELATED APPLICATIONS

This application is a continuation of U.S. patent application Ser. No. 14/938,403, filed Nov. 11, 2015, now U.S. Pat. No. 10,356,062, entitled "DATA ACESS CONTROL UTILIZING KEY RESTRICTION," which is a continuation of U.S. patent application Ser. No. 13/431,882, filed Mar. 27, 2012, now U.S. Pat. No. 9,215,076, entitled "KEY GENERATION FOR HIERARCHICAL DATA ACCESS, which incorporates by reference for all purposes the full disclosure of U.S. patent application Ser. No. 13/431,760, filed Mar. 27, 2012, now U.S. Pat. No. 8,892,865, entitled "MULTIPLE AUTHORITY KEY DERIVATION," U.S. patent application Ser. No. 14/542,492, filed Nov. 14, 2014, now U.S. Pat. No. 10,044,503, entitled "MULTIPLE AUTHORITY KEY DERIVATION," U.S. patent application Ser. No. 13/341,898, filed Mar. 27, 2021, now U.S. Pat. No. 8,739,308, entitled "SOURCE IDENTIFICATION FOR UNAUTHORIZED COPIES OF CONTENT," and U.S. patent application Ser. No. 14/282,386, filed May 20, 2014, now U.S. Pat. No. 9,307,177, entitled "SOURCE IDENTIFICATION FOR UNAUTHORIZED COPIES OF CONTENT."

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold can be challenging, especially as the size and complexity of such configurations grows.

As another example, the distribution of content, such as audio, video, electronic games, electronic books, and the like, from those who own rights in the content to those who may consume the content, can create numerous challenges. For example, content providers and others involved in content's distribution often struggle with competing goals of widespread distribution and preventing unauthorized copying. Conventional techniques for controlling access to content often do not balance such goals effectively. For instance, in order to ensure that content can be consumed with minimal burden to the consumer, conventional techniques make it difficult to identify the source of unauthorized copies of content.

BRIEF DESCRIPTION OF THE DRAWINGS

FIG. 18 is a diagram illustrating a signature submission and verification process, in accordance with at least one embodiment;

FIG. 20 is a diagram illustrating a signature submission and verification process in accordance with at least one embodiment;

DETAILED DESCRIPTION

Figure 1:
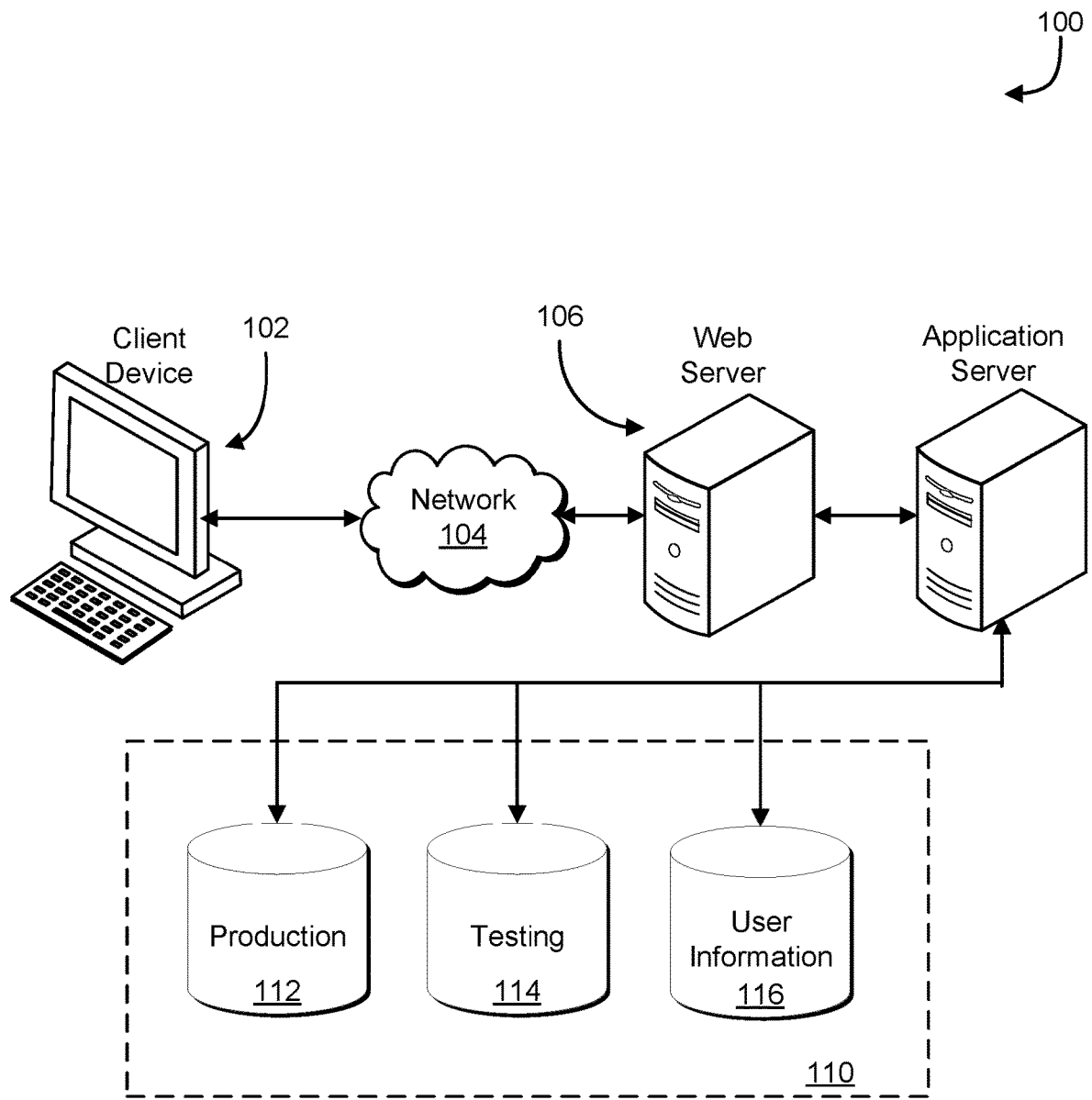
FIG. 1 shows an illustrative example of a computing environment that can be used to implement various aspects of the present disclosure in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for key generation and applications for using generated keys, in accordance with various embodiments. The keys may be used for various purposes, such as authentication and participation in message signing schemes, encryption, and/or other purposes for which keys are useful. In an embodiment, a computing resource provider provides computing services to customers based at least in part on electronic requests received from user devices of the services. The services may be any suitable service that may be offered including, but not limited to, access to data, access to computing resources to perform operations, access to data storage services, and the like. In some instances, services and other access to computing resources may require the direct and/or indirect use of keys managed by multiple authorities, some of which may be distrustful of others and, therefore, unwilling to share their keys with others.

In some embodiments, to ensure that services are provided in a secure manner, various embodiments of the present disclosure utilize techniques to authenticate requests (also referred to as "messages") to ensure that the requests are legitimate. In an embodiment, requests are authenticated using a Hash Message Authentication Code (HMAC) algorithm or other suitable algorithm, as discussed in more detail below.

In an embodiment, both the authenticating party (e.g., user of services or party acting on behalf of the user) and the authenticator (e.g., provider of services or party acting on behalf of the provider) share a secret credential, which may be referred to as a key. An authenticator may store shared secret credentials for multiple users. As part of a transaction, the authenticating party may sign requests using the shared secret credential, thereby forming a signature. The signature may be provided to the authenticator with the requests. The authenticator may use its own copy of the shared secret credential to generate a signature for the received requests and, by comparing if the generated signature matches the received signature (for example by being identical to the received signature), determine whether the requests were signed using the shared secret credential. If determined that the requests were signed using the shared secret credential, the requests may be considered authentic and, therefore, it may be determined that the requests should be fulfilled.

In some embodiments, the authenticator obtains information from other sources to generate the shared key. For example, the authenticator may require that an authenticating party prove access to keys held by multiple authorities. To prove such access, in an embodiment, the authenticating party may utilize a signing key that is generated, by the authenticating party or another system, based at least in part on the keys of the multiple authorities. Techniques for constructing such keys are described in more detail below. The authenticator may also obtain the keys of the multiple authorities and/or information derived from to generate its own signing key that is usable to verify signatures submitted by the authenticating party. In an embodiment, signing keys of the authenticating party and the authenticator are generated in a manner such that the order of information derived from the multiple authorities' keys is inconsequential.

Because the interactions described above are symmetric (i.e., both utilize common information when performing their roles), the shared secret credentials that an authenticator keeps can be used to both authenticate authenticating parties or to act on their behalf. As a result, a high degree of security is desirable to protect these credentials. Maintaining high degrees of security may have negative performance and availability consequences. For example, maintaining a high degree of security may include maintaining a centralized system for key storage. Such centralized systems, however, may cause a scaling bottleneck since the addition of users and/or services causes a greater burden to the centralized system. If such a centralized system fails, it may be difficult or impossible to authenticate requests. Thus, centralization provides both advantages for security and disadvantages for scaling and availability of services. In addition, a centralized system makes it difficult in instances involving authorities whose keys are required, but who may distrust one another. For example, an authority may not trust the centralized system (and/or vice versa) and, therefore, the authority and centralized system may not provide each other's keys to one another.

In an embodiment, negative impacts of such systems (and other systems) are reduced by utilizing a signing protocol that derives from shared secret credentials artifacts that may be used to prove that an authenticating party has a shared secret credential and, therefore, is likely authorized to obtain access specified in requests signed with the artifacts. In an embodiment, such artifacts are obtained by configuring authenticator computer systems to accept as a signature a value that is based at least in part on a derivation of a shared credential, instead of the shared credential itself. The derivation of the shared credential may be such that, as described more fully below, the derivation does not allow for practical determination of the shared credential. In addition, in various embodiments, variations of the signing protocol allow for secret credentials to be derived from secret credentials of multiple authorities to allow proof of access to the secret credentials of the multiple authorities.

For example, in an embodiment, authenticating parties are able to sign signatures with $$HMAC(M,HMAC(X,credential)),$$

where M is a message, and HMAC(X, credential) is an artifact derived from a shared secret credential. As used herein, HMAC(A, B) indicates a function whose operands are A and B and which is mathematically defined according to RFC 2104. As discussed elsewhere herein, HMAC(A, B) is used throughout the present disclosure for the purpose of illustration, but other functions, including but not limited to functions that are or are based at least in part on cryptographic hash functions may be used in accordance with various embodiments of the present disclosure. The value for X may be some value that is known both by the authenticating party and the authenticator, and may be publicly available. For example, X may be a current date, encoded in a predetermined manner to ensure that HMAC (X, credential) is computed consistently by the authenticating party and the authenticator. As another example, X may be an identifier of a service with which the artifact is usable. As yet another example, X may, but does not necessarily, encode multiple semantic meanings and be provided in a manner such that both the authenticating party and the authenticator consistently compute the artifact. The semantic meaning may be a restriction on use of the key, including meaning that indicates that no further derivations form the key should be used. Combining previous examples of the present paragraph, X may be encoded as "20110825/DDS" where the string left of the slash represents a date and the string right of the slash represents the name of a service with which an artifact computed with X is usable. Generally, X may be any value or set of values encoded consistently for both the authenticating party and the authenticator. It should be noted that other suitable functions other than HMAC functions may be used, as discussed below.

Returning to the example utilizing HMACs, in an embodiment, values for X are chosen to provide additional advantages. As noted, X may (but does not necessarily) correspond to one or more semantic meanings. Semantic meanings such as time stamps, service names, regional names, and the like are used, in an embodiment, to provide a system where artifacts created in accordance with techniques of the present disclosure provide corresponding restrictions on use of keys derived from X. In this manner, even though compromise of keys generated may allow authentication by undesired parties, restrictions used to encode keys allow for the adverse effects to be minimized when keys are compromised. As an example, time restrictions used to derive keys provide an efficient way for a system to check if a submitted signature was signed with a key that was valid at the time of signature submission. As a concrete example, if a current date is used to derive a key and an authenticator system only accepts signatures submitted on the current date, the authenticator system will determine that signatures generated using keys derived with different dates are invalid. Similarly, a key derived with an identifier of a particular service would be invalid for use with another service. With respect to multiple authorities, restrictions of one authority may be combined with restrictions of other authorities. For instance, if one authority derives a secret credential from a date and another authority derives a secret credential from a geographic region, a secret credential derived from the credentials of both authorities may only be valid for the geographic region on the date. Other examples are provided below.

As noted, various techniques of the present disclosure allow for multiple parameters to be used to derive keys. Parameters for key generation may be referred to as key-derivation material. In an embodiment, keys are derived from multiple parameters through multiple use of an HMAC function. For example, a key may be computed as follows:

$$K_S=HMAC(\ldots HMAC(HMAC(HMAC(K,P_1),P_2), P_3)\ldots,P_N),$$

where K is a shared secret credential and the $P_i$ are parameters. The key, $K_S$, may be used to generate a signature, such as:

$$S=HMAC(K_S,M),$$

where M is a message, which may be canonicalized. In this manner, the key is derived in a layered manner, allowing for partial derivations of the key to be passed to various components of a distributed system. For example, $K_{P1}$=HMAC (K, $P_1$) may be computed and passed on to one or more components of a distributed system. The components that receive $K_{P1}$ may compute $K_{P2}$=HMAC($K_{P1}$, $P_2$), where $P_2$ may be the same for each component or different for some or all components. The values for $K_{P2}$ calculated by the various components may pass the calculations to other components of the distributed systems which may compute $K_{P3}$=HMAC($K_{P2}$, $P_3$). Each component may cache the results it calculates, and possible results computed and calculated by other components. In this manner, more security may be provided around a data store that stores shared secret keys because computations of derived keys may be performed by other components of the distributed system. In instances where keys are derived from information provided from multiple authorities, such keys may be generated by each of the authorities and provided to others for use. In this manner, the authorities are able to provide information that is usable to prove access to the keys, without providing the keys themselves.

The techniques described herein are also usable in other contexts. For example, while much of the present disclosure utilizes signature generation and verification for the purpose of illustration, the techniques are applicable in other contexts, such as data encryption and digital rights management. For example, in an embodiment, keys derived such as described above may be used to implement a system in which a hierarchy of encryption keys is generated. Keys in the hierarchy may correspond to authorities in an organizational hierarchy. The term "organization," unless otherwise clear from context, is intended to be read in the broad sense to imply a set of principals organized in some manner. In an embodiment, keys in the key hierarchy are distributed according to the organizational hierarchy. In particular, the keys are distributed to correspond with access rights of those in the organizational hierarchy. For instance, the keys may be distributed such that a principal with a key in the hierarchy is able to decrypt data that was encrypted with a different key that was derived from the key. In this manner, if a key is lost or otherwise inaccessible, a key from higher in the hierarchy will be usable to decrypt the data.

To enable such a system, data may be maintained from which one with a key in the hierarchy may be able to derive a key that was both derived from the key and used to encrypt data. As an example, parameters for deriving the key may be stored in a data store. Data may be stored in connection with encrypted data that identifies the key that encrypted the data. The data that identifies the key may be used to locate the parameters that were used to derive the key. As an alternative, the parameters may be stored in connection with the encrypted data such that, if the key is inaccessible, a key higher in the hierarchy may be used with the parameters to derive the key. A file management system or other system may maintain such information. For instance, when a principal uses a key to encrypt data and save the encrypted data, the parameters (or information that is usable to identify the parameters) may be saved as metadata for the data.

Techniques described herein also may be used in the context of digital rights management (DRM). For instance, keys derived according to the techniques described herein may be used to derive keys for encrypting content (or generally information) or for encrypting keys for decrypting the content (or other information). In addition, techniques described herein may be used to identify sources of unauthorized copies of content. In particular, in an embodiment, techniques for deriving keys, such as those discussed above, may be used to generate a hierarchy of keys. By providing a device (such as a content-processing device) a key at a non-leaf level of the key hierarchy and parameters for deriving keys lower in the hierarchy, a device can be given a access to a large number of keys by only providing the device a single key.

In an embodiment, a hierarchy of keys is generated and subsets of the keys are provided to devices. Special care is taken in the provisioning of keys to devices. For example, in an embodiment, keys are distributed to ensure that subsets of the devices are provided different sets of keys. The subsets of devices may comprise multiple devices and/or single devices. In addition, in an embodiment, keys are provided and encrypted content is published such that authorized devices are able to use at least one of the keys to decrypt the content.

Content may be published in a particular way to enable the identification of sources of unauthorized copies of the content. In an embodiment, the content comprises a plurality of records. Each of the records may comprise encrypted content and information from which a key may be identified to decrypt the content. Some of the records may have multiple copies of the content and information from which a key for describing each copy may be identified to decrypt the content. The keys used to encrypt (and therefore decrypt) each copy of content in a record may vary. For example, one copy of content in a record may be encrypted using one key while another copy may be encrypted using another key. In addition, the copies of content for a record may also vary among themselves, such as by varying pixels for video content or otherwise varying the content copies. The content copies may be varied so as to be imperceptible or virtually imperceptible to a person, but in a manner such that a computing device can distinguish the copies from one another.

In many instances, unauthorized parties process encrypted content and publish or otherwise make unauthorized use of the content in a manner contrary to a holder of rights in the content. For example, users often referred to as "pirates" may process content, record the output of the processing, and publish the result with the protection removed using keys extracted from a device, often for profit. When content is encoded using the techniques described herein, such unauthorized copies of the content can be obtained and analyzed to identify the source of the content. In particular, records of the output that correspond to records of the original content that have multiple varied copies of a portion of the content may be identified and used to identify which keys were used to decrypt the content. Because the keys provided to the devices vary among the devices, the keys used to decrypt the content effectively function as an identifier of one or more devices. For example, if it is determined that a key K was used to decrypt the content, it may be determined that only devices that were provided K are suspect. Similarly, if it is known that a set of ten keys were used to decrypt the content, there may be a relatively small number of devices (perhaps a single device) that was provided those exact keys. In this manner, a relatively small amount of extra information can be included with content in order to effectively identify devices that produced unauthorized copies of the content.

FIG. 1 illustrates aspects of an example environment 100 for implementing aspects of the present disclosure in accordance with various embodiments. As will be appreciated, although a Web-based environment is used for purposes of explanation, different environments may be used, as appropriate, to implement various embodiments. The environment includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
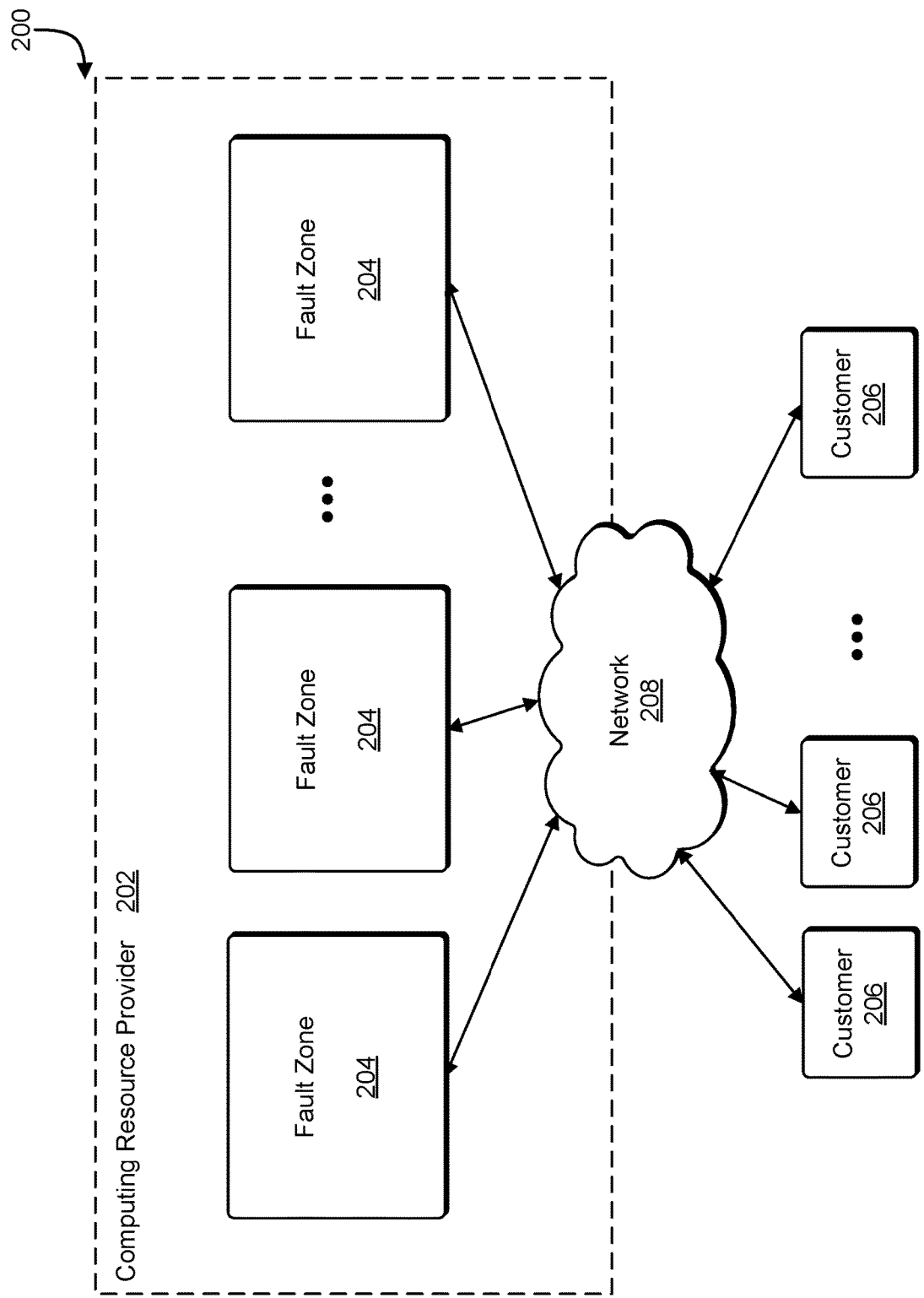
FIG. 2 shows an illustrative example of an environment that includes a computing resource provider that manages multiple fault zones in accordance with at least one embodiment.

FIG. 2 shows an illustrative example of an environment 200 that includes a computing resource provider 202 that manages multiple fault zones 204 in accordance with at least one embodiment. A computing resource provider, in an embodiment, is an organization that operates computer hardware on behalf of one or more customers 206. The computing resource provider may provide computing resources in various ways. For example, in an embodiment, the computing resource provider 202 manages hardware that is configured for use by customers 206. The computing resource provider 202 provides an interface that allows the customers 206 to programmatically configure computing resources using the hardware. For example, the computing resource provider may maintain hardware servers that execute virtual computer systems that are programmatically controlled by the customer. As another example, the computing resource provider 202 may manage various data stores to provide remote data storage solutions, such as high-durability data storage and block-level data storage.

A fault zone, in an embodiment, is a collection of computing resources that are separated by one or more fault boundaries such that each fault zone is tolerant to a fault of another fault zone. As an example, each fault zone 204 may be a separate data center. Thus, if one data center ceases being operational, perhaps due to a power outage or other disruptive event, other data centers may continue to operate. The fault zones may be each located in different geographic locations and some or all of the fault zones may be separated by geopolitical boundaries. For example, two or more of the fault zones may be in different countries. It should be noted that, for the purpose of illustration, the present disclosure provides numerous examples where fault zones are data centers. However, fault zones can be defined in numerous other ways. For example, separate rooms in the same data center may be considered separate fault zones in accordance with various embodiments. As another example, computing resources in the same location, but supported by different backup power generators and/or supported by different network resources, may be considered different fault zones. As yet another example, data centers may be clustered such that each cluster of data centers may be considered a fault zone. Further, there may be many reasons a fault zone may fail, including reasons relating to power grid operation, public network operation, political assertions of power, and other reasons.

In an embodiment, customers 206 communicate with the computing resource provider 202 over a network 208, such as the Internet. The customers 206 may have resources configured in one or more of the fault zones 204 and may communicate with the resources by sending electronic messages, such as messages invoking a web-service application programming interface (API) of the computing resource provider in order to configure and operate the resources. Customers may utilize resources in multiple fault zones in order to decrease the effects of potential failures that impact the customers' resources. A customer who utilizes resources of the computing resource provider 202 to operate a publicly accessible website may, for example, maintain web and other servers in separate fault zones so that, if servers in one fault zone fail, the public may still access the web site by accessing servers in another fault zone.

Figure 3:
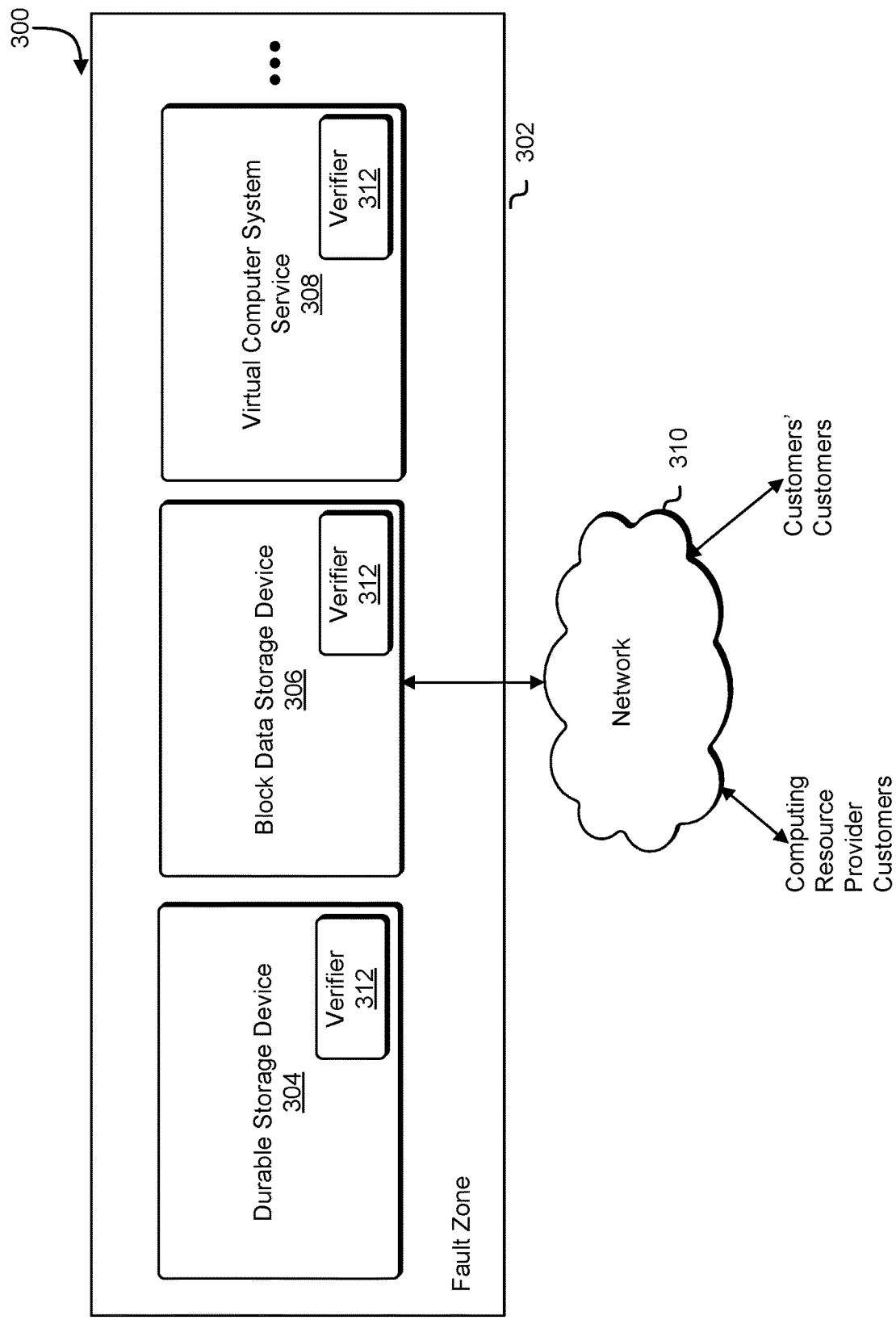
FIG. 3 shows an illustrative example of an environment inside of a fault zone of FIG. 2, in accordance with at least one embodiment.

FIG. 3 shows an illustrative example of an environment 300 inside of a fault zone 302, which may be a fault zone of a computing resource provider as illustrated in FIG. 2. The fault zone 302, in an embodiment, includes computing resources that are used to provide various services on behalf of customers. For example, as illustrated in FIG. 3, the fault zone 302 includes computing resources that are used to provide a durable data storage service, which may cheaply and redundantly store relatively large amounts of data on behalf of customers. Such a service may be used when large amounts of data storage and/or security of the data storage is required, but when input/output performance is not high priority. The fault zone 306 may also include a block data storage service 306 which provides the use of block-level storage devices, physical devices and/or virtual, to customers. The customers may, for example, attach block-level storage devices to computer systems also utilized by the customers. Also illustrated is a virtual computer system service 308 which may provide computing services for customers. In an embodiment, the virtual computer system service 308 provides computing services by implementing virtual computer systems for the customers on physical servers maintained by the computing resource provider, although variations are possible, such as where physical computer systems are allocated to customers for customer use. In an embodiment related to virtual computer systems, the customers may programmatically manage the virtual computer systems according to their needs. For example, as illustrated in FIG. 3, customers may configure virtual computer systems of the virtual computer system service 308 to server customers of the customers of the virtual computing service provider. The virtual computer systems may be, for instance, configured to operate a publicly accessible website. Both the customers of the virtual computing resource provider and the customers' customers may, in various embodiments, access the various services operated in the fault zone 302 by communicating with the services over a network 310, which may be the network 208 described above in connection with FIG. 2.

It should be noted that the various embodiments illustrated in FIG. 3, as with all illustrative embodiments shown in the Figures and described herein, are illustrative in nature and that variations are considered as being within the scope of the present disclosure. For example, other services different from those illustrated may be provided in the fault zone 302 in addition to or instead of the services illustrated. As illustrated by the ellipses in FIG. 3, for instance, additional services may be operated in the fault zone 302. In addition, some services may utilize other services. For example, multiple services (such as a block-level data storage service 306 and a virtual computer system service 308) may be utilized together to provide other services, such as a relational database service, an electronic mail service, and, generally, any type of computing service that can be provided using resources of a computing resource provider.

As illustrated in FIG. 3, each of the services of the computing resource provider may include a separate verifier 312. The verifier may be a computing device, collection of computing devices, application module, or other resource that verifies various attestations made by customers and possibly by other computer systems. In an embodiment, each of the verifiers 312 verifies message signatures that are produced in accordance with the various embodiments herein and then provided by customers in connection with requests to access computing resources, as described in more detail below. Keys and other relevant information may be propagated to the verifiers from a central key authority to enable the verifiers to verify information. It should be noted that each service having a verifier is an illustrative example of a particular embodiment, but that other arrangements are within the scope of the present disclosure. For example, a single verifier may support multiple services, even all services and may even support multiple fault zones.

Figure 4:
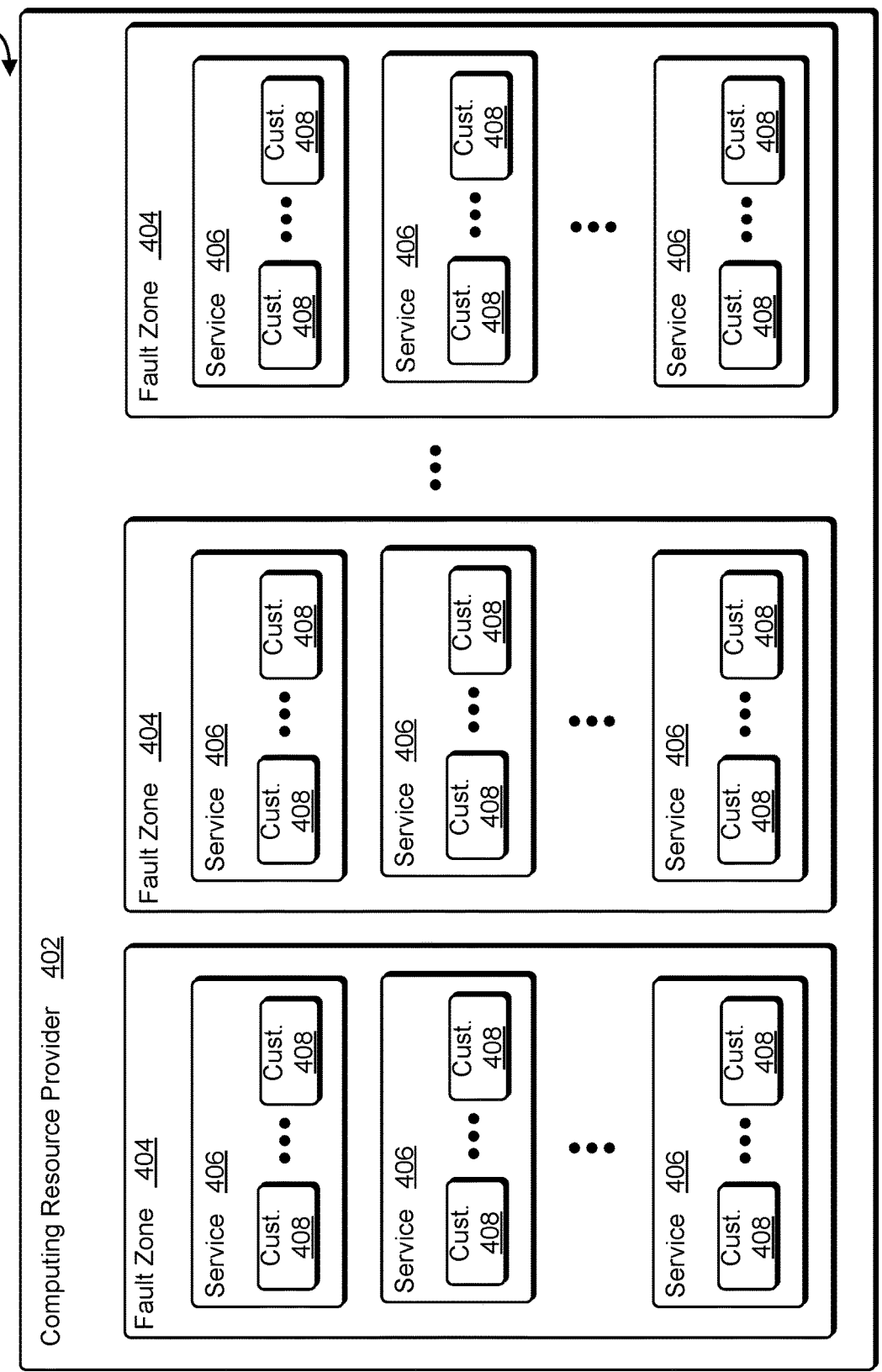
FIG. 4 is a diagram that illustrates an example manner in which various elements participating in a computing environment may be allocated different scopes of authority in accordance with at least one embodiment.

As noted above, various embodiments of the present disclosure allow for various levels of authority to be given for different reasons. FIG. 4 is a diagram that illustrates an example way of a manner in which various elements participating in a computing environment may be allocated different scopes of authority in accordance with at least one embodiment. In FIG. 4, a computing resource provider 402 is illustrated. In an embodiment, the computing resource provider 402 has authority over its resources and, as illustrated in FIG. 4, is able to apportion that authority among various participants in the resources' use. It should be noted that, for the purpose of illustration consistent with other illustrations and descriptions therein, FIG. 4 shows a computing resource provider 402 having authority over a domain. However, embodiments of the present disclosure are also applicable to other masters of authority domains. For instance, a master of authority may be a government or governmental organization, a sub-organization of another organization or, generally, any entity with authority over some domain.

Returning to the illustrative example of FIG. 4, the computing resource provider 402 manages its authority by allowing different sub-entities to have authority over different sub-domains. For example, as shown in the Figure, each of a number of fault zones 404 of the computing resource provider are provided a corresponding sub-domain of the computing resource provider's 402 domain. Thus, each fault zone may have authority over its own resources, but not resources of another fault zone (although, in some instances authority over some sub-domains may be shared). Thus, in accordance with an embodiment, a fault zone may provide user access to computing resources in the fault zone, but not access to computing resources of another fault zone.

As noted above, each fault zone may include one or more services 406. Accordingly, as illustrated in FIG. 4, each service may be responsible for a sub-domain of the domain of the corresponding fault zone 406. Thus, a service, in an embodiment, can provide access to resources accessible by the service, but not to other services. Each service may serve one or more customers 408 and, therefore, each customer may be responsible for a sub-domain of authority of a corresponding service 406. Thus, in an embodiment, a customer may provide access to its own resources involved with a corresponding service, but not to another customer's service. As a concrete illustrative example, if the service is a virtual computing resource service, a customer may provide access (such as public access) to its own virtual computer systems, but not, without permission, to virtual computer systems of other customers.

As noted, the particular allocation of authority as illustrated in FIG. 4 is for the purpose of illustration and numerous variations are considered as being within the scope of the present disclosure. As noted, embodiments of the present disclosure are applicable to domains of authority outside of domains managed by computing resource providers and sub-domains may be determined according to particular needs and circumstances. Further, FIG. 4 shows customers of a virtual resource provider having the smallest sub-domains of authority. However, techniques of the present disclosure may allow customer domains to be divided into one or more sub-domains.

Figure 5:
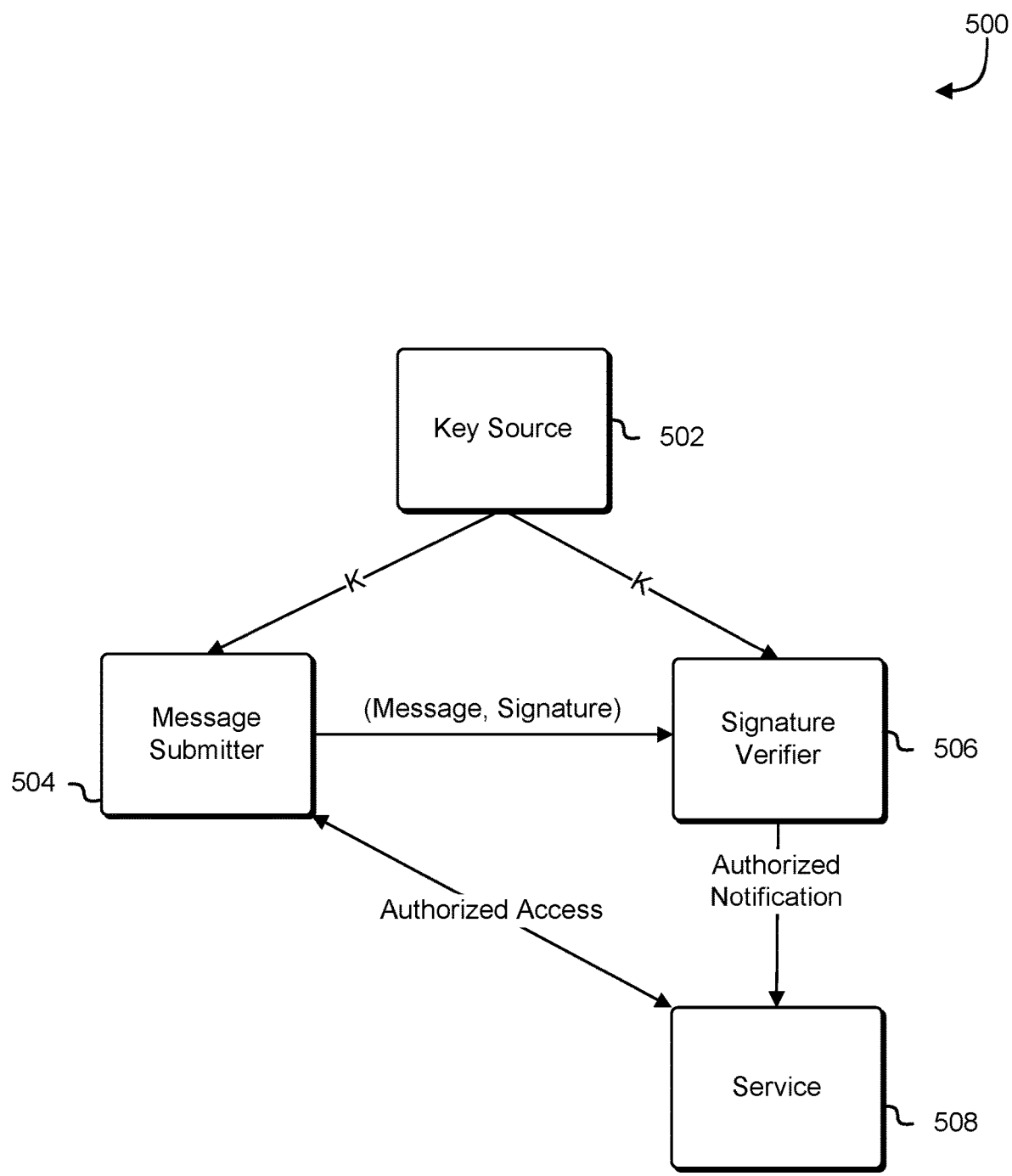
FIG. 5 is a diagram illustrating an example manner in which information may be communicated among participants in a message signature verification process in accordance with at least one embodiment.

Various embodiments of the present disclosure relate to message signatures. FIG. 5 is a diagram 500 illustrating an example manner in which information may be communicated among participants in a message signature verification process in accordance with at least one embodiment. In an embodiment, a key source 502 provides a key to both a message submitter 504 and a signature verifier 506. The key source may be a computer system configured to provide keys to at least the message submitter 504 and the signature verifier 506. The key source may also generate the keys using various techniques, including various embodiments described herein or may obtain generated keys from another source. The message submitter 504 may be a computer system configured to submit a message and a signature to the signature verifier 506 or other component that operates in connection with the signature verifier 506. The computer system of the message submitter 504 may be a computer system of a customer of a computing resource provider, for example. The signature verifier 506 may be a computer system configured to receive messages and signatures and analyze the signature to verify that the message is authentic, as discussed below. Briefly, the signature verifier 506 may analyze a received signature and message to determine if the signature was generated using the correct key K. It should be noted that, while FIG. 5 shows a key source 502 separate from the message submitter 504 and signature verifier 506, either of the message submitter or signature verifier could also be a key source. For example, customers of a computing resource provider may provide their own keys. Customer keys may then be provided to the signature verifier for verification of signatures. In addition, the message submitter 504 and signature verifier 506 may each receive different keys from the key source 502. For example, the message submitter 504 may receive a key and the signature verifier 506 may receive a key that is derived, using the various embodiments of the present disclosure, from the key received by the message submitter 504.

As illustrated in FIG. 5, the signature verifier 506 receives messages and corresponding signatures from the message submitter 504. The messages may be, for example, electronic requests for access to a computing service 508. The messages may, for instance, encode API calls to a web service. If analysis of the signature and message indicates that the messages are authentic, then the signature verifier notifies the service (or a component controlling access to the service) that the message submitter can have the requested access. For example, the signature verifier may pass the received message to the service to enable the service to fulfill the request. Accordingly, the service may be a computer system operable to fulfill requests, such as the various services described above. It should be noted that, while various descriptions of various components of FIG. 5 and other components describe the components as possibly being implemented as computer systems configured to perform certain actions, components may also comprise multiple computing devices, such as networks of computing devices, that are collectively configured to perform the actions.

Figure 6:
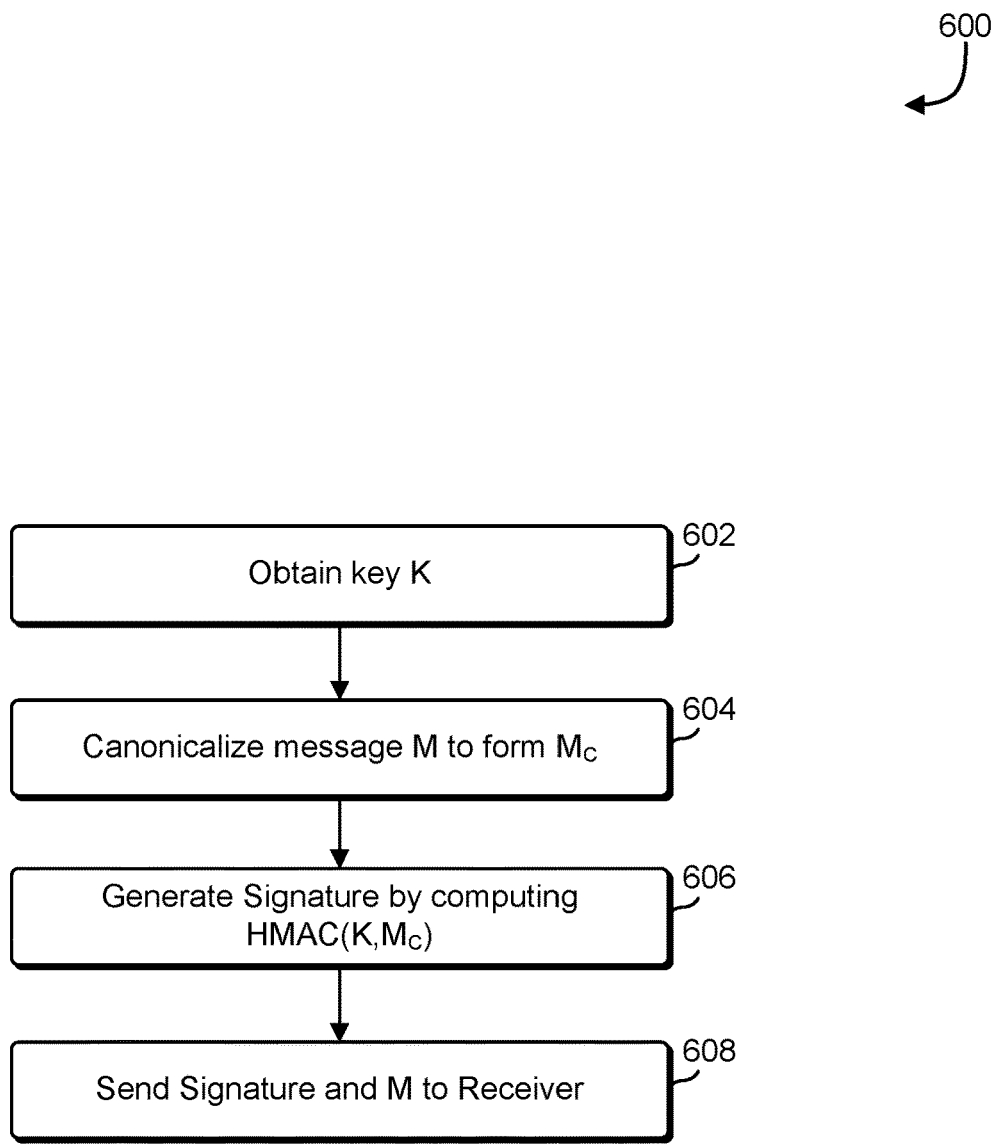
FIG. 6 is a flowchart showing an illustrative example of a process for signing messages in accordance with an embodiment.

FIG. 6 is a flowchart showing an illustrative example of a process 600 for signing messages in accordance with an embodiment. Some or all of the process 600 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, the process 600 includes obtaining 601 a key K. The key can be obtained in any suitable manner. For example, the key may be generated by a computer system performing the process 600. The key may be electronically received by a computer system performing the process 600. Generally, obtaining the key may be performed in any suitable manner. The key may be any suitable key for a particular signature algorithm being utilized. For example, if a hash-based message authentication code (HMAC) scheme is being used with a secure hash algorithm (SHA)-256 cryptographic hash function, the key may be a sequence of bytes, such as a sequence of 64 or fewer bytes. Different cryptographic hash functions, such as SHA-224, SHA-384, and SHA-512 may also be used.

In an embodiment, the process also includes canonicalizing a message M to form a canonicalized message $M_c$. Canonicalizing a message may include arranging information in the message in a format that allows a verifier to verify whether a signature of the message is valid. Generally, many information communication protocols transform the bits that comprise a message while leaving the message semantically identical. As a result, two semantically identical messages may comprise different sets of bits and, therefore, may result in different signatures. Accordingly, canonicalization allows for a straightforward way of ensuring that a signature can be verified. It should be noted, however, that some embodiments of the present disclosure do not require message canonicalization. For example, if various protocols being utilized do not result in semantically identical messages comprising different sets of bits, canonicalization may not be necessary and may be omitted. Generally, canonicalization may be omitted in any instance where signature verification is able to proceed successfully without manipulation of a signed message.

In an embodiment, a signature is generated by computing HMAC(K, $M_c$), where HMAC( ) is an HMAC function, such as described above. HMAC functions have several properties that make them particularly useful for various embodiments of the present disclosure. For example, HMAC functions can be computed efficiently by a computer system, thereby leaving computing resources available for other tasks. In addition, HMAC functions are preimage resistant (non-invertable). For instance, given a signature S=HMAC(K, M) with K a key and M a message, essentially no information is gained about the key K. For example, from S it would be computationally impossible or at least impractical to determine K from S. HMAC functions are also second preimage resistant. In other words, given S=HMAC (K, M) and M, it is impossible or at least computationally impractical to determine a message M' different from M such that S=HMAC(K,M'). In addition, HMAC functions are forgery-resistant. For instance, given an oracle for S=HMAC(K, M), querying the oracle N times (N a positive integer) allows for the production of at most N signature-message pairs. In other words, given a set of signature-message pairs, it is impossible or computationally impractical to determine the key or determine a function that will produce a correct signature for a message not in the set.

While HMAC functions are particularly useful for various embodiments, other functions can be used. For example, any function with the above properties of HMAC functions may be used. In addition, other functions that do not necessarily have all (or any) of the above properties can be used, such as in circumstances where security is not of primary concern and/or where security is a concern, but is maintained through other mechanisms. It should be noted that various illustrations of various embodiments show specific inputs into HMAC functions, but that variations are possible. For example, the inputs to an HMAC function (or other function) may be different. As described above, for instance, one input is a key. However, this input may be derived from a key or otherwise based at least in part on a key. As an illustrative example, input may comprise a key with information, such as a signature scheme identifier (perhaps a version identifier), that is added to the key as a suffix, prefix, or otherwise. As another example, input may be information that is obtained by use of a mapping of the key to the information, which may be another key. Similarly an input shown as a message may be derived from a message. As another example variation considered as being within the scope of the present disclosure, the signature may not be the output of an HMAC function, but one or more values that are derived from the output of a HMAC function (or other suitable function). In some embodiments, the key and the message may be passed into the function in the reverse order.

Returning to the description of FIG. 6, once the signature is generated by computing HMAC(K,Mc), the signature and message M are provided 608 to a receiver, which may be a computing device that verifies signatures or another computing device involved in a signature verification process, such as a computing device providing an interface for communication of messages and signatures. As with all embodiments explicitly described herein, variations are considered as being within the scope of the present disclosure. For example, the canonicalized message $M_C$ may be provided to the receiver instead of or in addition to the message M. In addition, providing the message M and the signature to the receiver may also include providing other information, such as a key identifier that may be used to identify, in a data store that associates keys with key identifiers. Further, other information, such as parameters that encode policy, as discussed below, may be provided with the message M and signature.

Figure 7:
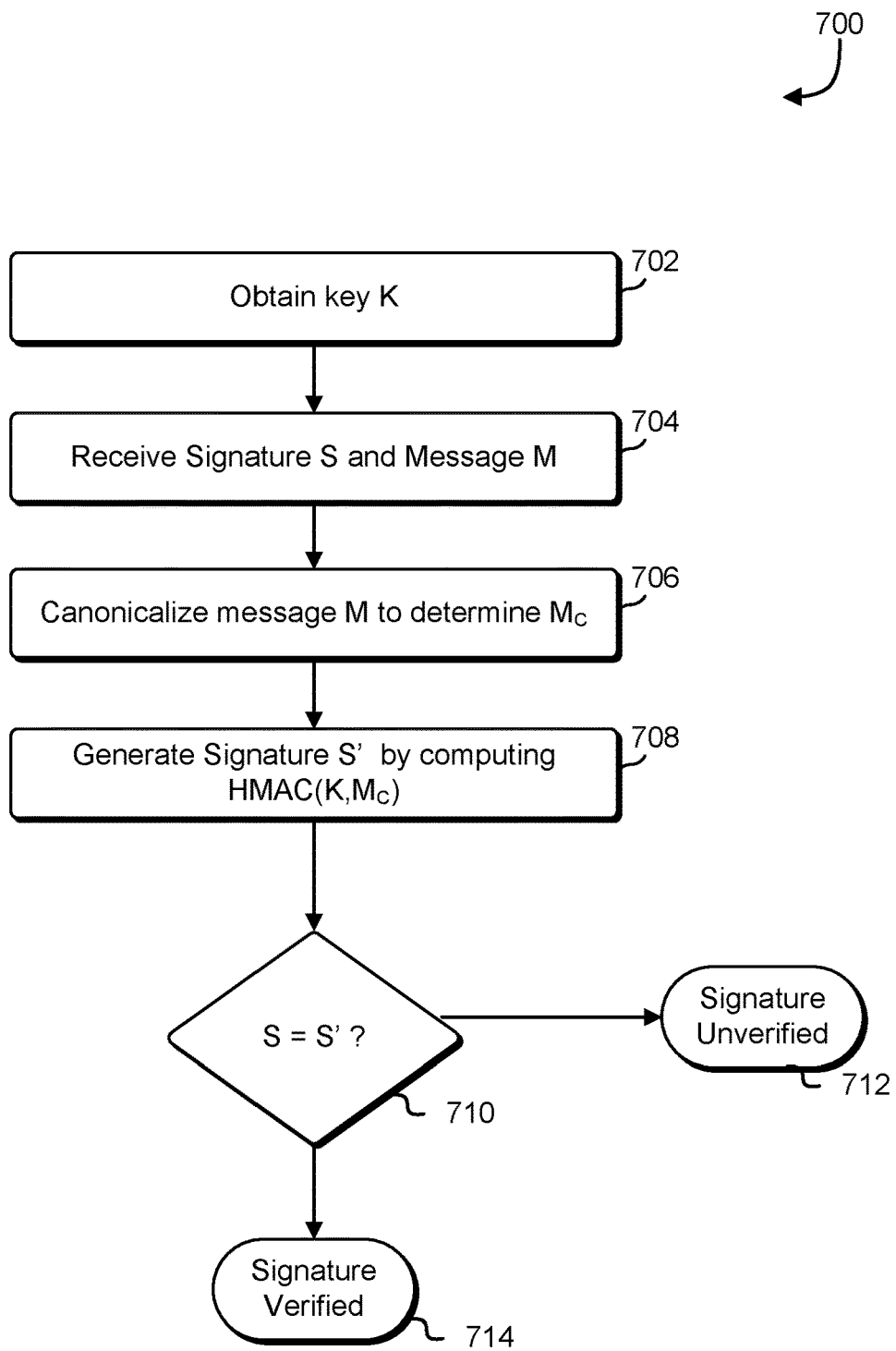
FIG. 7 is a flowchart showing an illustrative example of a process for signature verification in accordance with at least one embodiment.

FIG. 7 is a flowchart showing an illustrative example of a process 700 for signature verification in accordance with at least one embodiment. The process 700 shown in FIG. 7 may be performed by a verifier, such as described in FIG. 2. Further, the process 700 may be performed in response to receipt of a signature and a message, such as in response to another computer system having performed the process 600 of FIG. 6. In an embodiment, the process 700 includes obtaining 702 a key K, such as described above. Obtaining a key K may also include other actions in various embodiments. For instance, if the process 700 is used by a computer system that verifies signatures generated from multiple keys (such as from multiple customers of a computing resource provider), obtaining the key K may include selecting the key from multiple keys in a data store. The data store may associate various keys with those that submit signatures for verification. For instance, each customer of a computing resource provider may have a key identifier (or several key identifiers) that is used to reference a data store and identify an appropriate key. The key identifier may be submitted in connection with submission of the message and its signature or may be otherwise determined, such as upon submission of login credentials. A recipient of a key identifier (e.g. a message verifier) may reference a data store to determine whether a key corresponding to the key identifier is in the data store and, if not, may then generate the key itself, such as by using the techniques described herein to derive the key directly or indirectly from a shared secret credential. To enable this, the recipient may have access to a key derivation path which, in an embodiment, is information that encodes information necessary to derive the key from the information the recipient already has (e.g. a key derived from a shared secret credential). This information may be provided to the recipient form a submitter of a message with a signature or otherwise may be made available to the recipient. For instance, the recipient may be programmed to automatically generate keys using its assigned region and a code for the current date. Generally, any method of obtaining the key that was used to generate the signature (or another key that can be used to verify the signature, in some embodiments) can be used. The receiver might also enforce policy regarding permissible and impermissible key derivation paths with respect to the request at hand or some other property known to the receiver.

In an embodiment, a signature S and message M are received 704. The signature S and message M may be received electronically from a submitter, such as a computing device that performed the process 700 of FIG. 7. The message M is then canonicalized 706 to determine $M_c$, in accordance with an embodiment. Canonicalization of the message M, in various embodiments, ensures that the signature S can be verified. Accordingly, in an embodiment, the process 700 includes generating 708 a signature S' by computing HMAC(K, $M_c$). In an embodiment, S' is equal to HMAC(K, $M_c$), although S' can be derived from HMAC(K, Mc), in various embodiments. For the purpose of illustration, the remainder of the process 700 will be described with the assumption that S'=HMAC(K, $M_c$), but that numerous variations are within the scope of the present disclosure.

Accordingly, in an embodiment, a determination is made 710 whether S' is equal to the received signature S. In other words, a determination is made whether the received signature is sufficient, for example, because it is a signature that was generated using the key K. Thus, in an embodiment, if it is determined 710 that S' and S are not equal, then the signature is 712 unverified. However, if the S' is equal to S, then the signature is 714 verified. Depending on whether the signature is verified, appropriate action may be taken. For instance, if the message was a request for access to a computing resource, the requested access may be denied (at least temporarily). Similarly, if the message was a request for access to the computing resource and the signature was verified, the requested access may be granted. It should be noted, however, that the appropriate action to be taken can vary widely in various embodiments depending on the reason(s) signatures are received and verified.

Figure 8:
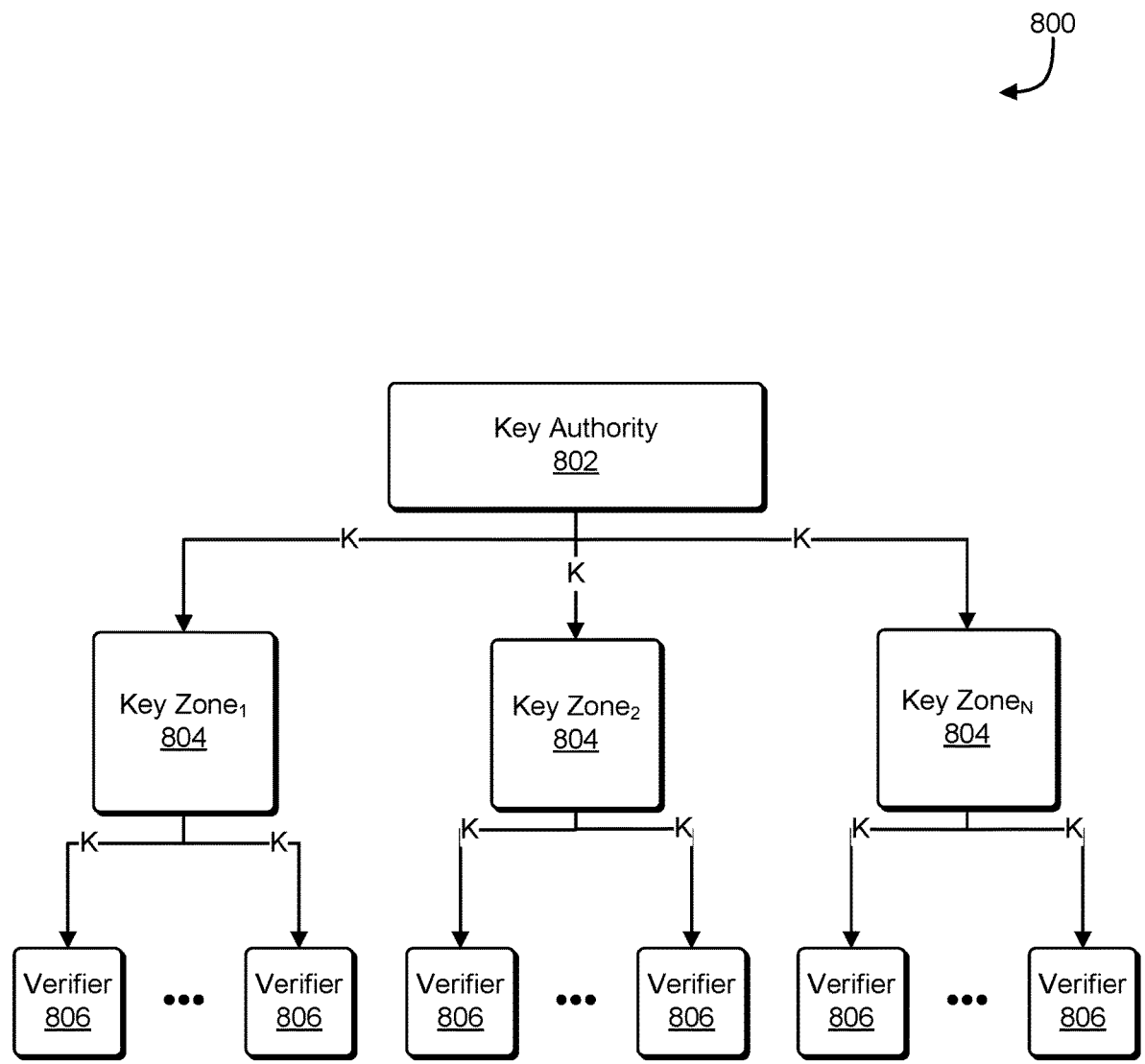
FIG. 8 is a diagram illustrating an example manner of distributing keys in accordance with at least one embodiment.

As noted above, various embodiments of the present disclosure apply to numerous environments. In many environments, it is useful to have centralized management of various aspects of security maintenance. FIG. 8, for example, is a diagram 800 illustrating an example manner of distributing keys in accordance with at least one embodiment. In FIG. 8, a central key authority maintains one or more data stores (collectively referred to as a "data store") that contain various keys utilized by an organization. The keys may correspond, for example, to users of computing devices of the organization. Each user of a set of users may, for instance, be assigned one or more keys. In an embodiment, at least some keys correspond to customers (and/or users of the customers) of the organization. For instance, in an embodiment, the organization is a computing resource provider and each customer of the computing resource provider corresponds to one or more keys that allow the customers' users to access computing resources maintained by the computing resource provider. Other adaptations of the process 800 of FIG. 8 in accordance with the variations described above with FIG. 7 are also within the scope of the present disclosure.

As illustrated in FIG. 8, the key authority 802 propagates keys to a plurality of key zones 804. A key zone may be a domain of the organization in which a received key is valid. For example, referring to FIG. 2, each key zone 804 may correspond to a fault zone, such as a data center. Key zones may be, but are not necessarily, geographically defined. For example, each key zone may correspond to a country, region, or other geographically defined region. Key zones may also be defined in other ways. For example, each key zone may correspond to a service provided by a computing resource provider, to a customer of an organization, and the like. While not illustrated as such, key zones may have sub-zones. For example, a key zone may correspond to a country. Inside the country may be multiple regions, each corresponding to sub-zones of the key zone. Keys may be propagated to sub-zones in such embodiments.

As illustrated in FIG. 8, key zones 804 may propagate keys to one or more verifiers 806 for the key zone. For instance, if a key zone corresponds to a data center, a computing device of the data center may propagate keys to verifiers for each of a plurality of services supported by computing resources in the data center. In this manner, the verifiers can be used to verify signatures submitted in connection with various requests. This relieves the computing resources of the key authority themselves from verifying signatures and also reduces latency and bandwidth requirements, especially in instances where the key authority 802 is geographically distant from services to which requests are made.

Key propagation may be made in various ways. In an embodiment, keys are distributed over secure channels to various recipients. In some embodiments, the key authority propagates the same keys to each key zone. Also, some keys may be usable in multiple key zones. The key authority 802 may propagate keys usable in multiple key zones to those multiple key zones while refraining from propagating those keys to key zones where the keys cannot be used. Thus, in the example of a computing resource provider, the key authority 802 may propagate a key for a customer only to those key zones where the customer is able to use the key, such as data centers used to maintain computing resources of the customer.

Figure 9:
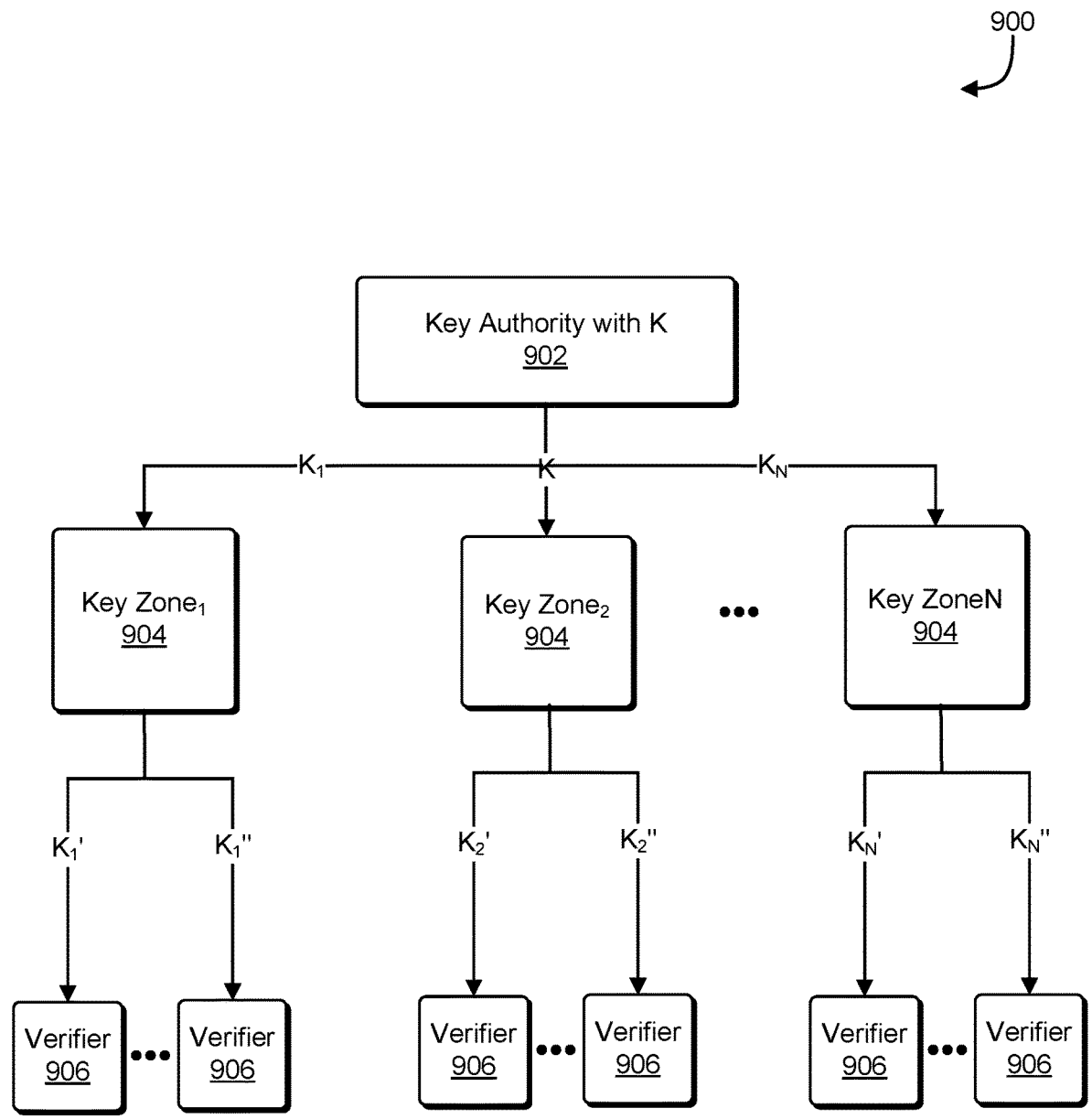
FIG. 9 is a diagram illustrating an example manner of distributing keys in a manner that provides various scopes of authority in accordance with at least one embodiment.

Various embodiments of the present disclosure also provide for key propagation in manners providing for numerous advantages. FIG. 9 is a diagram 900 illustrating an example manner of distributing keys in a manner that provides various scopes of authority in accordance with at least one embodiment. As with FIG. 9, the diagram 900 includes a key authority 902 with a key K that propagates keys, directly or indirectly, to various key zones 904 and verifiers 906, such as in accordance with the above description in connection with FIG. 8. While, for the purpose of illustration, the diagram 900 is described in connection with a single key K, and keys derived from K, the embodiments described herein apply when the key authority performs such actions for numerous keys.

As illustrated in FIG. 9, the key K is used as a basis for other keys derived from K. For example, from K, a key $K_1$ is derived and propagated to a first key zone (Key Zone$_1$). As such, the key $K_1$ (or keys derived from the key $K_1$) is usable in the first key zone, but not in other key zones that do not have $K_1$ (or a key derived from the key $K_1$). Similarly, each of a number of other key zones receive corresponding different keys derived from the key K. It should be noted that, while FIG. 9 shows keys derived from the key K being propagated from the key authority 902 to corresponding key zones, variations are possible. For example, the key K may be propagated to the key zones and each key zone that receives the key K may use the key K to derive one or more corresponding keys. For example, the key zone 904 labeled "Key Zone$_1$" may receive the key K and derive $K_1$. Generally, various tasks involved in key derivation and propagation may be performed differently than illustrated in various embodiments.

As shown in the illustrative example of FIG. 9, the keys received by the key zones 904 are used to derive keys that are propagated further. For example, referring to the key zone 904 labeled "Key Zone$_2$," a key $K_2$ that is derived from the key K is used to derive additional keys $K_2'$ and $K_2''$. The keys $K_2'$ and $K_2''$ are propagated to corresponding verifiers 906 for use by the verifiers 906 in verifying signatures. Thus, a verifier that receives $K_2'$ would, in an embodiment, be able to verify a signature generated using $K_2'$, whereas a verifier that did not receive $K_2'$ would not be able to verify the signature. By propagating the keys in the manner illustrated in FIGS. 8 and 9 (or variations thereof) advantages are achieved. For instance, by propagating the keys to numerous verifiers in multiple locations instead of one or more centralized verifiers, lower latency is achieved. In addition, referring to FIG. 9, by propagating derived keys to other devices that, in turn, derive additional keys, it is possible to spread computations over multiple devices over multiple locations, thereby allowing for faster key derivation and increasing fault tolerance.

Figure 10:
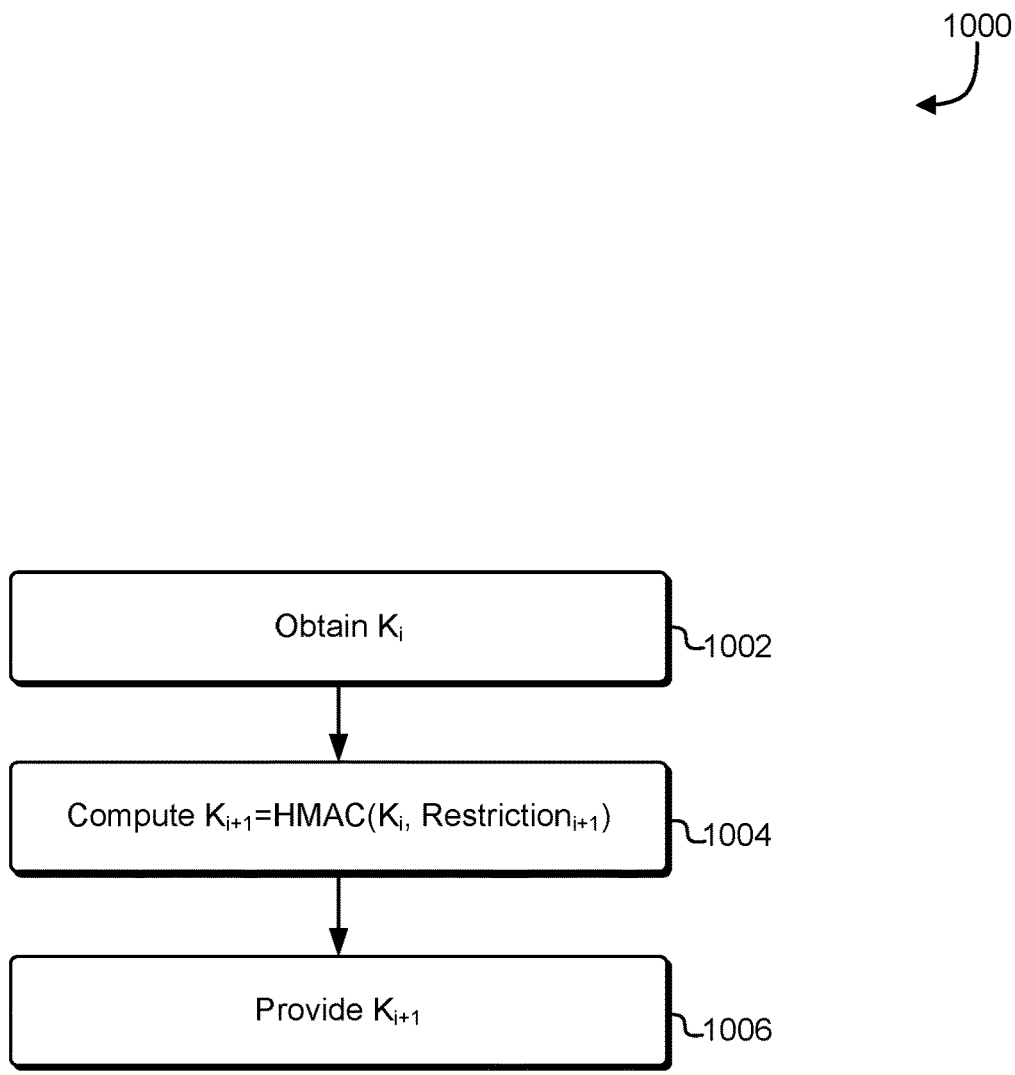
FIG. 10 is a flowchart showing an illustrative example of a process of key derivation in accordance with at least one embodiment.

Derivations of keys may be performed in numerous ways. FIG. 10 is a flowchart showing an illustrative example of a process 1000 of key derivation in accordance with at least one embodiment. In an embodiment, the process 100 includes obtaining 1002 a key $K_i$, such as in a manner described above. The key $K_i$ may be any suitable key, such as described above. In addition, the key $K_i$ may be, but is not necessarily, derived from another key, such as by performance of the process 1000 or another process. Upon obtaining the key $K_i$, a new key is derived from $K_i$. In the illustrative example of FIG. 10, a new key K $K_{i+1}$ is computed as (or based at least in part on) HMAC($K_i$, $R_{i+1}$), where $R_{i+1}$ is information identifying one or more restrictions on the key $K_{i+1}$. $R_{i+1}$ may be, for instance, a sequence of bits that encodes information indicating where the key $K_{i+1}$ is usable. For example, $R_{i+1}$ may encode a key zone where the key $K_{i+1}$ may be used. Restrictions may be based at least in part on geography, time, user identity, service, and the like. Example restrictions are provided in the description below.

Further, as discussed more below, the process 1000 may be used multiple times to derive a key. For example, a key generated using the process 1000 (or a variation thereof) may be used to generate another key, using the same or another restriction. Using the terminology in the figure, $R_{i+1}$ may be, for instance, a sequence of bits that encodes information indicating where the key $K_{i+1}$ could be used. $K_{i+1}$ would become the key $K_i$ for a next iteration of the process. For example, if the process 1000 was used to generate a key based on a geographic restriction, the key generated may be used to generate a key with a date-based restriction. Such a process may be utilized multiple times to use multiple restrictions to derive a key. As discussed more fully below, by using multiple restrictions to derive a key, one or more verifiers can enforce policy while verifying signatures. As a brief illustrative example, as part of a signature verification process, a verifier may determine an expected signature using a restriction, such as an encoding of a current date. If a signature was provided that was generated on a different date, then verification of the signature would fail, in accordance with an embodiment. Generally, if use of a signature does not comply with a restriction used to derive a key, signature verification may fail in accordance with various embodiments.

Figure 11:
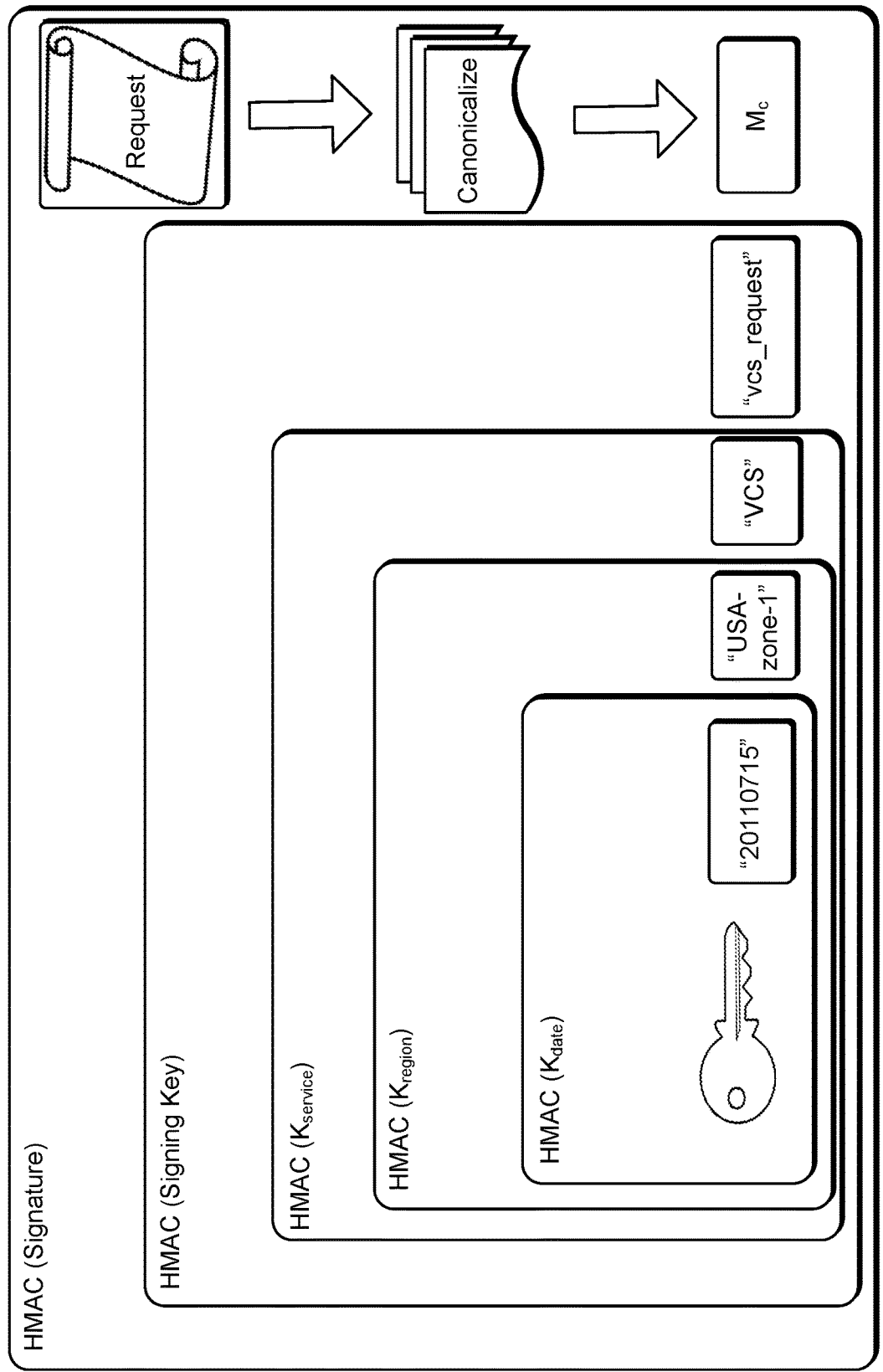
FIG. 11 is a diagram illustrating multiple-restriction key derivations in accordance with at least one embodiment.

FIG. 11 is a diagram 1100 showing an illustrative example of a derivation of a key using multiple restrictions in accordance with at least one embodiment. In FIG. 11, a key is derived using multiple restrictions. In this example, a key and a date restriction are used to determine a date key (Kdate, in the figure). In the figure, the date is encoded as 20110715, corresponding to Jul. 15, 2011, although dates may be encoded differently and, generally, information may be encoded differently than illustrated in the figures. The date key is used with a regional restriction to derive a regional key, Kregion. In this example, the region is encoded with a regional identifier "USA-zone-1," which may correspond one of several regions in the United States. The key Kregion is used with a service restriction to derive a service key, KService. In this example, the service is a virtual computer system service, encoded by its acronym VCS. The key KService is used with a request identifier to derive a signing key, that is, a key used to sign requests to a service. In this example, the request identifier is "vcs_request" which may correspond to a particular type of request that may be submitted to the VCS service. For instance, "vcs_request" may correspond to a request to provision, stop, or otherwise modify a virtual computer system. The signing key is used to generate a signature that may be submitted with requests. The signature may be generated in any suitable manner, such as described above.

As illustrated in FIG. 11, the request may be canonicalized to form a message, $M_c$, which is input into an HMAC function to generate the signature. Of course, variations, including variations where canonicalization is not necessary and where functions other than HMAC functions are used, may be utilized in accordance with various embodiments. In addition, FIG. 11 shows a particular example derivation of a signature in accordance with an embodiment. However, more or fewer restrictions may be used in deriving the signature and restrictions may be used in a different order than illustrated. In addition, while FIG. 11 shows derivation of a signature, the techniques may be applied to derive other objects that may not be considered signatures in all applications. For example, the techniques illustrated in FIG. 11 (and elsewhere) may be used generally to derive keys.

Figure 12:
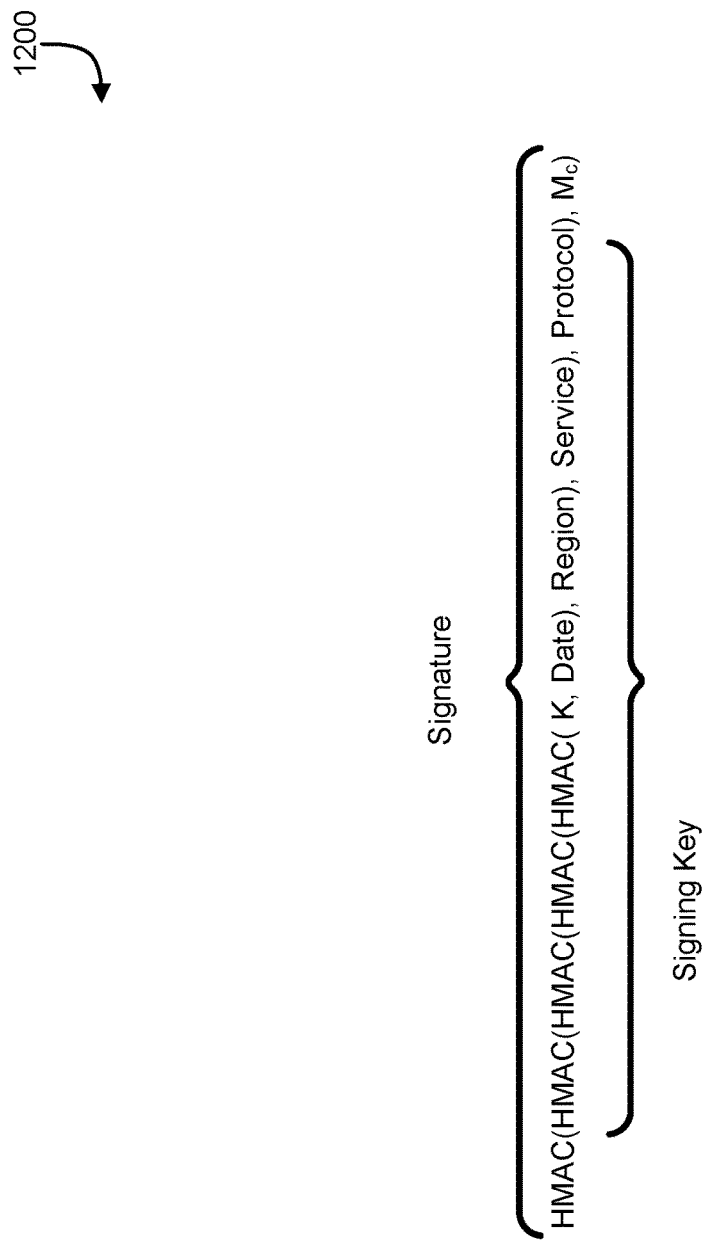
FIG. 12 is an illustrative example of a function for deriving a signature, in accordance with at least one embodiment.

FIG. 12 is an illustrative example of a function 1200 for deriving a signature, in accordance with at least one embodiment. As illustrated in FIG. 12, the signature is calculated as:

HMAC(HMAC(HMAC(HMAC(HMAC($K$,date),region),service),protocol),$Mc$).

In this example, K is a key, "date" is an encoding of a date, "region" is an encoding of an identifier of a region, "service" is an encoding of an identifier of a service, "protocol" corresponds to a particular message encoding protocol, and Mc is a canonicalized message. Thus, as illustrated in FIG. 12, the signature is computed by computing the same HMAC function multiple times, each time with a different restriction as an input to the HMAC function. The signing key, in this example, is:

HMAC(HMAC(HMAC(HMAC($K$,date),region),service),protocol)

which itself is derived by use of the HMAC function multiple times, each time with a different restriction. With a signing key derived in this manner, it can be said that the signing key is specialized along a key path, the key path referring to the information (such as a restriction) used as an operand. For instance, the key path for the example of FIG. 12 may be referred to as "date/region/service/protocol." Keys specialized using different values for "date," "region," "service," and/or "protocol" would, therefore, produce different keys specialized different key paths. In this manner, the keys form a key-tree where key paths correspond to paths in the tree and nodes in the tree correspond to keys where each non-root key is derived using a key directly connected to the non-root key that is higher in the tree. In this manner, each non-root key in the key tree is derived based at least in part on each key that is both in the same key path that connects the non-root key to the root key and higher in the tree.

In the example of FIG. 12, the various restrictions each define a domain and the intersection of the defined domains defines the manner in which the signature generated with the signing key would be valid. In this specific example, a signature generated with the signing key illustrated in FIG. 12 would be valid on the date specified, in the region specified, and for the service specified using the protocol specified. Thus, if a request is signed using the signing key, but on a different date than specified by the input to the signing key, the signature to the request may be considered unverified, even if the request was made for the specified service and in the specified region.

As with other embodiments described herein, variations are considered as being within the scope of the present disclosure. For instance, FIG. 12 shows repeated use of an HMAC function. Multiple functions may be used to derive a signature and, in some embodiments, HMAC functions are not used in every part of the derivation. Also, as noted, different restrictions, different functions, and different numbers of restrictions may also be used in various embodiments.

Key derivation may be performed in numerous ways in accordance with various embodiments. For instance, a single computing device could compute a signing key, in accordance with some embodiments. In accordance with other embodiments, multiple computing devices may collectively compute a signing key. As a specific illustrative example, referring to FIG. 12, one computer may compute $K$region=HMAC(HMAC($K$,date),region)

and another computer may compute

Signing Key=HMAC($K$region,Service).

As another example, a separate computer system may perform a different layer in the computation of the signing key. Referring to the example in the previous paragraph, instead of a single computer computing Kregion, one computer may compute $K$date=HMAC($K$,date)

and another computer may compute $K$region=HMAC($K$date,region).

Figure 13:
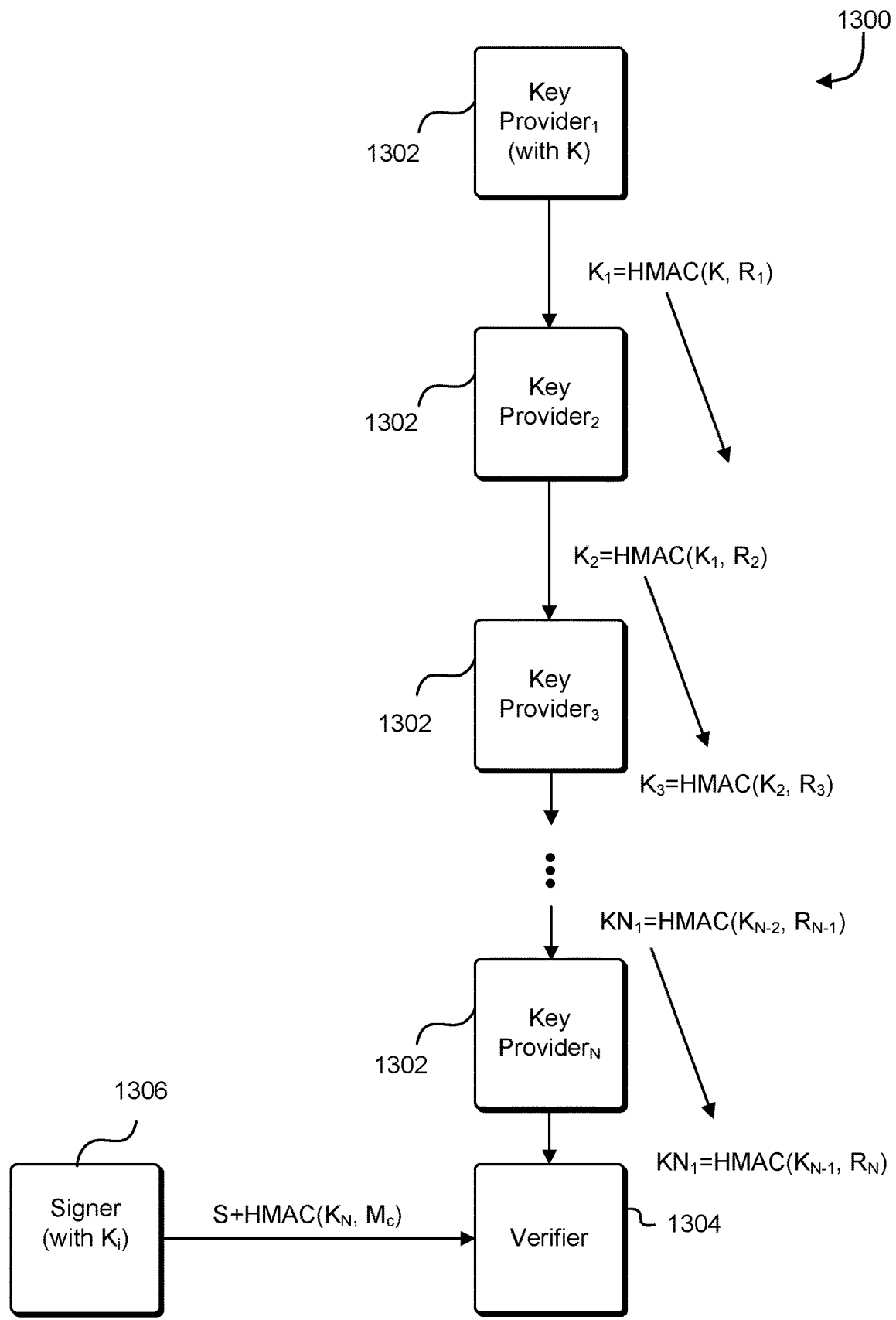
FIG. 13 is an illustrative example of how multiple key derivation may be performed and used in accordance with at least one embodiment

FIG. 13 is an illustrative example of how multiple key derivation may be performed and used in accordance with at least one embodiment. In particular, FIG. 13 shows an example diagram 1500 illustrating members of a distributed set of computer systems collectively computing a signing key (or other key, in various other embodiments). As shown in FIG. 13, each member of the set is a key provider computer system 1302 that generates a key and provides the generated key to another computer system. For example, a key provider labeled Key Provider$_1$ obtains a key K (from another source, or by generating the key itself), and uses the key and a restriction, labeled $R_1$ to generate a key $K_1$. Key Provider$_1$ passes the key $K_1$ to Key Provider$_2$, which uses $K_2$ and another restriction, $R_2$, to generate another key $K_2$. Key Provider$_2$ passes the key K$_2$ to Key Provider$_3$, which uses K$_3$ and another restriction, R$_3$, to generate another key K$_3$. Depending on how many key providers there are in a particular embodiment, this process may continue until Key Provider$_{N-1}$ passes a key K$_{N-1}$ to Key Provider$_N$, which uses K$_{N-1}$ and another restriction, R$_N$, to generate another a signing Key, K$_N$. The key K$_N$ is then passed to a verifier computer system 1304. The key K or any key(s) derived from K (generally referred to as K$_i$ in the figure) may also be passed to a signer computer system 1306, such as through a secure key-exchange algorithm.

The signer computer system 1306 may also, in various embodiments, generate K$_N$ on its own if, for example, the restrictions R$_1$-R$_N$ are made available to the signer and/or made publicly available. In addition, the signer computer system 1306 may perform only part of the process for deriving K$_N$ on its own in various embodiments. For instance, the signer may obtain (perhaps from an appropriate key provider computer system) K$_i$, for some integer i that is less than N and restrictions R$_{i+1}$ through R$_N$. The signer may then use K$_i$ and restrictions R$_{i+1}$ through R$_N$ to generate the signing key, K$_N$. Other variations are also considered as being within the scope of the present disclosure.

The signer computer system 1306 may use the key K$_N$ to sign messages to be verified by the verifier 1304. For instance, as illustrated, the signer 1306 computes the signature S=HMAC(K$_N$, M$_C$), where M$_C$ is a canonicalized version of a message M, also sent to the verifier. Because the verifier has K$_N$, the verifier can independently canonicalize the message M and compute HMAC(K$_N$, M$_C$) to determine if the result of the computation matches the received signature S.

It should be noted that variations of the process illustrated in FIG. 13, and other processes described herein, while shown as involving multiple use of HMAC functions, multiple different functions may be used to derive keys. For instance, different types of message authentication code (MAC) functions may be used at different times in deriving a key. For example, the output of one type of MAC function may be used as the basis for input into another type of MAC function. Generally, other types of functions may be used instead of and/or in addition to HMAC functions in a key derivation process and, in various embodiments, it is not necessary to use the same type of function multiple times to derive a key, but different functions may be used each time a function is required.

The techniques described above (which are further described in U.S. patent Ser. No. 13/248,962, filed on Sep. 29, 2011 and titled Parameter Based Key Derivation), and variations thereof, may be used to construct keys that are usable for actions that depend on multiple authorities. For example, the above techniques may be modified to provide a key that is derived from multiple keys, each belonging to a corresponding authority and where at least one of the keys is not accessible by at least one of the authorities. As a concrete example, variations of the above techniques may be used to generate a key that is valid only if it is derived from two keys, each accessible by an authority but inaccessible to the other authority. A key holder of such a key may thereby be able to prove access to both keys and, therefore, validity of the key.

Figure 14:
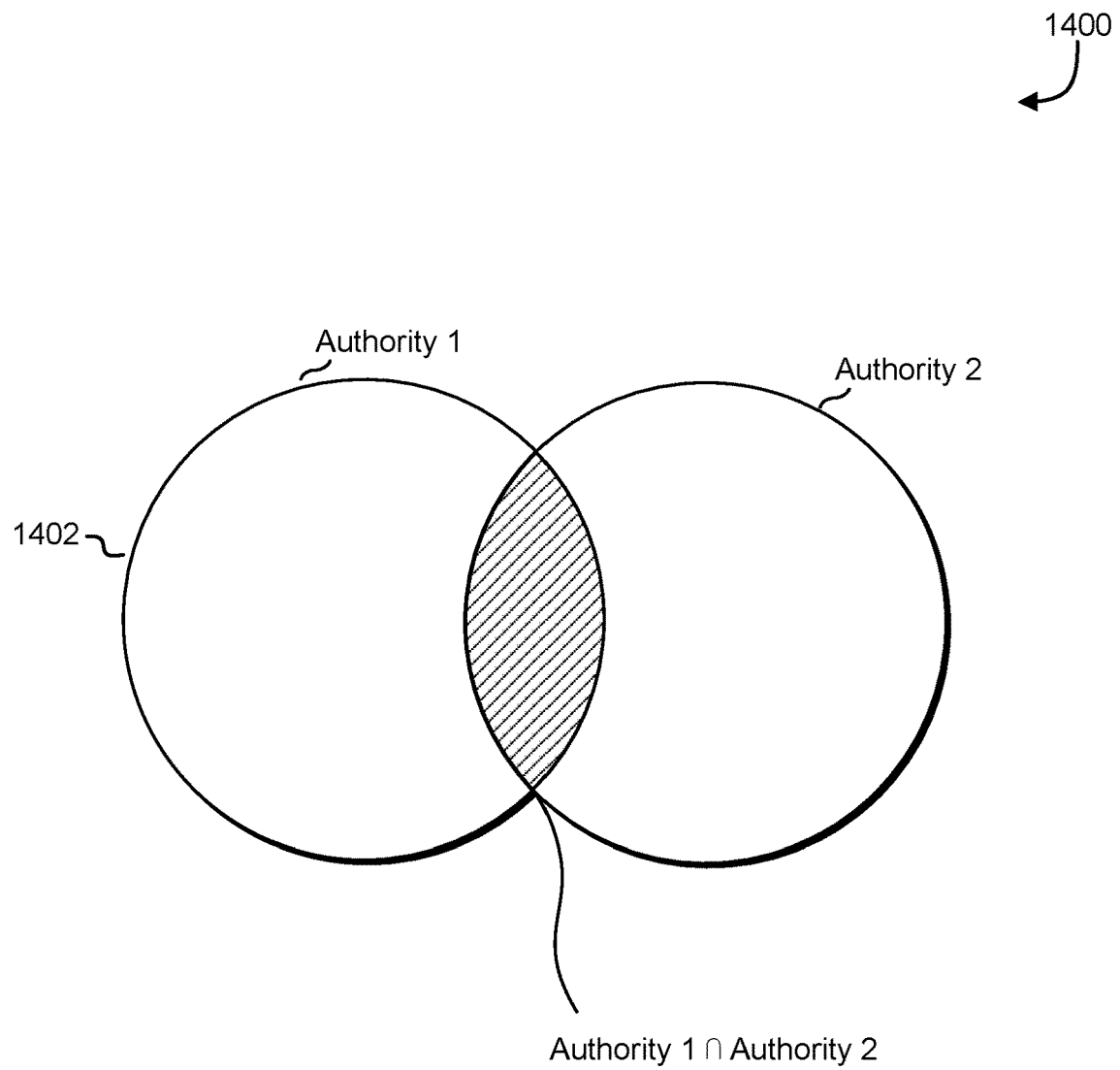
FIG. 14 is an illustrative example of how information from multiple authorities may be utilized, in accordance with at least one embodiment.

In many instances, it is desirable for the performance of certain actions to be requisite on involvement of multiple authorities. For example, the accomplishment of an act may require the use of two separate services. For security purposes, the two services may, for various reasons, be mutually distrustful of one another or perhaps one of the systems does not trust the other. Therefore, key sharing among the systems may be restricted accordingly. FIG. 14, for example, shows circles that each represent the domain of authority of a corresponding authority. The authorities in FIG. 14 are labeled Authority 1 and Authority 2. As illustrated in FIG. 14, the domain of Authority 1 includes a domain over which Authority 1 is the sole authority and a subdomain over which Authority 1 and Authority 2 are jointly responsible. Authority 2 likewise includes a portion of its domain over which Authority 2 has sole authority. As shown in FIG. 14, for example, the intersection of the domains of Authority 1 and Authority 2 may correspond to actions for which permission must be granted from both Authority 1 and Authority 2 for the actions to occur.

Figure 15:
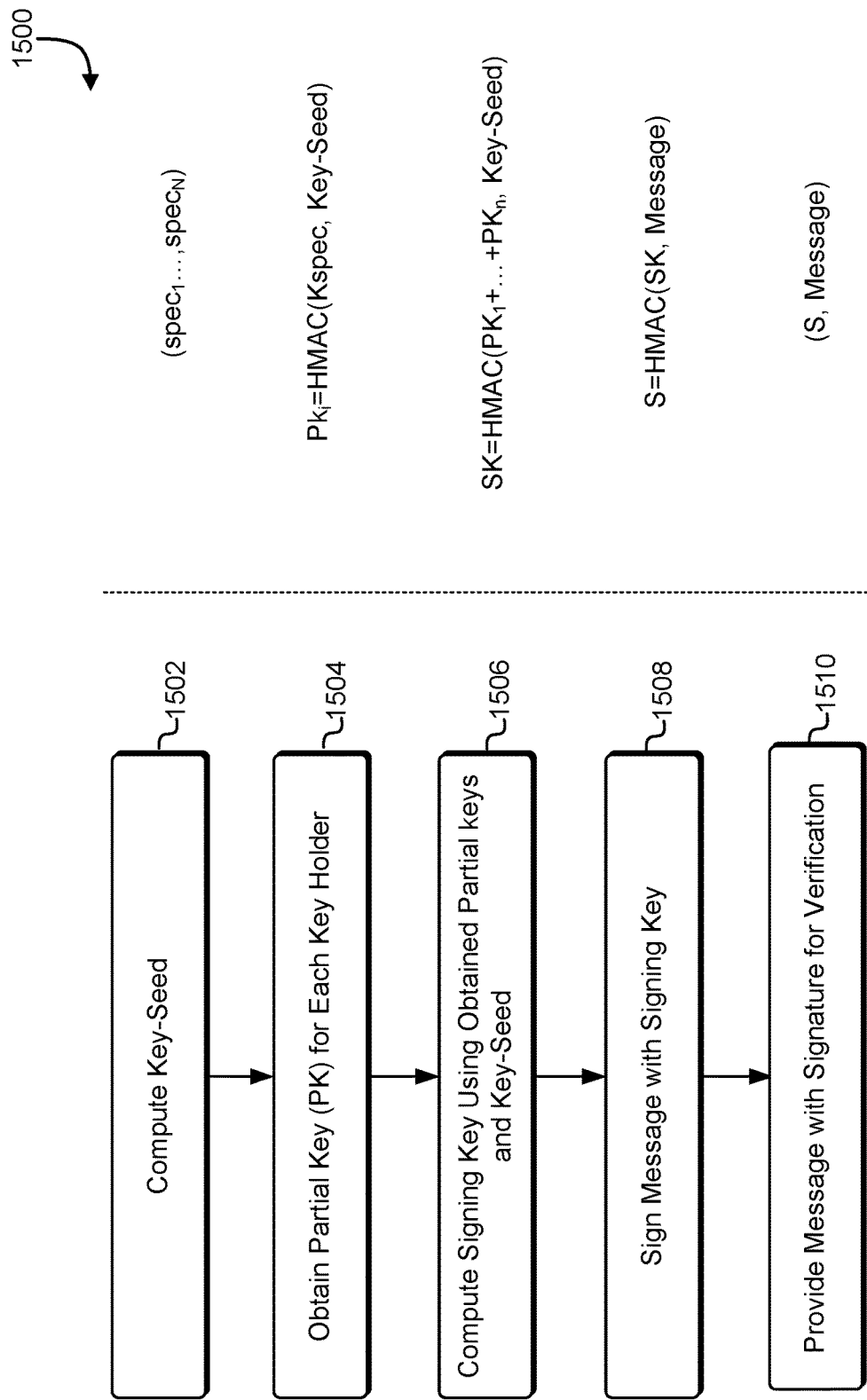
FIG. 15 is a flowchart illustrating message signing using keys from multiple authorities, in accordance with at least one embodiment.

FIG. 15, accordingly, shows an illustrative example of a process 1500 that may be used to sign messages where participation from multiple authorities is required for signature validation. To the right-hand side of FIG. 15, example calculations which may be performed as part of the process 1500 are provided for the purpose of illustration, but it should be understood that numerous variations are considered as being within the scope of the present disclosure. The process 1500 and variations thereof may be performed by a suitable computing device such as a computing device configured to sign messages such as described above and elsewhere herein. In an embodiment, the process 1500 includes computation 1502 of information referred to herein as a key-seed. The key-seed, in an embodiment, is a vector that encodes a key path for each of multiple authorities. For example, a key-seed may be a vector each entry of which encodes a key path. A key path may be encoded, for example, as a series of restrictions on key use, each separated by a delimiter such as a slash or a comma. In one specific example, the key-seed may take the form of:

$$(\text{spec}_1, \ldots, \text{spec}_N)$$

where spec$_i$ may be an encoding of a key path. The key path may include information for each node in the key path, the information for each node being separated from the information for another node by a delimiter. The information may be ordered, such as according to the order of the nodes in a corresponding key hierarchy. The information for one or more or all of the spec$_i$ may be public information or at least information to parties participating in performance of the process 1500. In addition, a key-seed may, but does not necessarily, encode one or more restrictions that are meaningful to one or more participating authorities and/or a recipient of a message signed using, in part, the key-seed. With this latter variation, the techniques described herein may be adapted to accomplish dual (or higher-dimensional) control where each involved authority specifically agrees to an action (rather than originally intended scope of use).

Encoding the key-seed in this manner, in an embodiment, results in the key-seed being a logical statement of the precise key use, that is, full restriction among all authorized keys that a key holder is authorizing by producing a signature. In an embodiment, the process 1500 includes obtaining 1504 a partial key for each key holder including, in some embodiments, a partial key for a message signor performing the process 1500. A partial key for a key holder in an embodiment is a key specialized along a key path for a specific key holder. For example, an authority may have a key which is secret to that authority and perhaps a higher authority, such as a key authority, that is, an authority operable to generate and/or distribute keys for use and/or derivation of other keys. By encoding restrictions into that key, such as by using techniques described above, a partial key may be generated. Continuing the present example, a partial key may have the form:

$Pk_i$=HMAC($K$spec$_i$,Key-Seed)

where $K$spec$_i$ is a key specialized along the path corresponding to spec$_i$.

Obtaining the partial key for each key holder may be performed in various ways. For example, when each key holder is separated from a device performing the process 1500 by a network, each key holder may transmit their partial keys electronically over the network in a message or other transmission that encodes the partial key. As another example, information from which the partial key may be obtained may be transmitted to a computing device performing the method 1500. For instance, in an embodiment where specializing a key down a key path involves multiple indications of an HMAC process, information resulting from multiple invocations of the HMAC process may be provided to the computer along with other information from which the computing device can further invoke the HMAC process to derive the partial key. In other words, a result of partially performing a process of deriving a partial key may be provided for further completion of the process to generate the partial key. Generally, any method of obtaining the partial key for each key holder may be used.

From the obtained partial keys, in an embodiment, a signing key is computed based at least in part on the obtained partial keys and the computed key-seed. For example, as illustrated to the right of the flowchart in FIG. 15, the signing key may be $SK$=HMAC($PK_1$+ . . . +$PK_n$,Key-Seed).

Once the signing key is computed 1506, in an embodiment, a message is signed 1508 using the computed signing key. The message may be any message for which a signature is required or desired such as a request to access a service or for another use, such as described above. For a message denoted in FIG. 15 by "Message," an illustrative example of a signature S may be $S$=HMAC($SK$,Message).

While not illustrated as such, the message may be canonicalized, as discussed above. Generally, explicit discussion of canonicalization and other such processes may be omitted in the present disclosure for the purpose of clear illustration; however, it should be noted that such variations are within the scope of the present disclosure. Also, as noted below, keys derived in this way may be used for other cryptographic operations including, but not limited to, encryption and decryption of data, where the data may be, for example, content and/or another key.

In an embodiment, once the message is signed 1508, the message may be provided with the signature for verification by a verification computing device such as described above. As one example, the message and signature may be provided in one or more communications that collectively encode the signature and the message. Generally, any method of providing a message verifier information that is based at least in part on the message and a signature for the message and that is usable to the verifier to verify the signature may be used.

Figure 16:
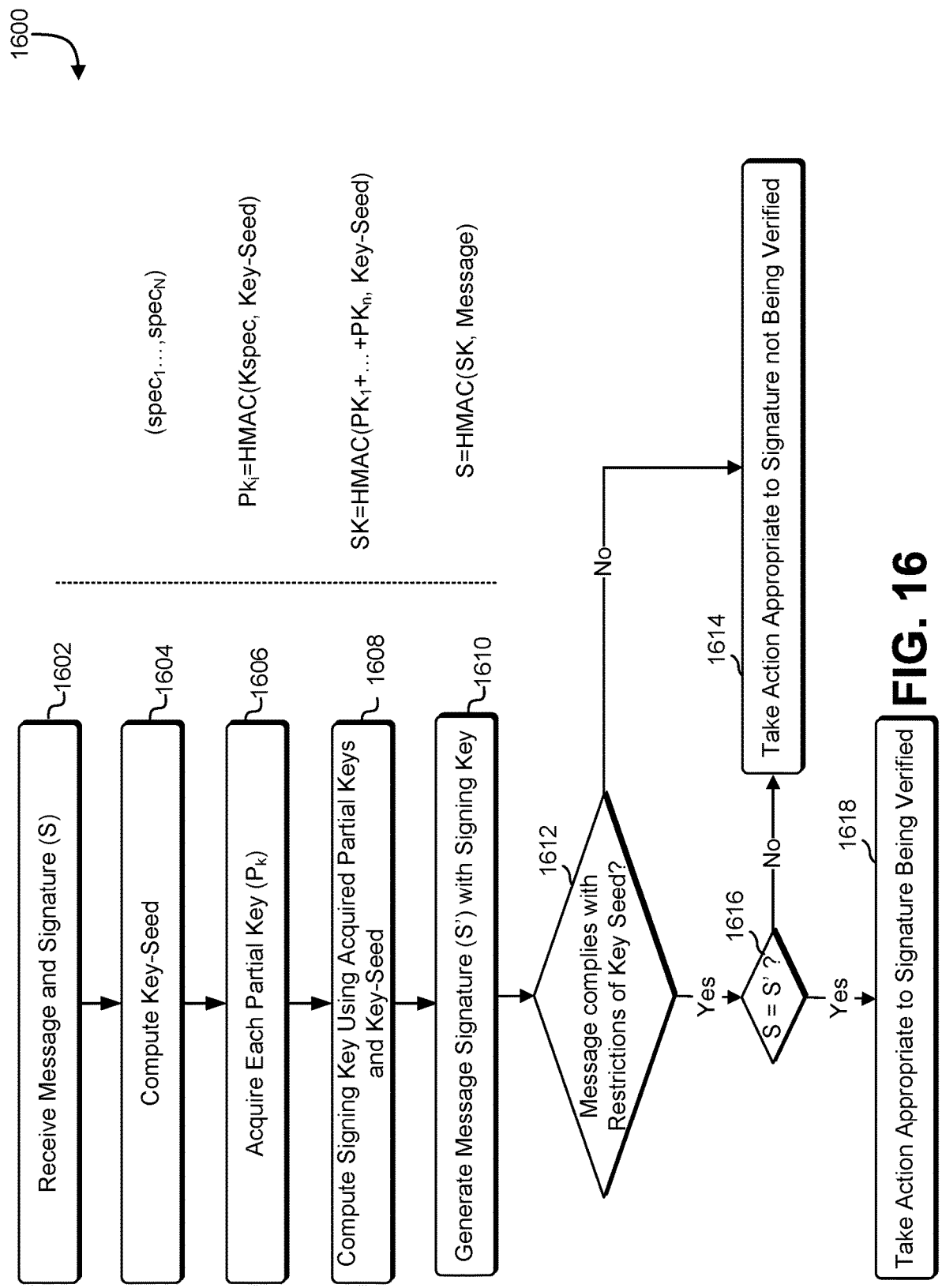
FIG. 16 is a flowchart illustrating signature verification using keys of multiple authorities, in accordance with at least one embodiment.

In embodiments, a verifier computer system uses information available to it in order to determine whether the signature provided with the message is authentic. FIG. 16 accordingly shows an illustrative example of a process 1600 that may be used to verify message signatures. As with FIG. 15 and other Figures provided herein, illustrative examples of calculations that may be made during performance of the process 1600 are provided in the figure. In an embodiment, the process 1600 includes receiving 1602 a message and a signature (S) for the message. The signature and message may be, for example, received from a device that performs a process for signature generation, such as the process 1500 described above in connection with FIG. 15 or variations thereof. In an embodiment, a key-seed is computed 1604 such as described above. For instance, the key-seed may be:

(spec$_1$, . . . ,spec$_N$).

It should be noted that, while shown as following the receipt of a message and signature, computation of the key-seed may be performed at other times. For example, computation of the key-seed may be pre-computed prior to receipt of a message and signature for the message. Generally, as noted elsewhere herein, the performance of various steps of the processes described herein may be performed in an order that is different from that that is illustrated explicitly in the drawings. Such variations will be apparent to those with skill in the art and are not necessarily described herein explicitly.

Returning to the process 1600, a partial key is acquired from each of the various key holders, such as described above in connection with FIG. 15. It should be noted that acquisition of the partial keys may be performed in the same manner as in the process 1500 of FIG. 15, or in a different manner. For example, as discussed, various embodiments of the present disclosure allow for a multi-step process for generating keys. For a particular partial key, a message signor computer system may have access to a key that has been derived further down a key path than a key to which a verifier computer system has access to, even though both the signor computer system and verifier computer system each have access to information from which the partial key can be derived.

A signing key is computed 1608 using the acquired partial keys and the key-seed such as described above in connection with FIG. 15. A signature for the received message is then generated 1610 using the signing key that was computed 1608. As noted above, the parameters encoded in the key-seed may correspond to restrictions on key use. Accordingly, in an embodiment, the parameters for each partial key in the key-seed correspond to one or more restrictions for that partial key. Thus, the key-seed, in an embodiment, encodes a set of restrictions comprising the collective restrictions on each of the partial keys. As an example, the parameters for one partial key may encode a date and the parameters for another partial key may encode a location. (In other words, at least one of the partial keys was derived from information encoding a date and at least one of the other partial keys was derived from information encoding a location.) A system employing the process 1600, or variations thereof, may enforce policy by checking whether messages (such as requests to perform operations or otherwise access computing resources) comply with the collective parameters of the partial keys. For instance, using the present example of a partial key being encoded with a date and the other being encoded with a location, such a system may check whether the message was submitted on the date for access to a service operated at the location. Accordingly, as illustrated in FIG. 16, in an embodiment, the process 1600 includes determining 1612 whether the message complies with restrictions (parameters) used to derive the partial keys. Determining whether the message complies with the parameters may be performed in any suitable manner. For example, as noted, the parameters may be public information or at least information available within participants in the process 1600. Thus, determining whether the message complies with the parameters may include checking the message against the parameters. As another example, the parameters may be inherent to the system to which the message was submitted. For example, each of multiple systems may have corresponding parameters that are used to verify whether messages comply with the parameters. Generally, any method of determining whether the message complies with the parameters may be used. Further, additional policy checks independent of restrictions used to derive keys used in the process 1600 may also be used, although such checks are not illustrated in the figure.

If it is determined that the message does not comply with the restrictions of the key-seed, action appropriate to the signature not being verified may be taken 1614, as discussed in more detail below. If, however, it is determined 1612 that the message does comply with the restrictions, in an embodiment, a determination is then made 1616 whether the generated signature matches the signature that was received. For example, determination whether the generated signature matches the received signature may include determining whether the generated signature and the received signature are identical. If the generated signature does not match the received signature, then an appropriate action to the signature not being verified may be taken 1614. An appropriate action may vary depending on the context in which the signature verification process 1600 is performed. For instance, the appropriate action may be to transmit a message to the message signing and/or to another computer system where the message encodes the fact that the signature was not successfully verified. Other appropriate action may be to deny access requested by a request encoded in the message. Similarly, if it is determined 1616 that the generated message signature matches the received message signature, then action appropriate to the signature being verified may be taken 1618. Such action may include, for instance, transmission of a message that encodes the fact that the signature was verified and/or providing access requested in the message. Another such action, in an embodiment, includes storage of the message and/or signature for later use. Storage of the message and/or signature may, therefore, indicate that the message was submitted with a valid signature.

Figure 17:
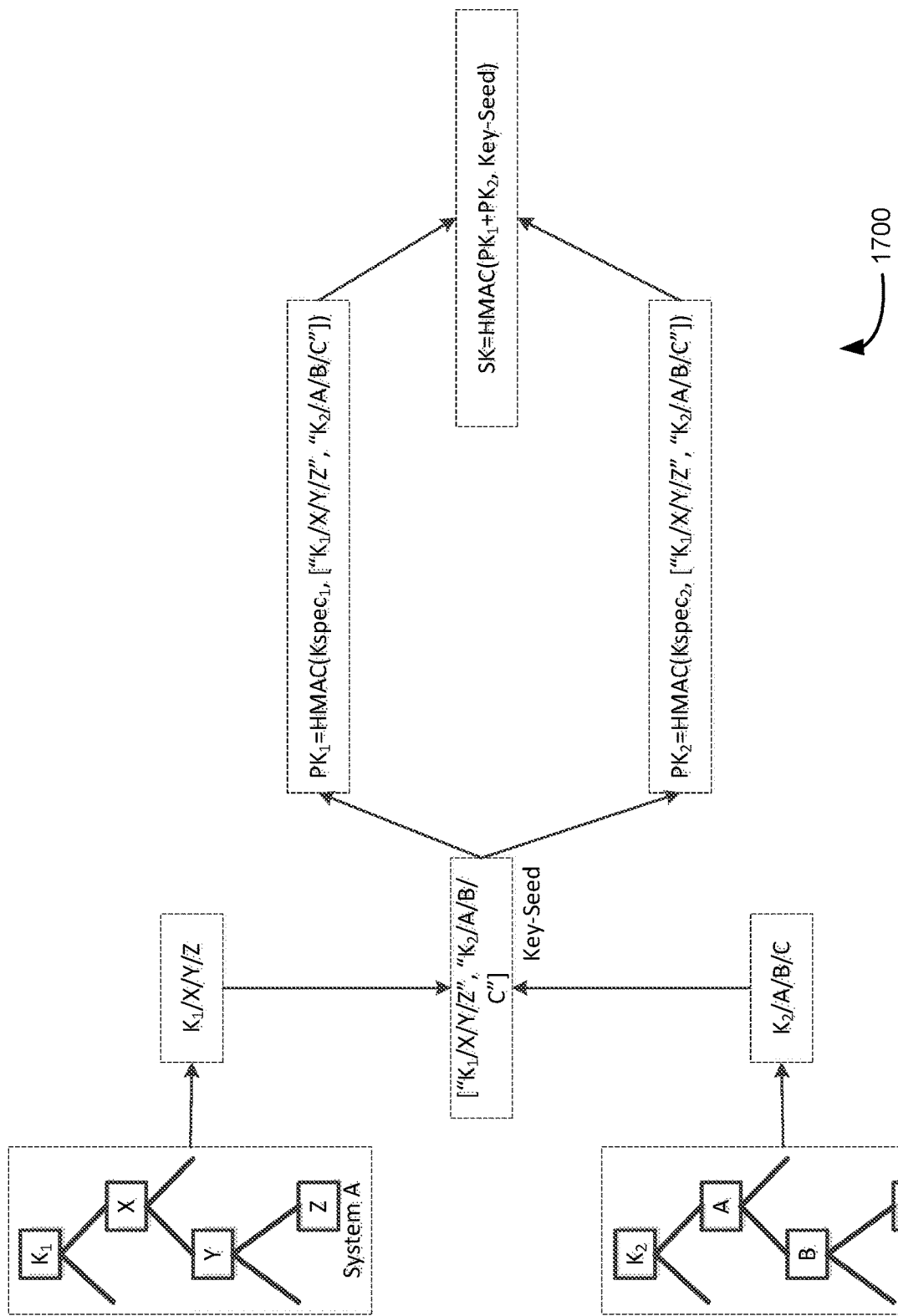
FIG. 17 is a diagram illustrating an example manner in which signing keys may be generated, in accordance with at least one embodiment.

FIG. 17 shows an illustrative example of how keys from multiple authorities, where at least one authority is distrustful of the other authority, may be used to generate a signing key for signing messages such that the signature of the messages is valid only when the signature includes information encoded by keys from each of the authorities. In this example, the diagram 1700 illustrates two systems—system A and system B. Each of the systems has access to a key $K_1$ and $K_2$, respectively. The keys $K_1$ and $K_2$ may be derived from a common key, or may be independent from one another. In some instances, the validity of a message may be requisite on a message being signed using both $K_1$ and $K_2$. In the illustration of the process 1700, a message signer is able to sign messages without having both $K_1$ and $K_2$. The message signer may, for example, have only one of $K_1$ or $K_2$ or in fact may not have either $K_1$ and $K_2$ but only information derived therefrom.

As shown in FIG. 17, system A corresponds to a key tree having nodes corresponding to keys derived from the key $K_1$. The nodes of the key tree represent various information such as restrictions on key use. At the root of each tree, in this particular example, is information corresponding to a key identifier (ID), that is, an identifier for a key to which the corresponding system has access. For example, the root of the tree for system A includes the identifier $K_1$. As used herein, $K_1$ will be used to refer to both the identifier of the key since it will be clear to one with ordinary skill in the art from context which is intended. The values for X, Y, and Z in FIG. 17 may be restrictions on use of the key $K_1$. For example, one of X, Y or Z may represent a date for which the key identified by $K_1$ is valid. Any of X, Y, and Z may also represent other restrictions such as those described above. In addition, any of X, Y, or Z may not semantically represent a restriction, but may simply be information, which may be random and/or pseudo-random information, from which a key may be derived from the key identified by $K_1$. Similarly, A, B and C in the tree of system B may be information from which keys may be derived from the key identified by $K_2$. It should be noted that, for each of the system A and system B, the trees are shown as binary trees. However, trees may be different from those shown here. For example, each node may have fewer than two or more than two branches. In addition, each node does not necessarily require an equal number of branches. As just one illustrative example, five nodes may branch from $K_1$ while one node may branch from X while three nodes may branch from Y, leaving three leaves for the branches that pass through the node Y. Also, while FIG. 17 shows only two systems for the purpose of illustration, the techniques described herein are applicable to instances where there are more than two systems.

As shown in FIG. 17, the key tree for each system may be used to construct an encoding of the key path. Encoding of key path may be the information corresponding to the nodes of the tree separated by appropriate delimiters such as by slashes shown in the figure or by other delimiters such as commas. These encodings of the key paths may be put together as shown in FIG. 17 to form a key-seed. The key-seed may be any encoding of the key paths such as that explicitly illustrated in FIG. 17. The encoding may be encoded according to rules followed by various participants in the processes described herein. For example, the key-seed may encode the key paths in alphabetical or reverse alphabetical order. As noted above, the key-seed may be used to construct partial keys for each of the key holders. In this example, a partial key may be computed for both system A and system B. For example, as shown in FIG. 17, for system A, a partial key $PK_1$ is computed using a key specialized along the path of the key tree shown for system A and the key-seed. Similarly, a partial key $K_2$ is constructed for system B. These partial keys may be combined to form a signing key as illustrated in the figure and described above.

Constructions, such as those described above, may be used in various schemes for signing messages. For example, FIG. 18 shows a diagram 1800 illustrating how the techniques above may be used in connection with a signature verification process. In this particular example, the validity of a signature may be dependent on keys from multiple distrustful authorities. As discussed, an authority may be considered distrustful when another authority does not have access to a key of the distrustful authority. In this particular example, the validity of a signature may depend on keys from two authorities labeled Authority 1 and Authority 2 in the figure. The authorities discussed in connection with FIG. 18, and elsewhere herein, may be computer systems configured to perform actions described herein and possibly additional actions. Authority 1 may have access to a key with key ID $K_1$ but not to a key identified by $K_2$. Similarly, Authority 2 has access to a key identified by $K_2$ but not a key identified by $K_1$. Each of Authority 1 and Authority 2 in this example has corresponding key trees. As illustrated herein, the key trees for each of Authority 1 and Authority 2 may be different from one another in their size, radix of any corresponding nodes, number of nodes, and the like. In the middle of FIG. 18 are example calculations for values that may be used to generate a signature. In this particular example, a key-seed is computed based on key paths in key trees in each of key trees for Authority 1 and Authority 2. In addition, values for partial keys for Authority 1 and Authority 2 are also shown and referred to respectively as α and β.

In FIG. 18, a client computing device 1802 may submit, directly or indirectly, a message and signature for the message to a verifier computing device 1804. While illustrated as the client computing device 1802 providing the message and signature directly to the verifier computing device 1804, the verifier computing device 1804 may receive the message and signature from a different computing device, such as an intermediate computing device between the client computing device 1802 and the verifier computing device 1804.

Even though the validity of the signature provided from the client 1802 to the verifier 1804 is dependent on the keys identified respectively by $K_1$ and $K_2$, in this example, the verifier is able to verify messages without having access to those keys. For example, in this particular illustration, Authority 1, labeled as 1806, and Authority 2, labeled as 1808, respectively provide the values of α and β to the verifier which may use the values of α and β to verify a message signed by the client. The message signed by the client may be signed using the techniques described above and using information accessible to the client. For instance, the client may have the keys identified by $K_1$ and $K_2$ and may be able to compute α and β and generate a signing key accordingly using α and β. Similarly, the client may have received α from Authority 1 and β from Authority 2 and may, therefore, use α and β to generate a signing key. As yet another example, the client may have a key derived along the partial key path of the key path shown in the figure. Such a key, using the techniques described above, may be used to generate α and β and therefore the signing used to produce a signature that can be verified by the verifier 1804. Numerous variations are considered as being within the scope of the present disclosure. For example, the client may have α and $K_2$. A client may have β and $K_1$. As yet another example, a client may have α and a key specialized along the key path shown from $K_2$ to $Y_2$. It will be understood to one with ordinary skill in the art that numerous other variations are also possible and such examples are considered as being within the scope of the present disclosure.

Figure 19:
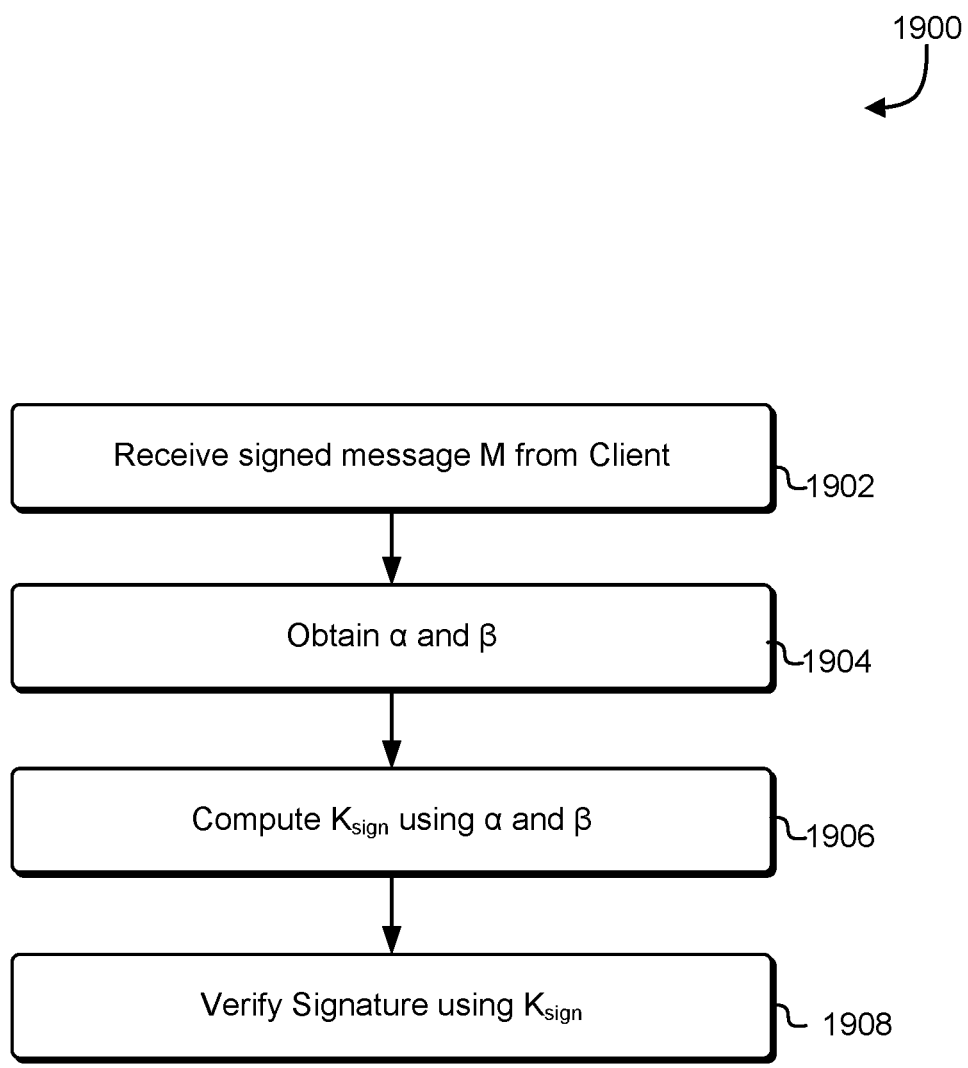
FIG. 19 is a flowchart showing an illustrative example of a process for verifying signatures, in accordance with at least one embodiment.

FIG. 19 shows an illustrative example of a process 1900 that may be used by the verifier computer system 1804 in FIG. 18 to verify a signature from a client 1802. In an embodiment, the process 1900 includes receiving 1902 a signed message M from client. The message may be received in any suitable manner such as described above. The verifier computer system (which may be referred to simply as a verifier) may then obtain 1904 the values of α and β. Obtaining α and β may be performed in any suitable way, such as calculating α and β with available information or by receiving the values of α and β from other computing devices such as computing devices associated with Authority 1 and Authority 2 in FIG. 18. Generally, α and β may be obtained in any suitable way depending on the context. Once α and β are obtained 1904, a signature KSign is computed 1906 using both α and β. Then the signature KSign may be used to verify 1908 the signature received with the message M such as in the described above.

FIG. 20 shows another example of a way in which the various embodiments described herein may be used to verify the said signatures. In this particular example, a client computing device 2002 submits a message to an Authority 2004 labeled as Authority 1 in the figure. As shown in FIG. 20, Authority 1 has access to the key identified by $K_1$ but not to the key identified by $K_2$. It may also be the case that an authority, Authority 2, labeled as 2006, does not have access to $K_1$. However, verification of the signature may be dependent on the key identified by $K_2$. In this example, the Authority 1, upon receipt of the signed message from the client 2002, sends a value for a to Authority 2. The value for a may be, for example, encoded in an electronic message from Authority 1 (or another device acting on behalf of Authority 1) to Authority 2. It should be noted that, while the figure shows a from Authority 1 to Authority 2 2006, other information may be sent. For example, the information from Authority 1 to Authority 2 may be information that identifies a so that Authority 2 can access a from a data store. Other information may be sent from Authority 1 to Authority 2. For instance, Authority 1 may relay the signature and message received from the client 2002, although the Authority 2 may also receive the message and signature in another way such as directly from the client 2002.

The authority labeled Authority 2, in this example, uses this message signature and a and its own value of β to determine whether the signature is valid, such as by techniques described above. Authority 2 may also derive β as needed, such as upon receipt of information from Authority 1, but may not persistently store the value. A verification decision may be then sent from Authority 1 to Authority 2 to allow Authority 1 to take appropriate action depending on whether the signature is valid as determined by Authority 2. In this manner, Authority 1 can determine or can take actions depending on the validity of the signature when that signature depends from $K_2$ even though the Authority 1 does not have access to $K_2$. Other variations are also considered as being within the scope of the present disclosure. For instance, referring to FIG. 20, the client may submit a message and signature to Authority 1 who may then request 3 from Authority 2. Authority 2 may send 3 to Authority 1 and Authority 1 may then utilize α and β to verify the validity of the signature submitted by the client 2002. In this manner, Authority 1 can determine the validity of the signature when that validity depends from $K_2$ even though Authority 1 is not ever able to access $K_2$. It will be apparent that other variations are also considered as being within the scope of the present disclosure.

Figure 21:
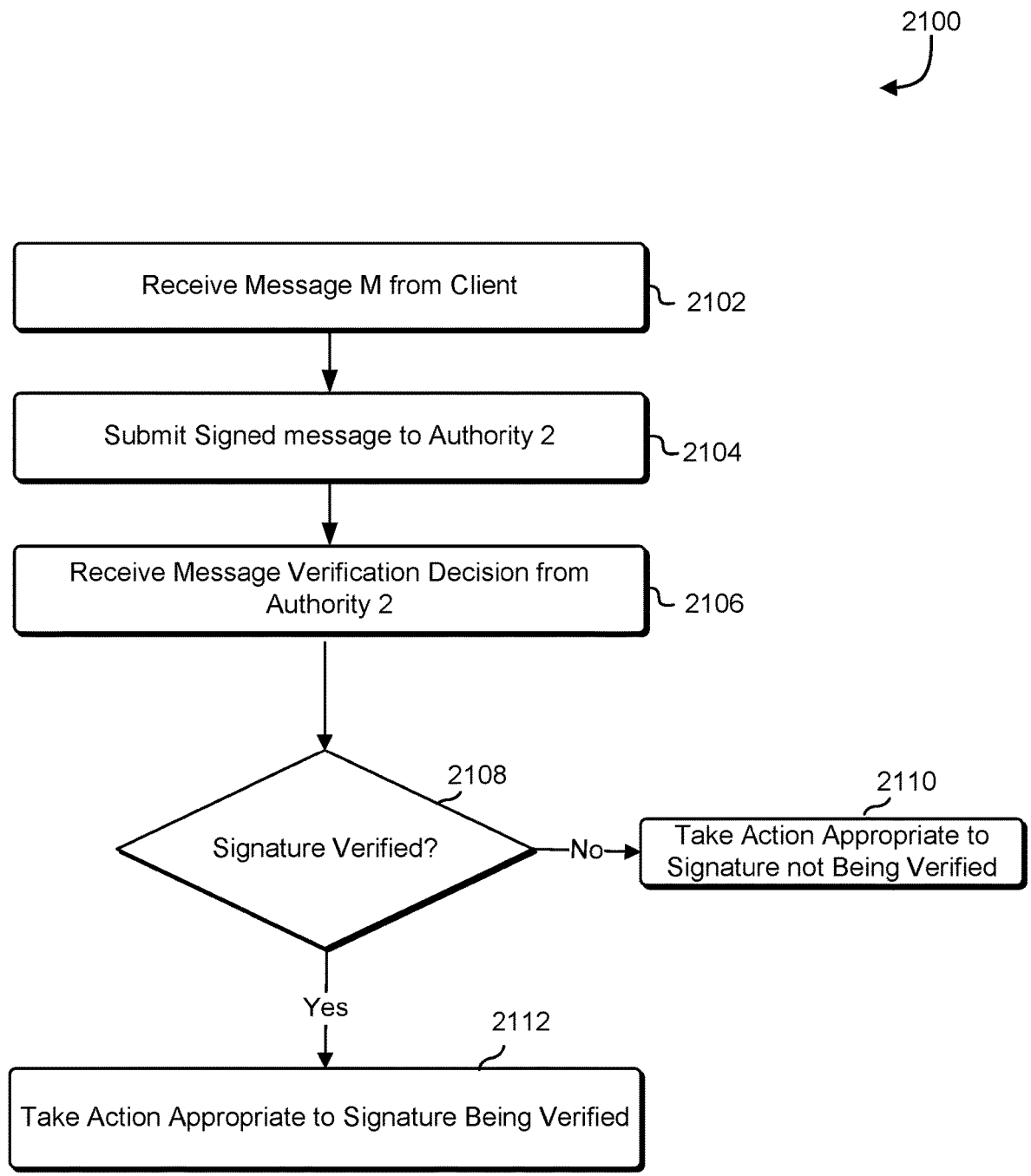
FIG. 21 is a flowchart showing an illustrative example of a process for verifying a message signature in accordance with at least one embodiment.

FIG. 21 shows an illustrative example of a process 2100 that may be used by Authority 1 in FIG. 20 to verify the signature of a message received from a client 2002. As shown in FIG. 21, the process 2100 includes receiving 2102 a signed message M from a client. As noted, a signed message may comprise the message and a signature for the message. The signed message received from the client may be then submitted 2104 to Authority 2. Authority 2 may obtain values for α and β, may generate an expected signature for the message, and then send verification status for the message back to Authority 1 as shown in FIG. 20. Authority 1 may then receive 2106 the message verification status from Authority 2 and determine whether or not the signature is verified 2108. When a determination is made 2108 whether the signature is verified, appropriate action may be taken. For example, if it is determined 2108 that a signature is not verified, then appropriate action may be taken 2110 such as described above. Similarly, when it is determined 2108 that the signature is in fact verified, then appropriate action may be taken 2112, also as described above.

Figure 22:
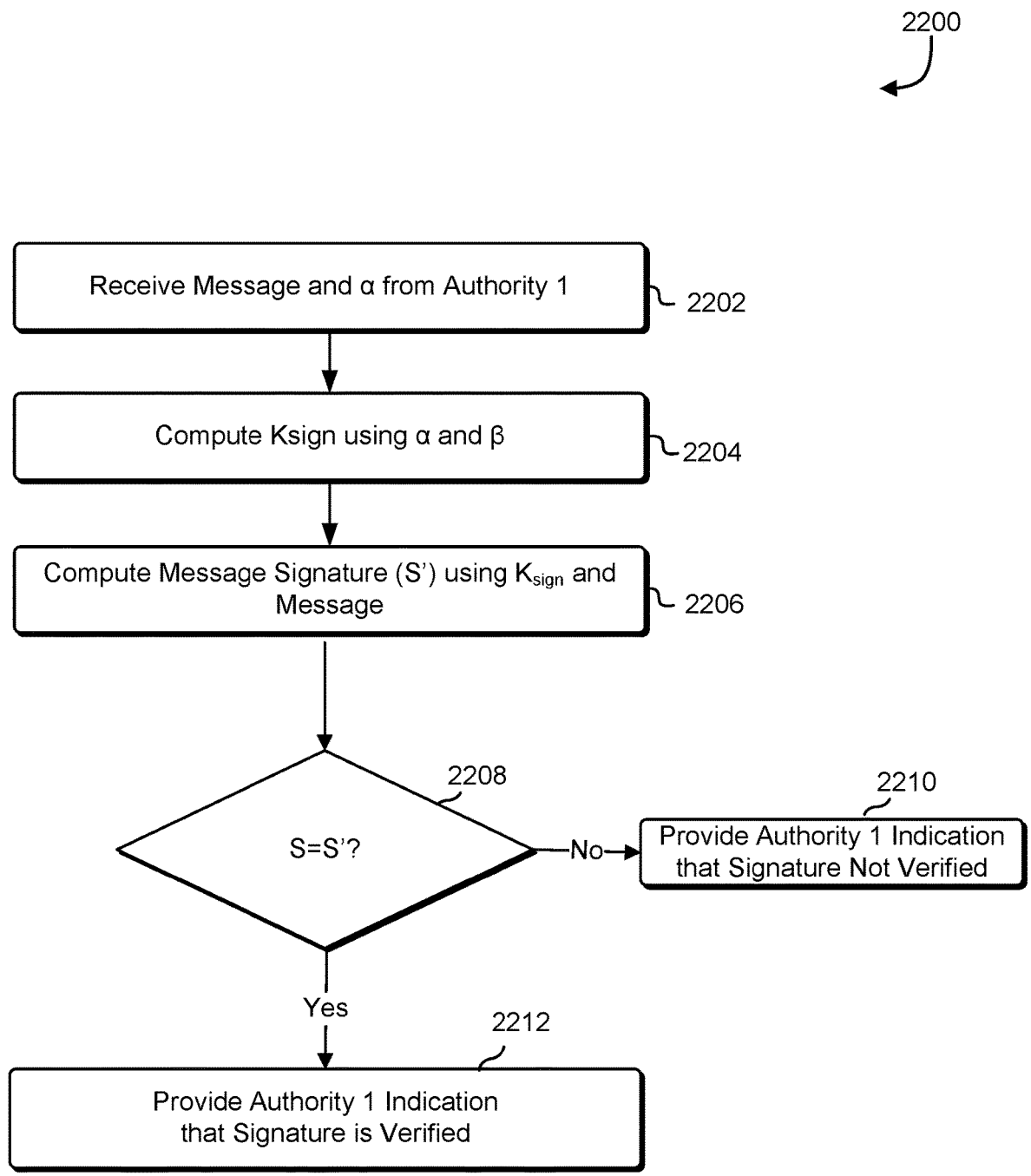
FIG. 22 is a flowchart showing an illustrative example of a process for verifying a message signature in accordance with at least one embodiment.

FIG. 22 shows an illustrative example of a process 2200 that may be used by the message verifier computer system 2006 shown in FIG. 20. In FIG. 22, the process 2200 includes receiving a signed message and a from Authority 1. With the signed message, that is, the message and its signature, Authority 1 may compute an expected signature (a signature that, when matched by a submitted signature, indicates validity of the submitted signature), using both $\alpha$ and $\beta$, such as using the techniques described above. An expected signature, mentioned in connection with FIG. 22 and elsewhere in the present disclosure, may also be referred to as a reference signature. As illustrated in FIG. 22, a signing key may be computed 2204 and a message signature may be computed 2206, using the signing key and the message. A determination may then be made whether or not the computed message signature is equal to the signature received in the assigned message. If it is determined 2208 that the message signature does not match the received signature, Authority 1 may be provided 2210 an indication that the signature is not verified. Indication may be in the form, for example, of information encoded in an electric message sent over a network to Authority 1 from Authority 2. Similarly, if it is determined 2208 that the computed message signature is not the same as the signature received, then Authority 2 may be provided 2212 an indication that the signature is, in fact, verified, such as in the same manner in which the indication that the signature is not verified is provided. In this manner, Authority 2 is able to authenticate messages without access to $K_1$ even though the validity of the message depends from $K_1$.

Numerous variations of the present disclosure are considered as being within the scope of the present disclosure. For example, FIGS. 21 and 22 show illustrative processes that may be performed to verify a message. The techniques described above in connection with these figures, and also in connection with FIGS. 18, 19, and/or 20, may be, for example, extended to involve more authorities than explicitly illustrated. In addition, as noted above in connection with FIG. 16, checking whether a signature is valid may also involve checking whether a message signed to produce the signature complies with one or more restrictions used to derive the signing key. Such checking may also be performed in connection with the processes described in connection with FIGS. 21 and 22. For example, referring to FIG. 20, Authority 1 and/or Authority 2 may check whether the message complies with any restrictions used to derive the signing key. Each authority may check the message against a portion of the restrictions (such as restrictions of a corresponding tree) and/or one authority may check all restrictions.

As noted, various techniques of the present disclosure may be used in a variety of contexts and not just for use in message, signature and verification schemes. In particular, techniques of the present disclosure are usable for the purposes of key escrow. In many instances, it is desirable to have information encrypted for the sake of data security. However, it may be desirable that certain individuals within an organization are always able to access encrypted data regardless of who in the organization encrypted the data. Accordingly, techniques of the present disclosure are usable to enable the encryption of data in a way that provides for convenient access of data by different individuals within an organization (or other entity).

Figure 23:
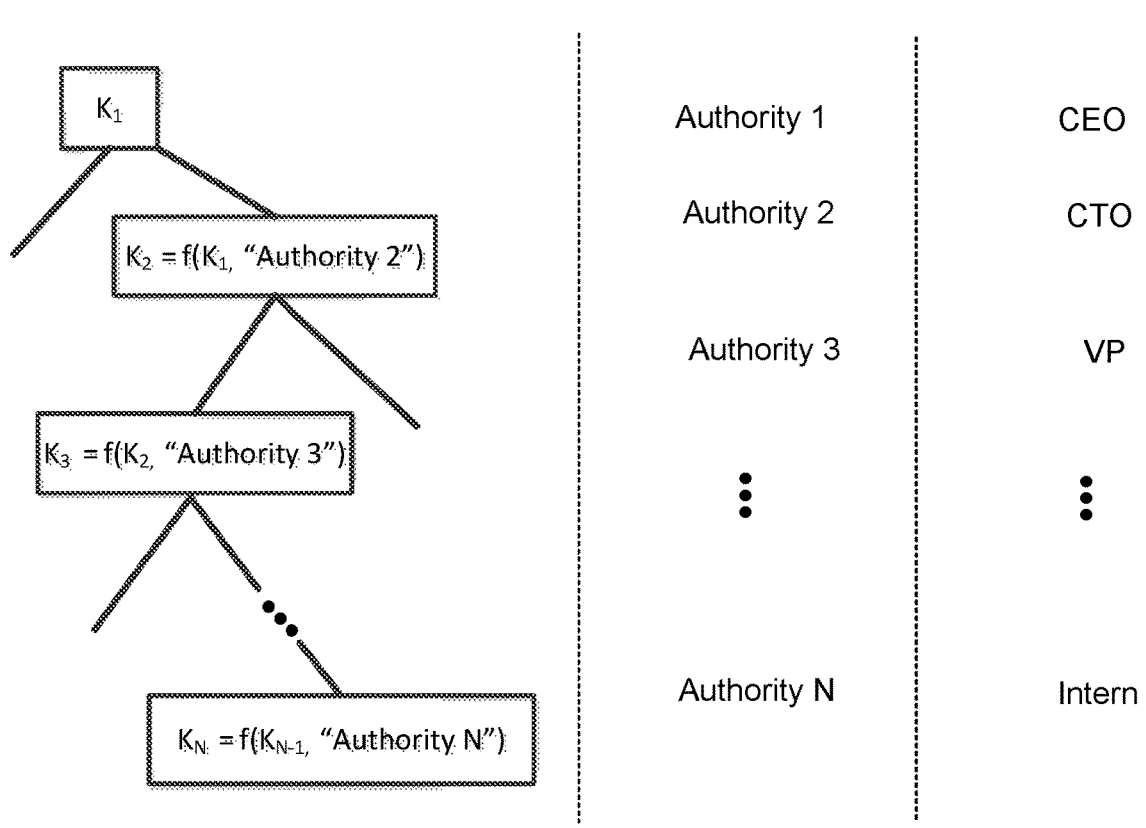
FIG. 23 is a diagram representing an illustrative example of a key hierarchy and corresponding levels of authority in accordance with at least one embodiment.

FIG. 23 for example shows a diagram 2300 divided into three sections. In the middle section of FIG. 23, for example, appears a listing of various levels of an organizational hierarchy. In this example, the levels are labeled as Authority 1, Authority 2, Authority 3, and so on. To the right of the center section of FIG. 23 are illustrative examples of individuals who may correspond to the levels of authority in the center section of the figure. For example, the highest authority level may correspond to an organization's chief executive officer (CEO). At the second authority level may be individuals who directly report to the CEO such as a chief technology officer (CTO) and other officers of the organization such as chief financial officers, chief legal officers, and the like. At the next authority level may be those who directly report to those corresponding to the second authority level such as vice-presidents. It should be noted that an organizational hierarchy is used herein for the purpose of illustration, but different hierarchies may be used and nodes of the hierarchy do not necessarily need to correspond to individuals, but may, for instance, correspond to computer systems where a computer system's position within the hierarchy determines the computer system's ability to decrypt data that has been encrypted by another computer system in the hierarchy.

As illustrated in the figure, such a hierarchy may continue until a lowest level is achieved. Techniques of a present disclosure allow for a system that enables data to be encrypted by someone in the hierarchy. In such a system, the techniques also enable such a system to have a feature whereby the data is not decryptable by those lower in the hierarchy but is always decryptable by those higher in the hierarchy. For instance, if a CTO encrypts data, a vice-president would not be able decrypt the data without access to the CTO's key or a key in the key path from the CTO to the root of the hierarchy. Similarly, the CTO may use his or her own key to encrypt data and the CEO, corresponding to a root node in this example, may always be able to decrypt that data.

To the left of the center section of FIG. 23 is a representation of a key tree. Each level in the key tree may correspond to a level of authority. The number of branches stemming from a node in the tree may correspond to those who have keys at a certain authority level or the number of keys produced for each authority level, such as when a single principal may have access to multiple keys and/or when a single key may be shared by multiple principals. For instance, if the board of directors of the organization represented on the right section of FIG. 23 includes a CEO at the highest authority level and five officers at the next, lower authority level, there may be five nodes directly connected to the root node that corresponds to the CEO. It should be noted, however, that, for the purpose of illustration, in order to keep the illustration simple, the key tree is illustrated as a binary tree. As illustrated, the keys of the key hierarchy shown in FIG. 23 may be derived using the various techniques described herein. For example, the hierarchy is shown as having a root key, $K_1$. A key, $K_2$, on the next lower level of the hierarchy may be derived from $K_1$ as the value of a function whose operands are $K_1$ and information corresponding to an authority to have access to $K_2$, or whose operands are based at least in part on $K_1$ and the information. The information may be, for example, a string identifying or at least corresponding to the authority (or authorities) to have access to the key being derived. Each key in lower levels of the hierarchy may be similarly derived from the same or different functions. The functions may be any suitable function, including, but not limited to, functions explicitly discussed above and/or functions exhibiting properties explicitly discussed above.

Figure 24:
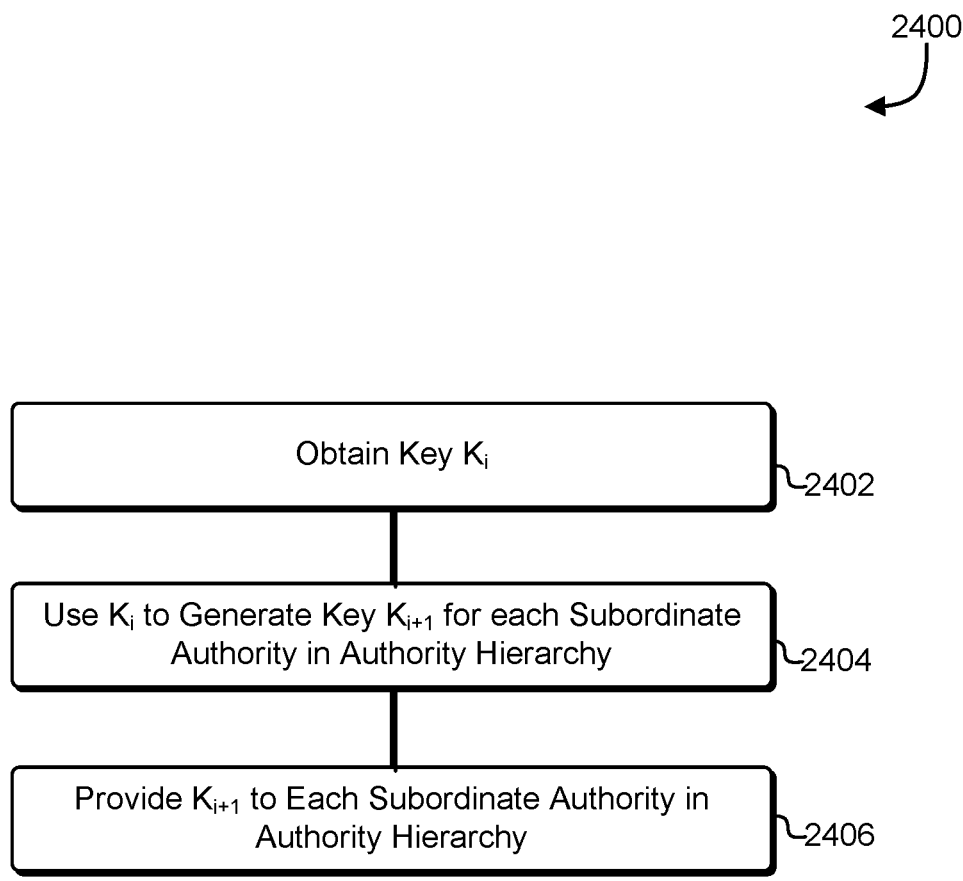
FIG. 24 is a flowchart illustrating an example of a process for key distribution, in accordance with at least one embodiment.

FIG. 24 shows an illustrative example of a process 2400 for allocating keys in accordance with an embodiment. The method 2400 may be performed by a computer system associated with a level in a hierarchy such as illustrated above in connection with FIG. 23. The computer system may be any computer system that is configured to perform the process 2400, or variations thereof, as part of a broader process. Such broader processes include, but are not limited to, generating keys for distribution to various principals for use in encrypting data, decrypting data, generating keys for the purpose of recovering data, and the like. A computer system performing the process 2400 may be configured similarly to computer systems discussed elsewhere herein, such as in connection with FIG. 34.

As one example, a member of an organization may utilize the process 2400 to generate a key that that person can pass on to somebody lower in the hierarchy. By a member of an organization generating a key, it should be noted that the user of particular apparatuses, such as specifically configured computer systems, are used to generate the key under the control of the member. For instance, the member of the organization may provide user input into a computer system (either local to the user or remote from the user and accessible over a network) to cause the computer system to generate the key. The process 2400 may also be performed numerous times by a computer system that generates and distributes all the keys and passes them out according to their positions in the hierarchy. As yet another example, the process 2400 may be performed by an automated process without user input. For example, the process 2400 may be performed in response to a request transmitted electronically by another computer system.

Turning to the drawing, the process 2400 in an embodiment includes obtaining a key 2402. As shown in FIG. 24, the key is labeled $K_1$. Obtaining the key $K_i$ may be done in any suitable manner. For example, the key may be a key that is selected, generated, or otherwise obtained in any suitable manner if the key is for a top level of the hierarchy. The key may be obtained, for example, by receiving the key from another computer system or by the receipt of user input providing the key. The key may also be a key that was derived from another key such as used in the techniques described above. In an embodiment, the obtained key $K_i$ is used 2404 to generate a new key $K_{i+1}$ for each subordinate authority in the authority hierarchy. For instance, referring to FIG. 23, the key $K_i$ may be used to derive a key for each member of the hierarchy directly below the top level. Similarly, if the obtained $K_1$ corresponds to the level 3, the key may be used to derive all necessary keys for level 4.

Returning to FIG. 24, in an embodiment, when the keys for each subordinate authority are generated, each of the generated keys are provided 2406 to the subordinate authorities in the authority hierarchy. Providing the key to each subordinate authority may be done in any suitable manner depending on particular contexts in which the key is used. For instance, the generated keys may be provided as information encoded in electronic communications to computing devices of the subordinate authorities. As another example, computing devices of the subordinate authorities may be reconfigured, such as through a software update pushed to the computing devices, so as to utilize a generated key. Generally, a key may be provided in any manner that enables subordinate authorities to utilize the key for any purpose for which the key may be useful such as encryption and/or message signing.

The process 2400 shown in FIG. 24 may be repeated to derive keys many levels down the hierarchy. For example, a key from authority level 1 in FIG. 23 can be used to derive one or more keys for authority level 2. The keys for authority level 2 may then in turn be used, according to the process 2400, to generate one or more keys for authority level 3. This process may continue as the hierarchy is traversed and keys are provided to all members of the hierarchy. As noted, variations of how the process 2400 is performed are considered as being within the scope of the present disclosure. For example, as noted, each subordinate authority that receives a key generated in accordance with the process 2400 may itself use the process 2400 to generate and provide a key lower down the hierarchy. As another example, a computing device may repeatedly perform the process 2400 in order to generate a key for use in multiple levels down the hierarchy. For instance, a sequence of instances of performances of the process 2400 may be used to generate a sequence of keys, one for each level of the hierarchy, thereby generating a set of keys for a path in the hierarchy. Generally, any manner of utilizing the process 2400 so as to derive keys for use in the hierarchy may be used. As noted above, techniques of the present disclosure allow for the data that was encrypted using a key corresponding to a hierarchical level to be decrypted using one or more keys corresponding to higher levels in the hierarchy. As an example, if a lower level employee uses his or her key to encrypt data, at least one employee higher than the lower level employee will have a key that is usable to decrypt the data. Thus, if the employee leaves the organization, loses the key, or otherwise is unable to decrypt the data, one or more others within the organization will be able to.

Figure 25:
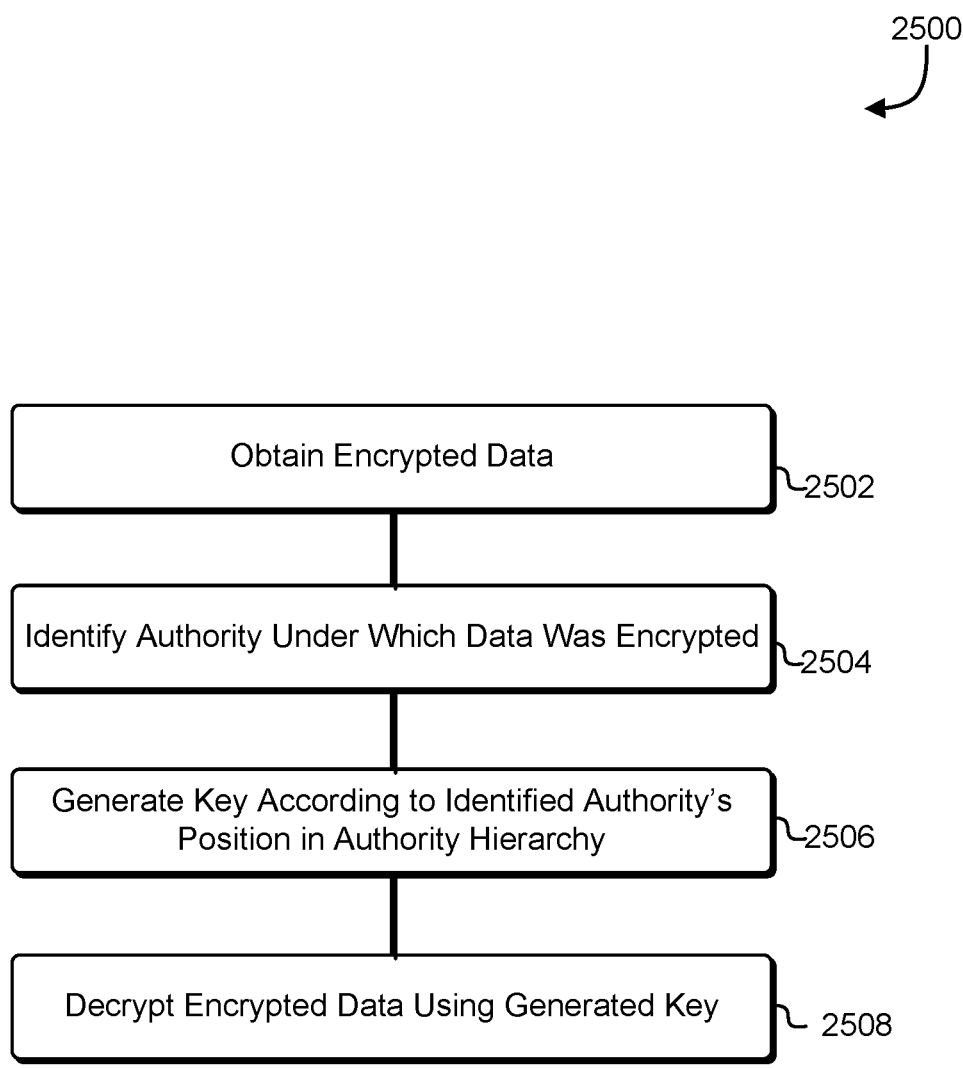
FIG. 25 is a flowchart illustrating an example process for data decryption, in accordance with at least one embodiment.

FIG. 25 accordingly shows an illustrative example of a process 2500 for decrypting data using a key different from the key which was used to encrypt the data. As shown in FIG. 25, the process 2500 includes obtaining encrypted data 2502. Obtaining the encrypted data may be done in a suitable manner such as accessing the encrypted data from a storage device, by intercepting a communication that contains the encrypted data, intercepting multiple communications that collectively contain the encrypted data, by receipt of an electronic message encoding the data, and generally in any suitable manner. In an embodiment, an authority under which the data was encrypted is identified 2504. Identifying the authority under which the data was encrypted may be done in any suitable manner. For example, metadata stored in a document management system may include an identifier of an employee who encrypted and stored the data using a computing device into which the employee was logged. The identifier of the employee may be associated by a data storage system (such as a relational database) with an identifier for a key assigned to that employee. As another example, the data may be stored in a system of an organization that corresponds either roughly or exactly to a location in the hierarchy or a sub-tree thereof. Generally, any system for keeping track of which key was used to decrypt data may be used. For example, the encrypted data may be stored in a storage system of an organization's department. Accordingly, identifying the authority under which the data was encrypted may, in this instance, include identifying the department head if a lower-level employee cannot be singled out. Thus, identifying the authority under which the data was encrypted may not identify the exact person (or other entity) that encrypted the data, but an entity between that person and a root authority organizational hierarchy. In other words, identifying the authority may include identifying an authority corresponding to a key from which the key used to encrypt the data was derived.

As a specific illustrative example, data (which may be metadata for the encrypted data) may contain, encode, or otherwise encode a key path. For this example, the key path may be a/b/c/d/e/f. The values for a, b, c, d, e, and f may comprise key-derivation material. In this manner, it may be determined that an authority having access to a key specialized along the key path encrypted the data.

In an embodiment, once the authority under which the data was encrypted is identified, a key is generated 2506 according to the identified authority's position in the authority hierarchy. Generating the key may be done in any suitable manner depending on where the authority's position is and what information is available from those above the authority's position in the hierarchy. For example, if a lower level employee encrypted data, keys from a path of the hierarchy proceeding from the root of the hierarchy to the lower level employee may be used to generate the employee's key and to decrypt 2508 the data using the generated key. For instance, in the example shown in FIG. 23, the CEO's key may be used to generate any key that was derived therefrom. Similarly, each key of the lower level in the hierarchy may be used to generate keys for those in the sub-tree rooted at that key. Using the specific illustrative example of the previous paragraph, if a key specialized along the key path a/b/c and values for d, e, and f (and possibly values for a, b, and c) were available to a computer system performing the process 2500, the key may be used to further derive the key specialized along the complete key path a/b/c/d/e/f using the various techniques described or variations thereof. The values for a/b/c/d/e/f may be available to multiple principals in the organization (or even public) since, without access to a particular key, the values, in an embodiment, are not usable to generate useful keys. In this example, once generated, the key specialized along the key path a/b/c/d/e/f may be used to decrypt the data.

It should be noted that numerous variations of the process 2500 are considered to be within the scope of the present disclosure. For example, depending on what information is available, it may not be certain which key to use to decrypt the data. Because the hierarchies in typical organizations will not be unmanageably large, numerous keys may be tried for decrypting data before the data is successfully encrypted. For example, it may not be known who encrypted the data. Therefore, the hierarchy can be traversed in any manner, as the different keys are tried as they go along. For example, the CEO's key may be tried before trying keys of the officers of the board whose keys may be tried before the vice-present, etc.

Other variations are also considered as being within the scope of the present disclosure. For example, keys constructed in accordance with the techniques described in connection with FIGS. 23-25 may be adapted for other uses. For instance, in an embodiment, keys generated in accordance with the various techniques described herein may be used to encrypt data in a manner targeting specific keys (and possibly corresponding users) that are usable to decrypt the data. For example, keys may be distributed to members of an organization. As discussed, for any given derived key, only certain keys are usable to derive the given derived key. Thus, data can be encrypted so as to selectively determine those who are able to decrypt the data by virtue of having the given key or one that is able to derive it. The various techniques described herein and variations thereof may also be used for the purposes of key distribution and/or key escrow. Derived keys may, for instance, be distributed to various system (and/or users). One or more keys used to derive the distributed keys may be held in a key escrow system so that data encrypted using a distributed key is recoverable by at least one key in escrow.

Figure 26:
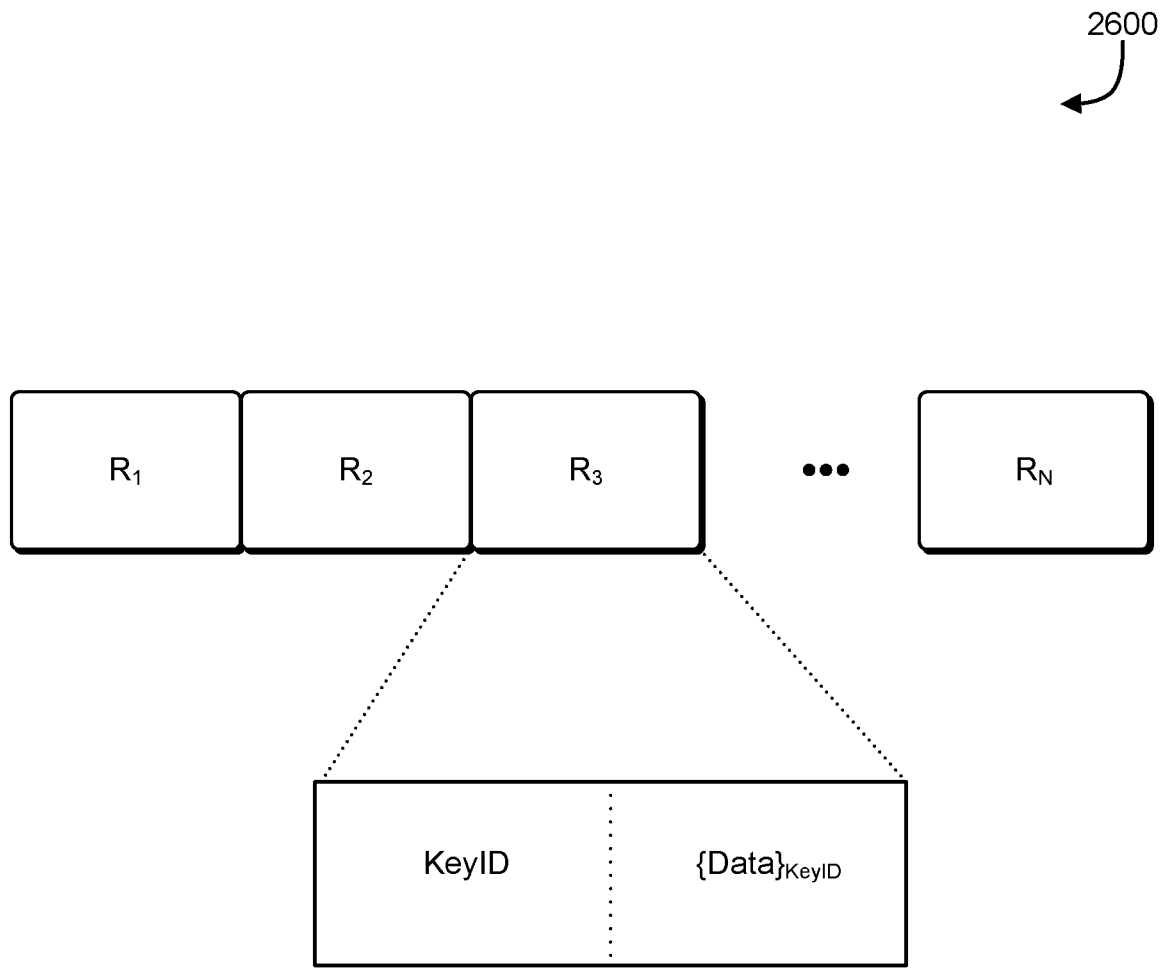
FIG. 26 is a diagram illustrating a stream of content in accordance with at least one embodiment.

Another example in which techniques of the present disclosure are particularly useful is in the context of digital rights management (DRM). For instance, as discussed below, techniques of the present disclosure may be utilized in order to encrypt content in a manner such that, if a party decrypts the content and makes the content unavailable to others in an unauthorized manner, the decrypted content can be used to identify a device that decrypted the content or at least a set of devices that decrypted the content. FIGS. 26 through 34 provide illustrative examples of a way in which this may be done. FIG. 26, for example, shows a diagrammatic representation of content in accordance with an embodiment. In particular, FIG. 26 shows content 2600 which is composed of a series of records labeled by the letter R with an index. Each record may be a portion of the content. For example, if the content is video content, each record may correspond to a frame of a video. Other divisions of content may also be used, and the divisions do not necessarily correspond to convenient boundaries, such as frames for a movie. For example, a record may be a portion of an audio file and a general record may be any subset of data of electronic information that encodes content. In addition, content may not have multiple records but may be a single record.

As illustrated in FIG. 26, each record in an embodiment includes at least two parts. In particular, each record includes a key identifier (key ID) and data encrypted under a key corresponding to the key ID. The key ID may be stored in metadata of the content. Thus, a device processing the content in order to provide the content for consumption, such as described below, may identify the key ID from a record, access a corresponding key and use that key to encrypt the data. It should be noted that there are numerous variations that are considered as being within the scope of the present disclosure. For instance, the current discussion will focus on the key corresponding to the key ID as being a key for decrypting the content, but the key may be used in other ways, such as to decrypt another key which, in turn, is used to decrypt the content. Generally, the key can be a key used for any process involved in the consumption of content.

Figure 27:
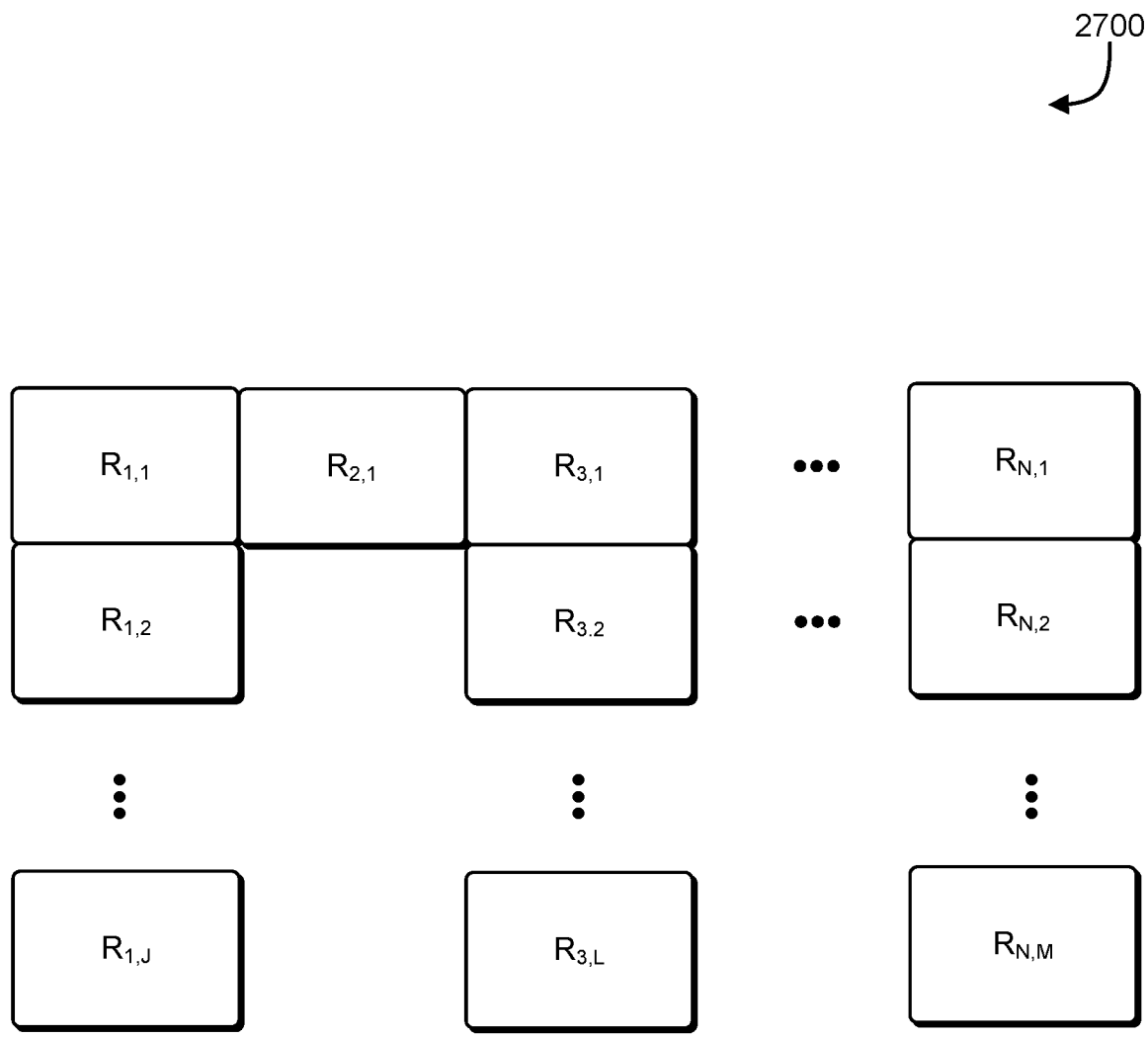
FIG. 27 is a diagram illustrating different aspects of the stream of content, in accordance with at least one embodiment.

In an embodiment, techniques of the present disclosure include providing content in a manner such that one or more of the records include multiple copies of corresponding content and metadata for the content. Turning to the illustrative example of a video, each of one or more of the frames of the video may have multiple copies on a medium that encodes the content, such as a digital video disk (DVD) or other medium, such as a computer-readable storage medium. Referring to FIG. 27, for example, as in FIG. 26, content 2700 includes a sequence of records, which may be as described above. Some of these records have multiple copies, as illustrated in FIG. 27. For example, the first record as shown in FIG. 27 includes J copies, where J is some positive integer. Similarly, the third record of the content 2700 includes L copies of the third record, where L is a positive integer. Similarly, as illustrated in FIG. 27, the Nth record includes M copies, where M is a positive integer. It should be noted that the records for which multiple copies are provided may be few relative to the total number of records, although in some embodiments, each record may have multiple copies. In this manner, as will be discussed below, relatively little storage space is required for employing various embodiments of the present disclosure, although other embodiments that require more space, such as where all or nearly all of the records have multiple copies of content, may be used. In addition, the records that have multiple copies may not have a uniform number of copies. For instance, one record may have ten copies, while another record may have five copies.

In an embodiment, each copy of content for a record includes data encrypted under a different key ID. As will be discussed below, a device processing the contents may identify a record for which the device has a key that is enabled to decrypt the content. It should also be noted that any particular device may have enough keys to decrypt content for numerous copies of a record, not just only one. In addition, the copies of content for a record may vary amongst themselves. In an embodiment, the copies that vary from other copies do so in a manner that is detectable by a computing device, but that is not humanly distinguishable or, if humanly distinguishable, then in a manner that is calculated to be insignificant, such as in a manner that is calculated to be of minimal distraction to a person consuming the content (such as by watching a video when the content is video content). The content can be varied in numerous ways, such as by varying one or more pixels in an image, varying a characteristic of audio content, and the like. Pixels may be varied, for example, by varying the pixels' color, intensity, and other characteristics. Generally, any manner of modifying the information that encodes the content may be used.

Figure 28:
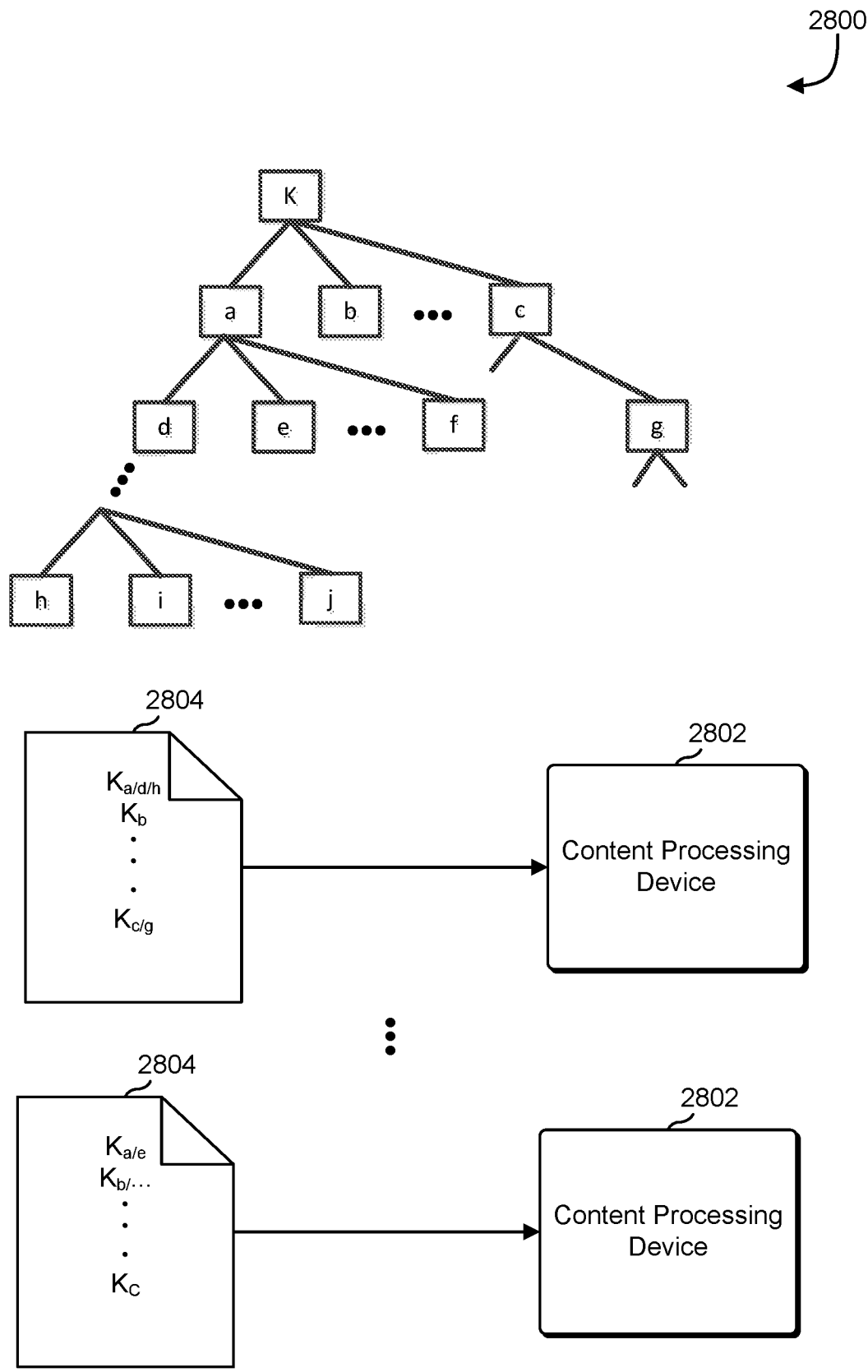
FIG. 28 is a diagram illustrating how a key hierarchy may be used to provision devices with keys in accordance with at least one embodiment.

FIG. 28 shows an illustrative example of key hierarchy (key tree) 2800, which may be used to generate keys to provide to devices for use in decrypting content. The key hierarchy may be used to generate keys, such as in the manner described above. For example, as shown in FIG. 28, key IDs are represented by letters of the alphabet. A key corresponding to key ID k may be used to generate keys for the second level of the hierarchy corresponding respectively to identifiers a, b and c. Similarly, each of a, b and c may be used to generate keys lower down the hierarchy. Thus, keys may be generated for various positions in the hierarchy on different levels. As with key trees described above, each node in the key hierarchy may correspond to a key that was generated based at least in part on a key that is higher in the hierarchy and connected by a path to the root node and information corresponding to the node.

As shown in FIG. 28, content processing devices 2802 may be provided with multiple keys from the hierarchy. Providing the content processing devices 2802, the keys may be done in any suitable manner and the manner may depend from the context in which the device is used, the type of device, the capabilities of the device, and the like. For instance, content processing devices 2802 may be provisioned with the keys at the factory. Similarly, keys may be provided in the licensing file provided electronically to the content processing devices 2802 over a network or in another way. Generally, any way of providing the keys to the content processing devices 2802 may be used. While FIG. 28 and other figures illustrate embodiments of the present disclosure in connection with a single hierarchy, multiple hierarchies may be used. For example, in connection with key trees, keys from multiple hierarchies may be provided to devices.

Further, providing content processing devices 2802 keys may be done in a manner that results in a record of associations between keys that have been provided and the devices to which the keys have been provided. Associations between keys and devices may be recorded at various granularities. For instance, in an embodiment, each device is provided with a unique set of keys. A database or other device may associate, through one or more database tables, each device with a unique set of keys that were provided to the device. As another example, multiple devices are provided with the same set of keys. A record associating devices with sets of keys may, therefore, associate groups of devices with sets of keys. The groups of devices may be organized in any suitable manner. For example, each device under the same model of a manufacturer may receive the same set of keys. Each device under the same manufacturer may receive the same set of keys. In addition, keys may be distributed in manner that results in multiple devices with no apparent relationship having the same set of keys. For instance, one thousand key sets may be randomly distributed to one million devices, thereby ensuring that at least some devices share the same set of keys.

As noted, different content processing devices 2802 are be provided with different sets of keys in various embodiments. The sets of keys provided to the devices may be chosen such that, for existing content produced in accordance with the present disclosure, when the content includes multiple copies of content for a record, every device will have a key usable to decrypt at least one of the copies. Similarly, future content may be produced such that, for existing devices having had keys provisioned (excluding, perhaps, devices that have been blacklisted or that have keys that have been blacklisted), the devices will have a key usable to decrypt at least one copy of content for records of the content having multiple records. Generally, keys may be produced and content may be produced in coordination to ensure that devices can properly decrypt when such is acceptable.

For instance, looking at the first content processing devices 2802 on FIG. 28, the content processing device 2802 may be able to use the provided set of keys 2804 to decode any content that it receives. Referring back to FIG. 27, for example, the content processing device is provisioned with several keys. One key may be usable to decode one record, whereas another key may be usable to decode another record. As noted, different content processing devices may be provided different keys. In this manner, as will be discussed below, devices may be identified or substantive devices may be identified based on the keys that the devices use to decode the content. For example, referring to the two content processing devices 2802 of FIG. 28, it may be determined that the first content processing device could not have decoded decrypted content because it does not have a key that was used to decrypt the content.

As illustrated in FIG. 28, keys provided to devices may correspond to various nodes in a key tree. For example, for the first device shown in FIG. 28, keys $K_{c/g}$ and $K_b$ are provided. Using notation similar to that above, $K_{c/g}$ may be the key K specialized along the key path c/g. For example, if c and g represent information used to derive the key $K_{c/g}$, $K_{c/g}$ may be the value of HMAC(HMAC(K,c), g). Similarly, $K_b$ may be HMAC(K,b). Keys may also be provided with key-derivation material (information, similar to the restrictions described above) that can be used to derive keys from other keys. By providing a device key-derivation material, the device has access to a sub-tree of keys in the key hierarchy. For example, referring to FIG. 28, if a device is provided with $K_a$ and values for d, e, and f, the device would have access to $K_{a/d}$, $K_{a/e}$, and $K_{a/f}$. Similarly, by providing the device with $K_a$ and values for d through h (on the key path connecting K to h), the device would have access to $K_{a/d}$ through $K_{a/\ldots/h}$ on the key path. The key-derivation material may be provided to the devices together with the keys or separately. For example, the key-derivation material may be provided to the device in metadata of content being processed by the device.

Figure 29:
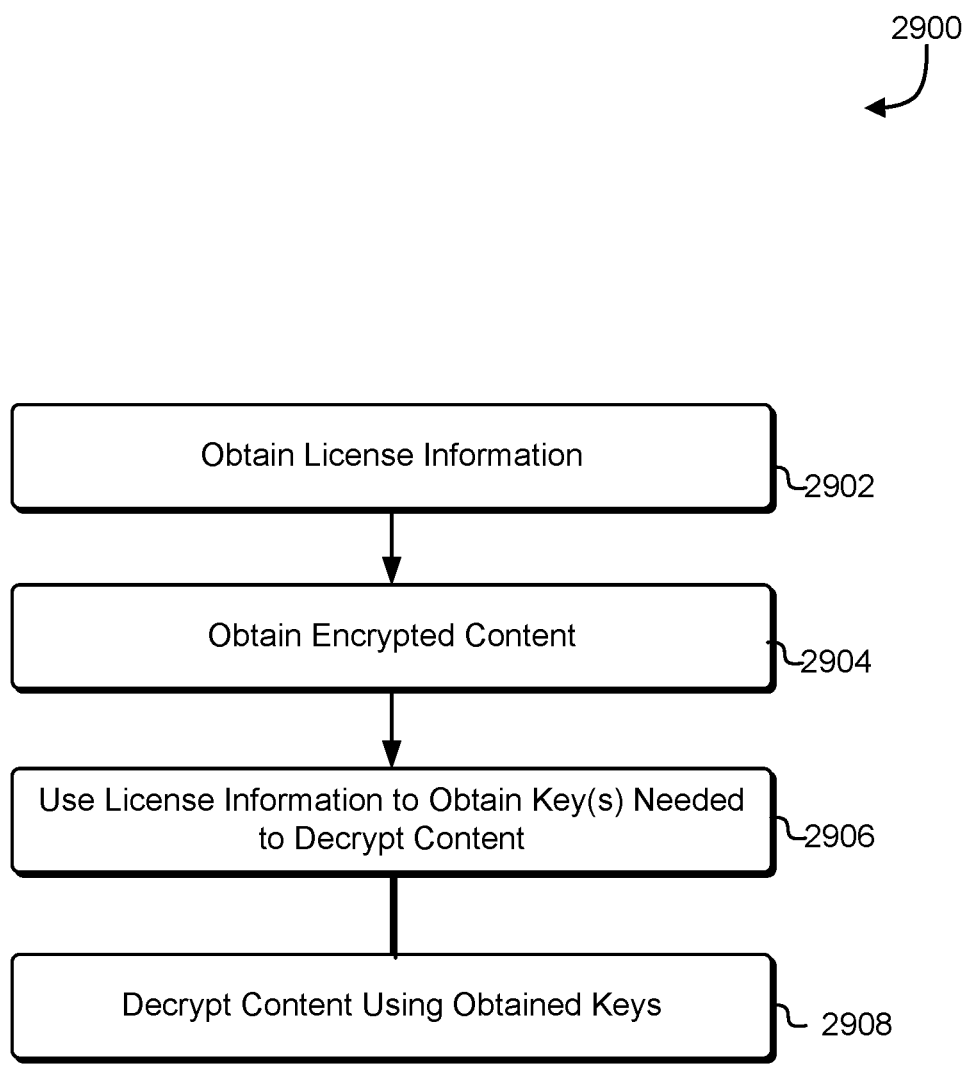
FIG. 29 is a flowchart illustrating an example process for processing a content stream in accordance with at least one embodiment.

FIG. 29 shows an illustrative example of a process that may be used by a device to decrypt content in accordance with an embodiment. The process 2900, as illustrated, includes obtaining 2902 license information for content. Obtaining license information may be done in any suitable manner. The license information may be information usable by the device to generate one or more keys that are usable to decrypt the content. The license information may be provisioned on the device or may be provided to the device electronically, either at a time different from the time at which the content is received or concurrently with the content, such as in connection with a content provider, which may be made according to a secure transaction. In an embodiment, the encrypted content is obtained 2904. Obtaining the encrypted content can likewise be done in any suitable manner, such as by obtaining the content over a network, such as the Internet or by providing the device by reading a medium, such as a disk that encodes the encrypted content. License information 2906 may be used to obtain one or more keys needed to decrypt the content. The keys may be obtained in any suitable way, such as by accessing the memory and/or driving based at least in part on the technique described above. For example, if the license information 2906 includes a key that is higher in a hierarchy than a key actually needed to drive the content, the device may use license information 2906, and, if applicable, key-derivation material, to derive the key using the technique described above, such as through multiple application of a cryptographic hash function with inputs according to the license information 2906 and key-derivation material. Finally, when one or more keys are obtained, the content is decrypted 2908 using the obtained keys. Decryption may be performed in any manner applicable to the manner in which the content was encrypted.

Figure 30:
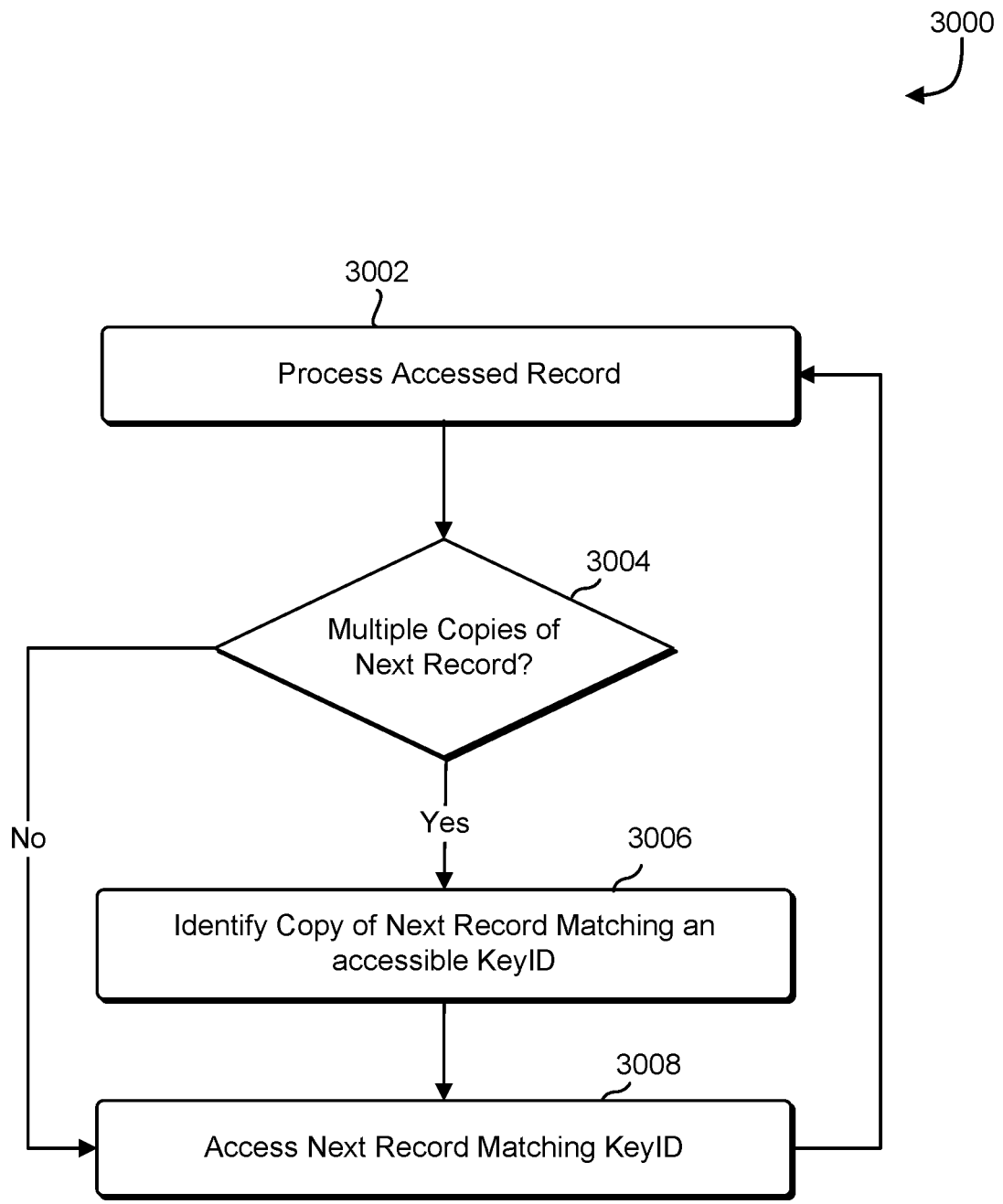
FIG. 30 is a flowchart illustrating an example process for processing content in accordance with at least one embodiment.

FIG. 30 shows an illustrative example of a process 3000 for processing content in accordance with an embodiment. The process 3000 may be used by a content processing device, such the content processing device 2802 described above in connection with FIG. 28, such as a DVD player, audio player, electronic book reader and the like. Generally, the process 3000 proceeds by accessing records from the content processing the access records in sequence. When multiple copies of content for a record are encountered, the device uses information available to it to select a copy that it is able to decrypt. For example, in accordance with an embodiment, as shown in FIG. 30, the process 3000 includes processing 3002 an accessed record. Processing the accessed record may be performed by decrypting content of the record and applying one or more processes to decode the record and present the content. In an embodiment, a determination is made 3004 whether there are multiple copies of the next record. For example, referring to FIG. 27, if the next record is record 2, the determination may be no, that there are not multiple copies of the next record. However, looking at the third record, the determination may be that there are indeed multiple copies of the third record. If it is determined 3004 that there are multiple copies of the next record, a copy of the next record matching an accessible key ID, such as a key ID that is stored by the content processing device, is identified 3006. For instance, if there are ten copies of the record, the device may determine that it only has a key usable to decode one of the records. Although, as noted, the device may have enough keys to decode multiple copies of the record. It should be noted that the device may not have the key itself needed, but may have a key that may be used to derive a key that can be used to decode the next record.

Identifying a copy of the next record may include identifying a copy of content of the next record that the device is able to decrypt using information available to the device. For example, the device may analyze information identifying the keys available to the device and key-deriving material to determine one or more keys that the device can use to decrypt one or more copies of the content. For instance, in one example, referring to FIG. 28, a copy of content may have metadata identifying a and d, which may indicate that the key $K_{a/d}$ may be used to decode the copy of the content. The metadata may include values for a and d or, generally, may indicate a and d to the device to enable the device to access a and d. The device may have $K_a$ and, therefore, have a record of a. By using d, the device can use $K_a$ to generate $K_{a/d}$ and, therefore, decrypt the content. Similarly, continuing with the same example, a copy of the content may have metadata identifying a and d. The device, not having $K_a$ would determine that it cannot generate $K_{a/d}$ (even though it may have a and d) and, therefore, would seek a different copy that it would be able to decode.

In an embodiment, when a copy for the next record matching a stored key ID is identified 3006, a copy of the content for the next record matching the key ID is accessed 3008. The accessed copy may then be processed 3002, such as described above. In this manner, the content processing device 2802 selects, from multiple copies of records, records that it is able to decode by virtue of having or at least being able to derive a key appropriate for decoding the content. It should be noted that FIG. 30 shows various actions being performed in sequence, but as with any process described herein, it may be appropriate in various embodiments for steps to be performed in a different sequence or in parallel. For example, determinations regarding the next record may be made in parallel to processing an access record in order, for instance, to avoid delay and allow for the processing of content efficiently.

Figure 31:
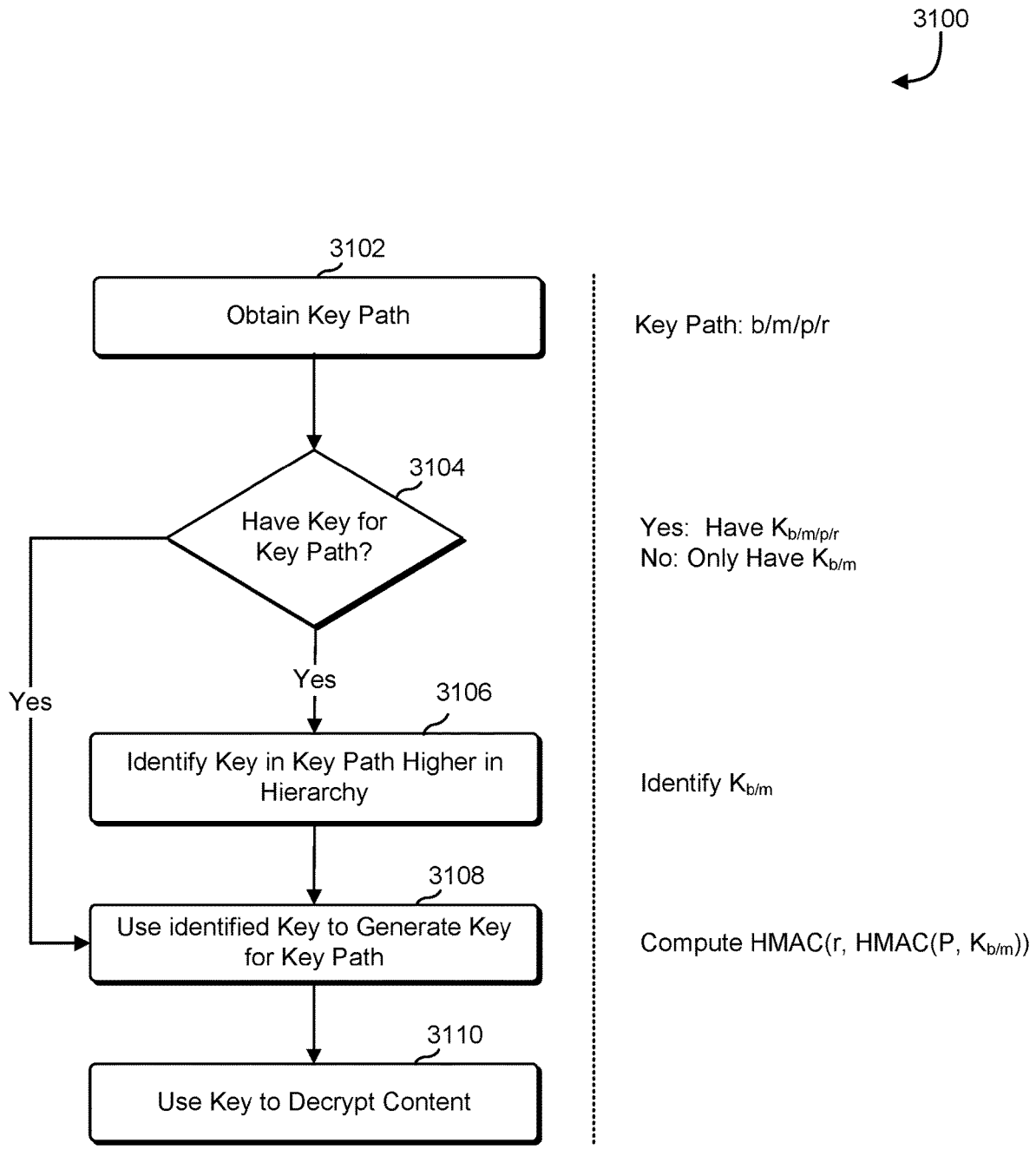
FIG. 31 is a flowchart illustrating an example process for obtaining a key to decrypt content in accordance with at least one embodiment.

FIG. 31 shows an illustrative example of a process 3100 for decoding content in accordance with an embodiment. The process 3100 may be used, for example, by a content processing device in order to decode content in a record being processed. In an embodiment, the process 3100 includes obtaining a key path 3102. The key path may be information from which the key usable to decrypt the content may be identified and/or derived. For example, the key path may be the key ID itself. In an embodiment, a determination is made 3104 whether the device has a key for the obtained key path, such as described above. If it is determined 3104 that the device does not have a key for the key path, a key in a key path higher in the hierarchy may be identified 3106. The identified key may then be used 3108 to generate a key for the key path that was obtained. If it is determined 3104 that the device does have a key for the obtained key path or if such a key is generated 3108, then the key may be used to decrypt the content 3110.

To the right of the process 3100 shown in FIG. 31 are illustrative examples of the values that may be used by a device in decrypting the content. For example, as illustrated, a key path b/m/p/r is obtained. The key path b/m/p/r may correspond to a key derived along a similar path in the hierarchy where each of b, m, p, and r corresponds to nodes in the hierarchy. Going further down the process 3100, at the determination whether or not the device has a key for the key path, the determination may be yes if the device has a key drive along that key path until the node corresponding to the r. The determination may be that the device does not have a key for the key path if the device determines that it only has the key determined along the key path for the nodes b and m. Accordingly, the key b/m is identified and used to derive the key corresponding to the key path b/m/p/r. This key may then be used to decrypt the content record.

Figure 32:
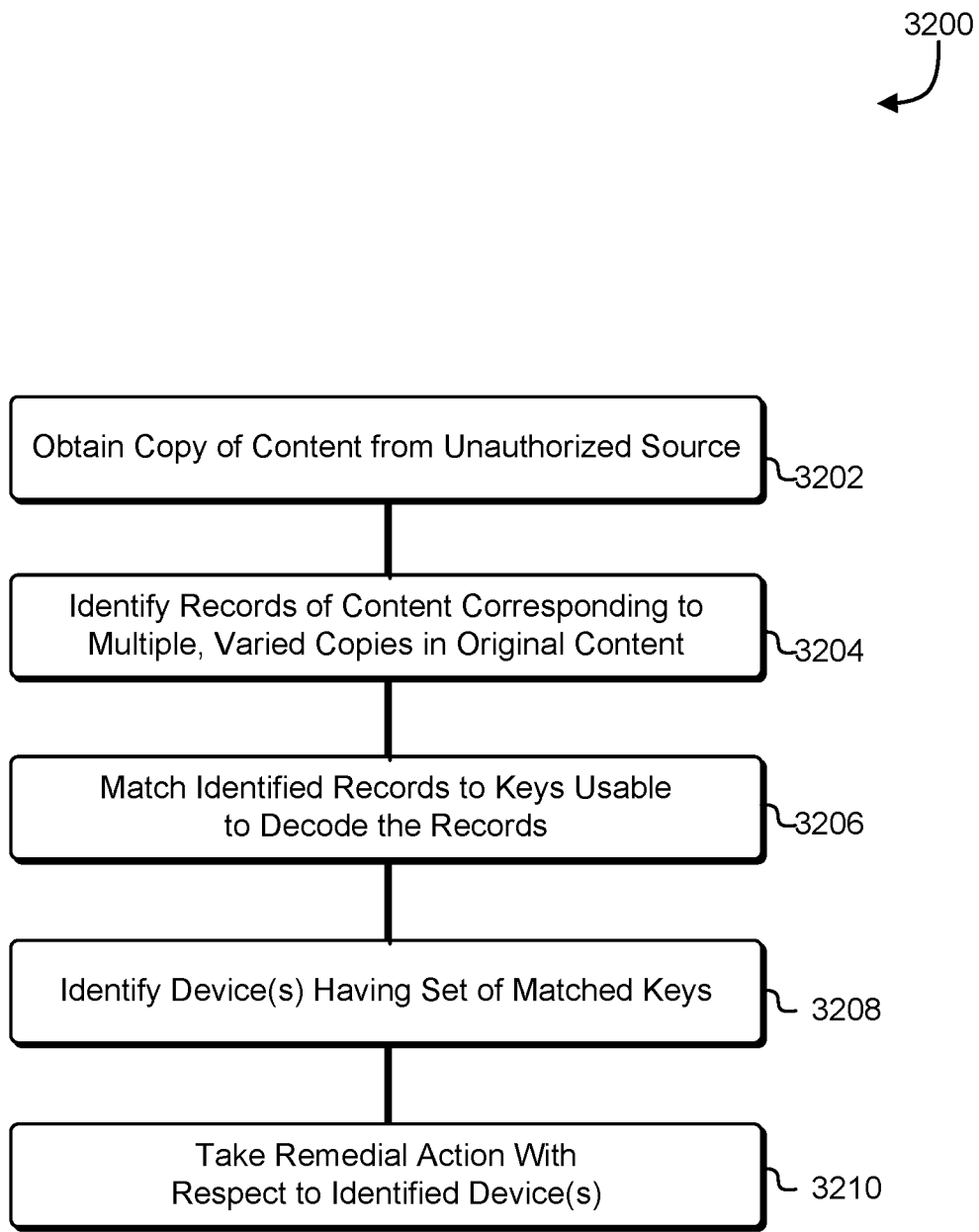
FIG. 32 is a flowchart illustrating an example process for identifying sources of unauthorized content and taking appropriate action, in accordance with at least one embodiment.

FIG. 32 shows an illustrative example of a process 3200 for trader tracing in accordance with an embodiment. Trader tracing may be used to determine the source of unauthorized copies of content. As noted above, different devices may be provided with different sets of keys that are usable to decode content. Because multiple copies of a single record within that content are varied among themselves, the output of such devices may be used in an embodiment corresponds to different sets of keys. In an embodiment, the process 3200 includes obtaining a copy of the content 3202 from an unauthorized source. The copy of content may be obtained in any suitable manner such as by downloading an unauthorized copy of content from a website providing the unauthorized content in an unauthorized manner by purchasing a medium having the content encoded from an unauthorized vendor and the like. Once the copy of content is obtained 3202 from the unauthorized source, records of the content corresponding to multiple varied copies in the original content are identified 3204.

For example, referring to FIG. 27, at least the first, third and Nth records are identified because each of those records corresponds to records for which multiple copies were provided with the original content. For example, DVDs published with the original content may include multiple copies of each of those records. Because it is known by the publisher how the content was varied among the copies of each of the record, and because each of those copies was encrypted using a different key, the identified records may be matched 3206 to keys usable to decode the records. Accordingly, the match may be made, for example, by searching a data store that associates each copy of a record with the keys that are usable to decode the record. Devices having a set of matched keys may then be identified 3208 in accordance with an embodiment. Depending on how the keys are distributed and provisioned among the devices, the device or devices having the set of matched keys may be a single device or may be multiple devices. For instance, the devices identified as having a set of matched keys may be all the devices of a particular model and a particular manufacturer which are all provided with the same set of keys, whereas different models of the same manufacturer and models of different manufacturers are provided different keys.

Once the devices having the set of matched keys is identified, then remedial action with respect to the identified devices may be taken 3210. Numerous actions may be taken as remedial action. For example, the keys used to provide the unauthorized copy of content may be blacklisted in a data store that is marked as not usable for the production of future content such that future content provided is not decodable by the identified devices. Other actions may also be taken, such as by submitting an electronic message to the manufacturer so that the manufacturer updates firmware of the devices and/or other actions.

Figure 33:
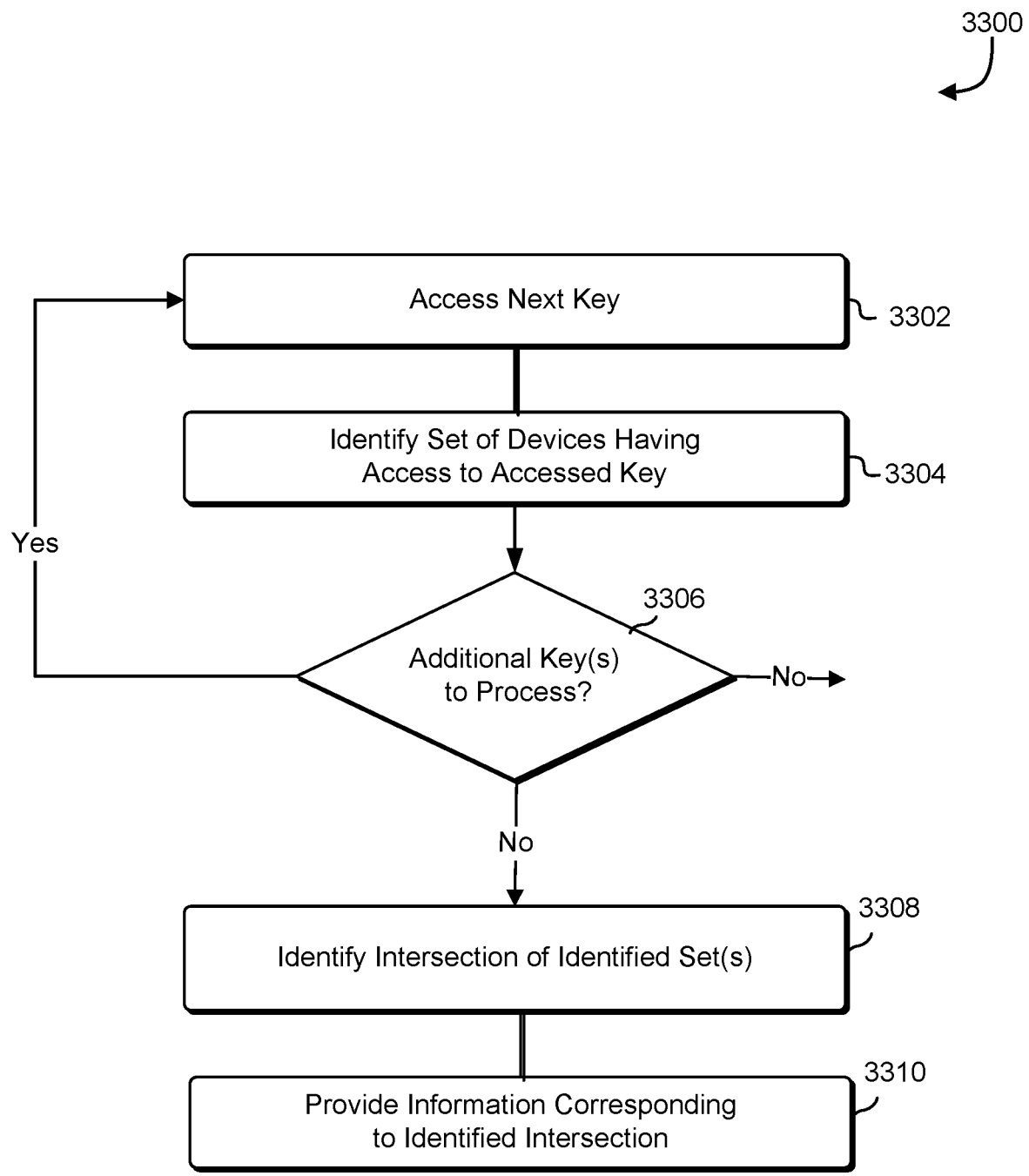
FIG. 33 is a flowchart illustrating an example process for identifying sources of unauthorized content in accordance with at least one embodiment.

FIG. 33 shows an illustrative example of a process 3300 which may be used to identify the devices having a set of keys determined to have been used to decode the unauthorized copy of content. In an embodiment, the process 3300 includes accessing the keys and determining which devices correspond to each of those keys. The devices that are determined to have all the keys then are determined to be the identified devices. In an embodiment, for example, the process 3300 includes accessing a next key 3202 of a set of keys which may be the first key at the beginning of performance of the process 3300. A set of devices having access to the accessed key are identified 3304. As an illustrative example, a key, as described above, may correspond to a node of a key hierarchy. Any devices having the key or another key on the key path connecting the key to the root of the hierarchy since any key above the key on the key path can be used to generate the key.

In an embodiment, a determination is made 3306 whether there are additional keys to process and if there are, then the next key is accessed 3302 and devices having access to that accessed key are identified 3304 as described above. If there are no additional keys to process, then in an embodiment, the intersection of the identified sets of devices having access to each of the keys is identified 3308. As an illustrative example, it may be determined that all devices of two different manufacturers have a first key, but that only certain models of each of the manufacturers have a second key, thus only devices from any of those manufacturers that have both keys would be identified in this intersection. Finally, performance of the process 3300, as illustrated in FIG. 33, may include providing information corresponding to the identified intersection 3310. The information may be provided in any suitable manner, such as by creation of a data record stored in a data storage device, transmission of an electronic message, display of such information on a display device of a computing device and/or the like.

Figure 34:
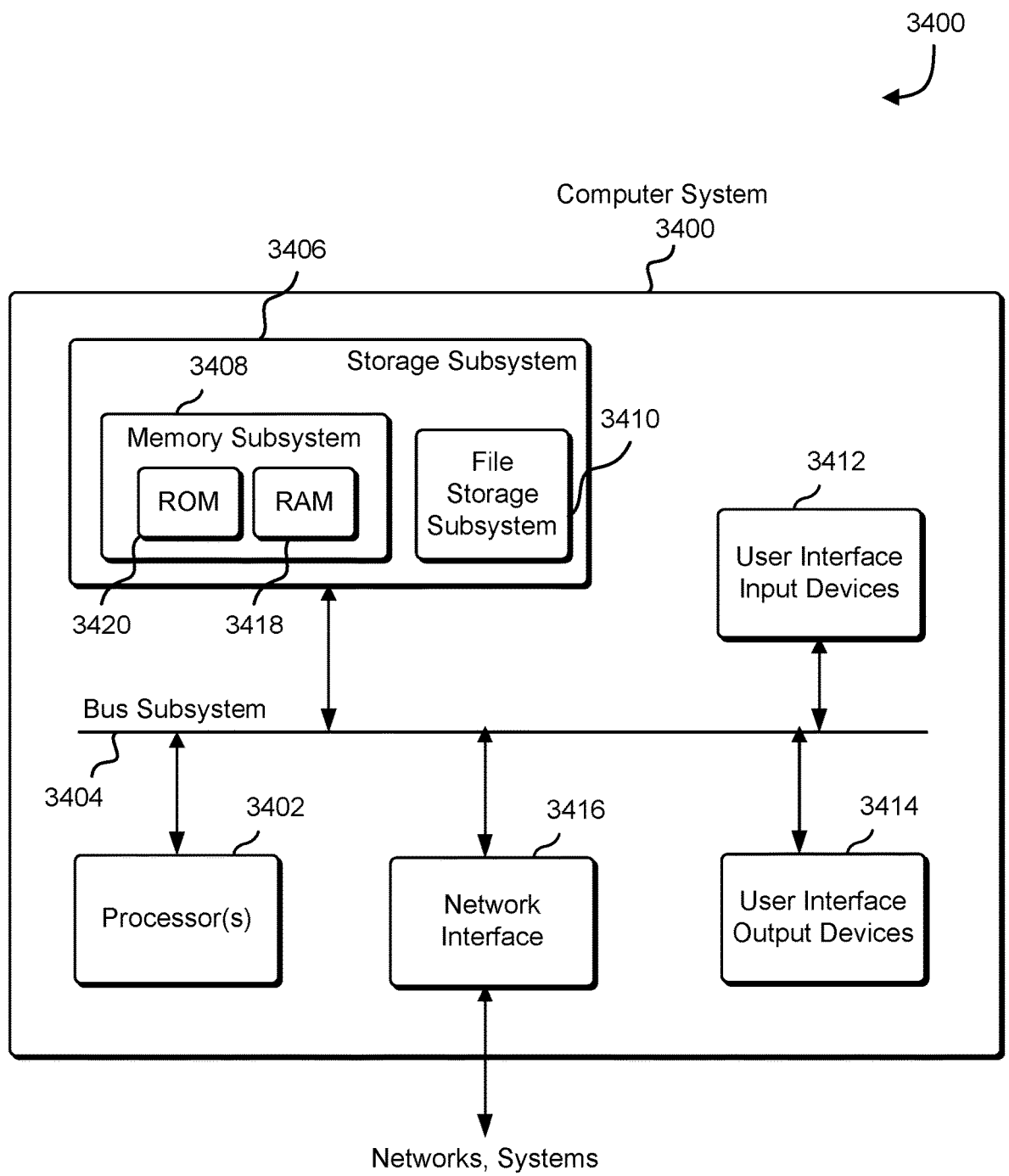
FIG. 34 is a simplified block diagram of an example computer system that may be used to practice described embodiments.

FIG. 34 is a simplified block diagram of an example computer system 3400 that may be used to practice an embodiment of the present invention. In various embodiments, computer system 3400 may be used to implement any of the systems illustrated herein and described above. For example, computer system 3400 may be used to generate keys, distribute keys, encrypt content, decrypt content, process content, identify sources of unauthorized content and/or perform other activities. As shown in FIG. 34, computer system 3400 includes a processor 3402 that communicates with a number of peripheral subsystems via a bus subsystem 3404. These peripheral subsystems may include a storage subsystem 3406, comprising a memory subsystem 3408 and a file storage subsystem 3410, user interface input devices 3412, user interface output devices 3414, and a network interface subsystem 3416.

Bus subsystem 3404 provides a mechanism for enabling the various components and subsystems of computer system 3400 to communicate with each other as intended. Although bus subsystem 3404 is shown schematically as a single bus, alternative embodiments of the bus subsystem may utilize multiple busses.

Network interface subsystem 3416 provides an interface to other computer systems and networks. Network interface subsystem 3416 serves as an interface for receiving data from and transmitting data to other systems from computer system 3400. For example, network interface subsystem 3416 may enable a user computer to connect to the Internet and facilitate communications using the Internet. The network interface subsystem 3416 may also facilitate the receipt and/or transmission of data on other networks.

User interface input devices 3412 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 3400.

User interface output devices 3414 may include a display subsystem, a printer, a fax machine, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from computer system 3400. The output device(s) 3414 may be used, for example, to present user interfaces to facilitate user interaction with applications performing process descried herein and variations therein, when such interaction is appropriate.

Storage subsystem 3406 provides a computer-readable storage medium for storing the basic programming and data constructs that provide the functionality of the present invention. Applications (programs, code modules, instructions) that when executed by a processor provide the functionality of the present invention may be stored in storage subsystem 3406. These Application modules or instructions may be executed by processor(s) 3402. Storage subsystem 3406 may also provide a repository for storing data used in accordance with the present invention. Storage subsystem 3406 may comprise memory subsystem 3408 and file/disk storage subsystem 3410.

Memory subsystem 3408 may include a number of memories including a main random access memory (RAM) 3418 for storage of instructions and data during program execution and a read only memory (ROM) 3420 in which fixed instructions are stored. File storage subsystem 3410 provides a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 3400 can be of various types including a personal computer, a portable computer, tablet computer, a workstation, a network computer, a mainframe, a kiosk, a server or any other data processing system. Due to the ever-changing nature of computers and networks, the description of computer system 3400 depicted in FIG. 34 is intended only as a specific example for purposes of illustrating the preferred embodiment of the computer system. Many other configurations having more or fewer components than the system depicted in FIG. 34 are possible.

As noted in several places throughout the present disclosure, variations of that which is explicitly described are considered as being within the scope of the present disclosure. For example, an information processing system, such as the computer system 3400, may also be configured with additional capabilities that may be utilized according to adaptations of the various techniques described above. For example, as noted above, multiple copies of a portion of data may be provided to an information processing system, such as described above. In some instances (or even all, in some embodiments) the information processing system may have access to enough keys to decrypt a plurality of the multiple copies of the portion of data. In such instances, the information processing system may select from the multiple copies. For instance, the information processing system may be programmed to select a copy to decrypt based at least in part on information available to the information processing device. The information may be any suitable information including, but not limited to, global positioning system coordinates, a device serial number for the information processing system, information provided by an external computer system such as a content provider/publisher computer system, and/or any information that effectively distinguishes the information processing system from at least one other information processing system and/or any information based at least in part thereon. In this manner, the selections of which copies to decrypt are usable to distinguish the information processing system from other information processing systems and, therefore, may be used forensically, such as to identify the source of unauthorized copies of content. For instance, a computer system with access to output of an information processing system may be able to distinguish, based at least in part on one or more selections of copies to decrypt, between information processing devices that would have made such selections and information processing devices that would not have made such selections. Distribution of keys to the information processing devices may be made in a coordinated manner to enable such distinctions.

The techniques described explicitly herein may also be adapted, combined, and otherwise modified. As just one example, techniques involving multiple authorities may be combined with techniques involving DRM such that, for instance, sources of unauthorized content is identifiable, but also such that proof of access to multiple keys is necessary to decrypt the content. In addition, specific uses (e.g. message signing and verification and encryption/decryption of data) of keys derived using the various techniques described herein are used for the purpose of illustration, but other uses of keys are also considered as being within the scope of the present disclosure. For example, keys derived in connection with multiple authorities (or, generally, any derived key) can be used not only for message signing and verification, but for the encryption and decryption of data. Generally, keys derived in accordance with the various techniques described herein can be used for any suitable cryptographic operation including, but not limited to, encryption, decryption, signature generation, signature verification, zero knowledge proof construction, non-signature based interactive authentication, input into a bit commitment protocol, password constructions to create a family of passwords reconstructable by a base key, and other cryptographic operations and combinations thereof.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a key holder key set comprising a first key from a first key holder and a second key from a second key holder, the first key derived based at least in part on a first key holder key corresponding to the first key holder and a set of parameters, and the second key derived based at least in part on a second key holder key corresponding to the second key holder and the set of parameters;
    calculating, by at least inputting into a function the set of parameters and an obtained key from the key holder key set, a cryptographic key;
    encrypting, based at least in part on the calculated cryptographic key, one or more data items to obtain one or more encrypted data items;
    generating one or more metadata items for individual encrypted data items of the one or more encrypted data items; and
    storing the one or more encrypted data items, one or more metadata items, and the set of parameters in a data store.

2. The computer-implemented method of claim 1, wherein:
    deriving the obtained key is based at least in part on a corresponding restriction set for the obtained key; and
    the set of parameters includes at least the union of restriction sets for the first key and the second key.

3. The computer-implemented method of claim 1, wherein the set of parameters contains at least one primitive used to calculate the cryptographic key.

4. The computer-implemented method of claim 1, wherein the first key and the second key are derived from a common key.

5. The computer-implemented method of claim 1, wherein the one or more metadata items identify at least the obtained key and the set of parameters used to calculate the cryptographic key.

6. The computer-implemented method of claim 1, wherein the one or more data items are encrypted using a symmetric encryption algorithm.

7. The computer-implemented method of claim 1, wherein the set of parameters comprise permissions to indicate whether the function is allowed to derive the cryptographic key based at least in part on the obtained key from the key holder key set and the set of parameters.

8. A computer-implemented method, comprising:
    obtaining one or more encrypted data items from a data store;
    obtaining one or more metadata items for individual encrypted data items of the one or more encrypted data items from the data store;
    obtaining a plurality of keys, the obtained keys of the plurality of keys being based at least in part on an information set for the plurality of keys and at least one other key distinct from the plurality of keys;
    for individual encrypted data items of the one or more data encrypted items, determining a key from the plurality of keys based at least in part on the one or more metadata items;
    determining, based at least in part on the one or more metadata items for the individual encrypted data items, a set of security parameters;
    calculating, based at least in part on the set of security parameters and the key, a decryption key; and
    decrypting the one or more encrypted data items based at least in part on the decryption key.

9. The computer-implemented method of claim 8, wherein the one or more encrypted data items are decrypted using a symmetric decryption algorithm.

10. The computer-implemented method of claim 8, wherein the decryption key is derived from an obtained key from the plurality of keys, the obtained key being determined from the plurality of keys based at least in part on the one or more metadata items.

11. The computer-implemented method of claim 8, wherein the information set includes a set of key-use restrictions comprising one or more restrictions for individual keys of the plurality of keys.

12. The computer-implemented method of claim 8, wherein calculating the decryption key includes inputting a combination of the obtained plurality of keys into a function with the information set for the plurality of keys.

13. The computer-implemented method of claim 8, wherein if the key from the plurality of keys determined based at least in part on one or more metadata items is unavailable, a parent key from the plurality of keys is used to derive the decryption key.

14. The computer-implemented method of claim 8, wherein the information set includes, for the obtained keys of the plurality of keys, an encoding of at least one restriction on the key.

15. The computer-implemented method of claim 8, wherein the plurality of keys and one or more metadata items are stored in a file management system.

16. A system, comprising:
    one or more processors; and
    memory including instructions that, when executed by one or more processors of a computer system, cause the computer system to at least:
    obtain a plurality of keys, the plurality of keys comprising at least a first key and a second key, the first key and the second key being obtained based at least in part on an information set for the plurality of keys and at least one other key distinct from the plurality of keys;
    compute, based at least in part on information derived based at least in part on the obtained plurality of keys, a cryptographic key; and
    cause one or more cryptographic operations to be performed using the cryptographic key.

17. The system of claim 16, wherein the first key or the second key of the obtained plurality of keys are derived based at least in part on a corresponding set of one or more security parameters.

18. The system of claim 17, wherein the one or more security parameters are specified in one or more metadata files in a data store.

19. The system of claim 16, wherein the cryptographic key is computed based at least in part on a shared secret associated with the obtained plurality of keys.

20. The system of claim 16, wherein the information set includes a set of key-use restrictions comprising one or more restrictions for the first key and the second key of the plurality of keys.

* * * * *